US010065449B2

(12) United States Patent
Pereira

(10) Patent No.: US 10,065,449 B2
(45) Date of Patent: Sep. 4, 2018

(54) LUMINOUS FLUID SCULPTURES

(71) Applicant: Fred Metsch Pereira, Amsterdam (NL)

(72) Inventor: Fred Metsch Pereira, Amsterdam (NL)

( * ) Notice: Subject to any disclaimer, the term of this patent is extended or adjusted under 35 U.S.C. 154(b) by 284 days.

(21) Appl. No.: 14/443,390

(22) PCT Filed: Nov. 17, 2013

(86) PCT No.: PCT/US2013/070462
§ 371 (c)(1),
(2) Date: May 17, 2015

(87) PCT Pub. No.: WO2014/078752
PCT Pub. Date: May 22, 2014

(65) Prior Publication Data

US 2015/0290966 A1 Oct. 15, 2015

Related U.S. Application Data

(60) Provisional application No. 61/727,687, filed on Nov. 17, 2012.

(51) Int. Cl.

| | |
|---|---|
| ***G09B 19/00*** | (2006.01) |
| ***B44F 1/00*** | (2006.01) |
| ***F21S 10/00*** | (2006.01) |
| ***F21S 10/02*** | (2006.01) |
| ***F23C 99/00*** | (2006.01) |

(Continued)

(52) U.S. Cl.
CPC .............. *B44F 1/00* (2013.01); *F21S 10/002* (2013.01); *F21S 10/02* (2013.01); *F23C 99/00* (2013.01); *F23D 14/02* (2013.01); *F23D 91/00* (2015.07); *B05B 17/08* (2013.01); *F21W 2121/00* (2013.01); *F23D 2900/21* (2013.01)

(58) Field of Classification Search
USPC .... 434/81, 82, 126, 276, 300, 302; 446/153, 446/176, 180; 40/406, 407; 119/253, 119/255
See application file for complete search history.

(56) References Cited

U.S. PATENT DOCUMENTS 1,952,353 A * 3/1934 Barclay ..................... F21S 8/00 239/12
2,563,550 A 8/1951 Quist
(Continued)

OTHER PUBLICATIONS

"Ferrite—Interactive Liquid Sculpture", David Markus, 2012 [retrieved online Apr. 28, 2017].*

*Primary Examiner* — Kurt Fernstrom
(74) *Attorney, Agent, or Firm* — Hojka Qadeer, LLC; Umair A. Qadeer

(57) ABSTRACT

The present disclosure describes a system and method for shaping and energizing fluids that can generate luminous fluid sculptures. The method comprises sculpting the pattern and/or shape of a plurality of fluids using nonvisible forces such as mechanically generated turbulence, controlled movement through a shaped chamber, magnetic fields, vibration, gravity, or other forces; energizing the sculpted fluids so that they emit visible light using sources of non-visible energy such as chemicals, heat, electrical currents, electromagnetic radiation, or other sources; and controlling the color of the emitted light using chemical additives, selected wavelengths of electromagnetic radiation, layering of selected chemicals, or other methods.

15 Claims, 46 Drawing Sheets

(51) Int. Cl.

| | |
|---|---|
| ***F23D 14/02*** | (2006.01) |
| ***F23D 99/00*** | (2010.01) |
| *B05B 17/08* | (2006.01) |
| *F21W 121/00* | (2006.01) |

(56) References Cited

U.S. PATENT DOCUMENTS 2,789,505 A 4/1957 Cumming et al.
2,850,615 A 9/1958 Luse, Jr. et al.
2,883,797 A 4/1959 Eldred
3,174,688 A 3/1965 Chatten
3,387,396 A 6/1968 Smith
3,530,870 A 9/1970 Hoglund
3,628,268 A 12/1971 Johnson
3,899,786 A 8/1975 Greubel et al.
4,007,871 A 2/1977 Jones et al.
4,034,493 A 7/1977 Ball
4,085,533 A 4/1978 Ewald
4,258,912 A 3/1981 Reighart, II
4,388,045 A 6/1983 Simon
4,406,651 A 9/1983 Dudrey et al.
4,419,283 A 12/1983 Schneider
4,464,108 A 8/1984 Korenyi
4,949,485 A 8/1990 Garrett
4,964,384 A 10/1990 Getz
5,055,031 A 10/1991 Werner
5,096,467 A 3/1992 Matsui
5,152,466 A 10/1992 Matushita et al.
5,272,604 A * 12/1993 Lin ........................... B04C 5/00 362/101
5,276,599 A 1/1994 Neeley
5,416,994 A * 5/1995 McLaughlin ........... G09F 13/24 40/406
5,468,142 A 11/1995 Koziol
5,471,853 A 12/1995 Shih
5,683,174 A 11/1997 Lena, Jr.
5,711,892 A 1/1998 Ramirez
5,778,576 A 7/1998 Kaviani
5,848,884 A 12/1998 Haustein et al.
5,900,181 A 5/1999 Clarke
5,912,652 A 6/1999 Seo
5,944,195 A 8/1999 Huang et al.
5,971,765 A 10/1999 Gill et al.
6,006,461 A 12/1999 Snyder
6,082,387 A 7/2000 Kanazashi et al.
6,135,604 A * 10/2000 Lin .......................... B44F 1/08 119/254
6,155,837 A 12/2000 Korneliussen
6,187,230 B1 2/2001 Clarke
6,241,359 B1 * 6/2001 Lin ....................... F21S 10/002 362/101
6,290,894 B1 9/2001 Raj et al.
6,295,749 B1 * 10/2001 Lin ......................... G09F 19/08 40/406
D450,877 S 11/2001 Marino et al.
6,383,429 B1 5/2002 Noto
6,484,502 B1 11/2002 Kikuchi
6,550,168 B1 4/2003 Campos
6,681,508 B2 * 1/2004 Unger ................... F21S 10/002 40/406
6,705,425 B2 3/2004 West
6,746,131 B1 6/2004 Goldstein et al.
6,945,658 B2 9/2005 Borra et al.
7,137,720 B1 11/2006 Finkle
D543,768 S 6/2007 Ford
7,299,620 B2 11/2007 Stuttaford et al.
7,452,095 B1 11/2008 Schnuckle
7,490,563 B2 2/2009 Eastin et al.
7,647,716 B2 1/2010 Finkle
7,663,754 B2 2/2010 Okcay et al.
7,673,834 B2 3/2010 Harman
7,717,581 B2 5/2010 Lin et al.
D621,873 S 8/2010 Tsai
D622,318 S 8/2010 Tsai et al.
7,905,728 B2 * 3/2011 Piontek .................. G09B 23/12 366/273
8,029,182 B2 10/2011 Chien
9,447,936 B1 * 9/2016 Ho ........................ F21S 10/002
9,503,798 B2 * 11/2016 Lee ......................... B05B 17/08
2001/0048877 A1 12/2001 Illingworth et al.
2003/0194328 A1 10/2003 Bryant et al.
2004/0208007 A1 10/2004 Munari
2005/0150174 A1 7/2005 Eilbacher
2006/0043730 A1 3/2006 Bianco
2006/0090645 A1 5/2006 Kent
2006/0120890 A1 6/2006 Moorhouse et al.
2006/0251997 A1 11/2006 Schulte et al.
2006/0255179 A1 11/2006 Liao
2007/0091585 A1 4/2007 Hedman
2007/0200260 A1 8/2007 Whiteis
2007/0291472 A1 12/2007 Finkle
2008/0055885 A1 3/2008 Marks
2008/0074864 A1 3/2008 Molders
2008/0112154 A1 5/2008 Reichow
2008/0186736 A1 8/2008 Rinko
2008/0278960 A1 11/2008 Smith et al.
2008/0296787 A1 12/2008 Fuller et al.
2009/0061725 A1 3/2009 Levinson et al.
2009/0071647 A1 3/2009 Vinegar et al.
2009/0084547 A1 4/2009 Farmayan et al.
2011/0012355 A1 1/2011 Liao et al.
2011/0030390 A1 2/2011 Charamko et al.
2011/0138661 A1 6/2011 Fuller et al.
2011/0260620 A1 10/2011 Kumada et al.
2013/0157241 A1 * 6/2013 Ruland .................. G09B 23/12 434/302

* cited by examiner

LUMINOUS FLUID SCULPTURES

CROSS-REFERENCE TO RELATED APPLICATIONS

This application claims priority to U.S. Provisional Patent Appl. No. 61/727,687, filed on Nov. 17, 2012, the disclosure of which is incorporated herein in its entirety by reference.

BACKGROUND

Field of the Invention

The present disclosure relates to a system and method for generating luminous fluid sculptures.

Description of the Related Art

The ability to influence the pattern and shape of fluids can be used in a variety of industrial, commercial, and decorative applications.

In many cases, the fluid is not visible to the viewer. U.S. Pat. Nos. 2,563,550, 4,007,871, and 4,406,651 and U.S. Patent Appl. Publ. No. 2006/0090645 disclose devices used to separate mixed or contaminated fluids for industrial or medical processes. U.S. Pat. No. 3,530,870 discloses a fluid metal electrical circuit. U.S. Pat. Nos. 4,388,045 and 7,490,563 and U.S. Patent Appl. Publ. No. 2011/0030390 disclose fluid or particulate mixing devices. U.S. Pat. Nos. 2,789,505, 4,464,108, 4,964,384, 6,484,502, 6,705,425, and 7,299,620 disclose the controlled flow of fluids within a combustion chamber. U.S. Pat. No. 5,152,466 discloses a device for electrically charging fluid paint. U.S. Pat. No. 5,944,195 discloses a magnetic device used to separate contaminated fluids for industrial processes. U.S. Patent Appl. Publ. No. 2001/0048877 discloses a device that uses fluid flow to generate low pressure for a suction device. U.S. Patent Appl. Publ. Nos. 2003/0194328 and 2006/0120890 disclose fluid pumping devices. U.S. Patent Appl. Publ. No. 2009/0071647 discloses a hydrocarbon extraction device. U.S. Patent Appl. Publ. No. 2009/0084547 discloses a subsurface combustion device for heating. U.S. Patent Appl. Publ. No. 2011/0012355 discloses a fluid flow power system for an emergency light. All of these references relate to fluids that are not visible to the viewer.

In other cases, the fluid is visible, but its form is static or is largely determined by the ambient environment. U.S. Pat. Nos. 6,290,894 and 6,383,429 disclose devices used to create solid, static objects by shaping fluids. U.S. Patent Appl. Publ. Nos. 2005/0150174, 2007/0091585, and 2008/0296787 disclose decorative fountains. U.S. Pat. Nos. 5,276,599, 5,683,174, 6,945,658, and 8,029,182 and U.S. Patent Appl. Publ. Nos. 2008/0186736 and 2008/0278960 disclose light reflecting or refracting systems. U.S. Pat. Nos. 5,468,142 and 5,848,884 disclose gas control or ignition systems. U.S. Pat. No. 4,419,283 discloses immiscible liquids. U.S. Patent Appl. Publ. No. 2004/0208007 discloses a colored light bulb. U.S. Patent Appl. Publ. No. 2006/0043730 discloses a color changing book. In all of these examples, the device primarily relates to the creation or manipulation of solid objects.

U.S. Pat. Nos. 2,789,505 and 2,883,797 disclose industrial combustion devices. U.S. Pat. Nos. 2,850,615 and 6,155,837 and U.S. Patent Appl. Publ. No. 2008/0112154 disclose fire simulators for training or theatrical purposes. U.S. Pat. No. 5,055,031 and U.S. Design Pat. Nos. D621,873 and D622,318 disclose open flame tornados. In these devices the flame is generally natural in form and moves only in an upward direction.

U.S. Pat. Nos. 3,387,396, 3,628,268, 4,034,493, 4,085,533, 4,258,912, 4,949,485, 5,096,467, 5,778,576, 5,971,765, 6,006,461, 6,082,387, 6,550,168, 6,681,508, 6,746,131, 7,137,720, 7,647,716, 7,673,834, 7,717,581, and 7,905,728, U.S. Patent Appl. Publ. Nos. 2006/0255179, 2007/0200260, 2007/0291472, 2008/0055885, 2008/0074864, 2009/0061725, and 2011/0138661, and U.S. Design Pat. Nos. D450,877 and D543,768 disclose fluid displays. However, the shapes achieved are simple and generally uncontrolled, and the disclosed fluids all rely on external lighting for illumination.

U.S. Pat. Nos. 5,471,853, 5,711,892, 5,900,181, and 6,187,230 disclose devices for casting ice in molds and automated ice-carving or melting machines. However, these devices do not create growing ice sculptures, or patterns or light from within the ice.

U.S. Pat. Nos. 3,899,786, 5,912,652, and 7,663,754 and U.S. Patent Appl. Publ. No. 2011/0260620 disclose light-emitting fluids in the context of flat panel display devices.

In most examples of sculpted fluids where the fluid is visible to a viewer, the fluid does not produce light of its own and must rely on reflected light to be visible. In examples which disclose the use of luminous fluids, the fluids are generally restricted in the variety of shapes and/or color combinations available.

Thus there remains a need for a system and method for mechanically and dynamically shaping and sculpting fluids into patterns, shapes, or indicia and/or energizing fluids such that the fluids emit visible light, wherein the intensity and color of light emitted by the fluids may be controlled.

SUMMARY

The present disclosure describes a system and method for shaping and energizing fluids that can generate luminous fluid sculptures. The method comprises sculpting the pattern and/or shape of a plurality of fluids using nonvisible forces such as mechanically generated turbulence, controlled movement through a shaped chamber, magnetic fields, vibration, gravity, or other forces; energizing the sculpted fluids so that they emit visible light using sources of non-visible energy such as chemicals, heat, electrical currents, electromagnetic radiation, or other sources; and controlling the color of the emitted light using chemical additives, selected wavelengths of electromagnetic radiation, layering of selected chemicals, or other methods.

DETAILED DESCRIPTION OF THE PREFERRED EMBODIMENTS

The present disclosure describes a system and method for shaping and energizing fluids that can generate luminous fluid sculptures.

The disclosed method comprises sculpting the pattern and/or shape of a plurality of fluids using nonvisible forces such as mechanically generated turbulence, controlled movement through a shaped chamber, magnetic fields, vibration, gravity, or other forces; energizing the sculpted fluids so that they emit visible light using sources of non-visible energy such as chemicals, heat, electrical currents, electromagnetic radiation, or other sources; and controlling the color of the emitted light using chemical additives, selected wavelengths of electromagnetic radiation, layering of selected chemicals, or other methods.

The disclosed method may be used to generate dynamic decorative lighting systems comprising luminous fluid sculptures.

Fire Flower

In one embodiment, the method is used to generate fluid shapes which emit colored light to generate a model of a flower. In a preferred embodiment, the method may generate a three-dimensional potted flower that is shaped by turbulence and vibration in a glass chamber ("fire flower"). The fire flower may comprise a bloom with curved petals, a curved stem, a leaf, and roots growing from liquid soil. Visible light may be generated by the release of chemical energy and the application of heat. The color of the light may be adjusted using chemical additives. The distinct parts of the fire flower may grow and wilt in order to simulate the growth and death of an actual flower.

Fire Flower Description

Figure 1A:
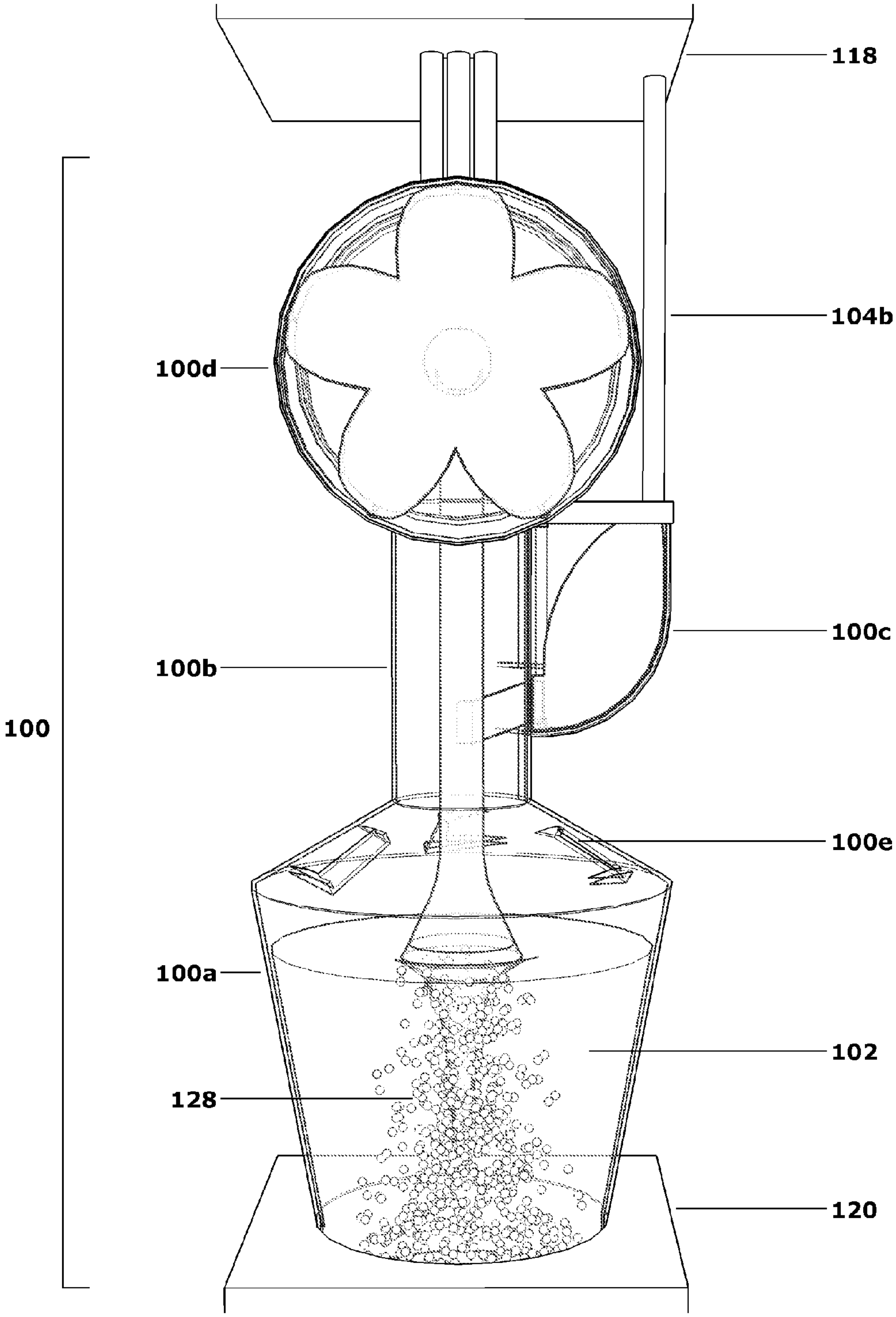
FIG. 1*a* shows a complete front view of the fire flower.
Figure 1B:
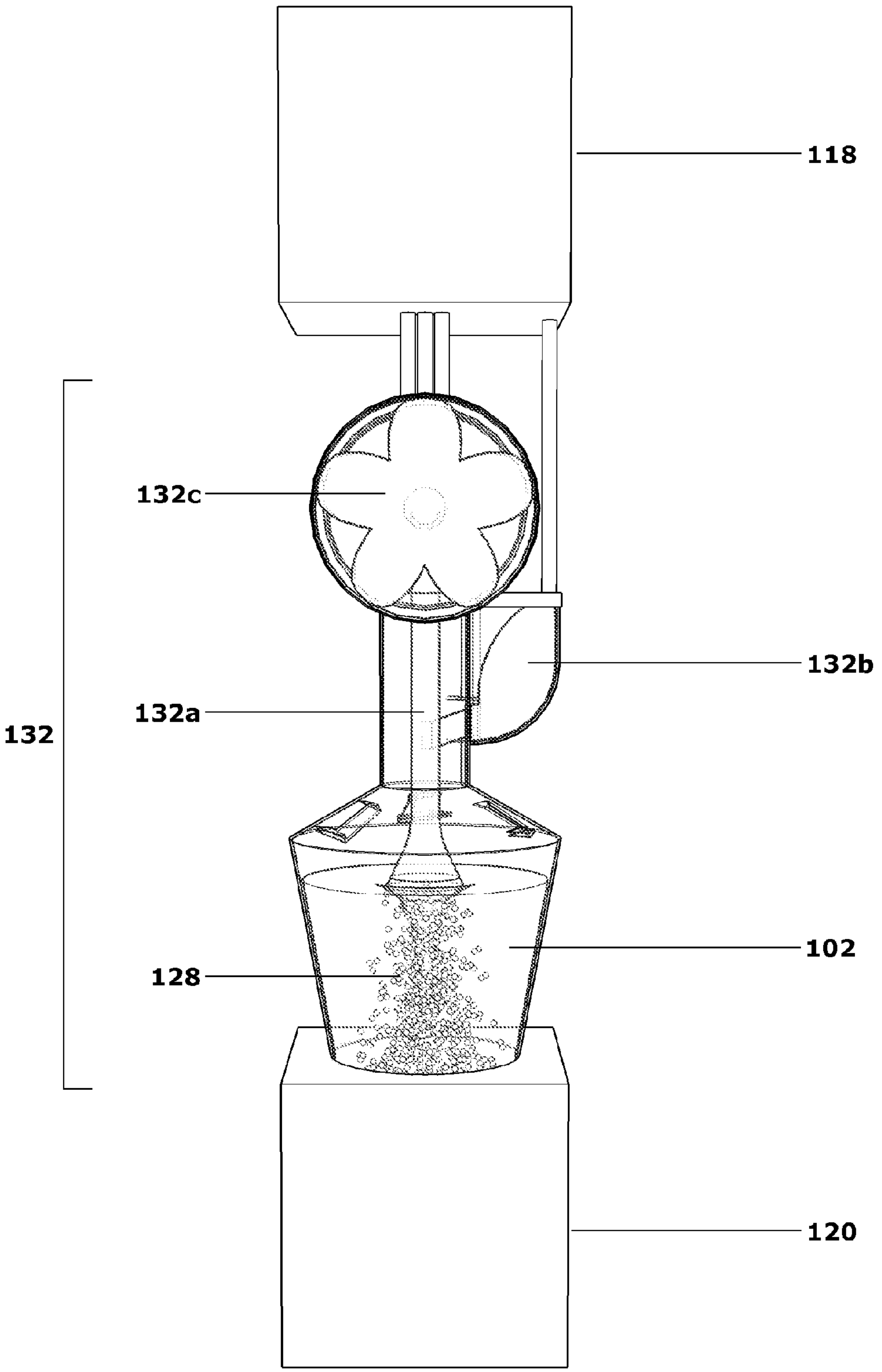
FIG. 1*b* shows a complete front view of the fire flower.
Figure 1C:
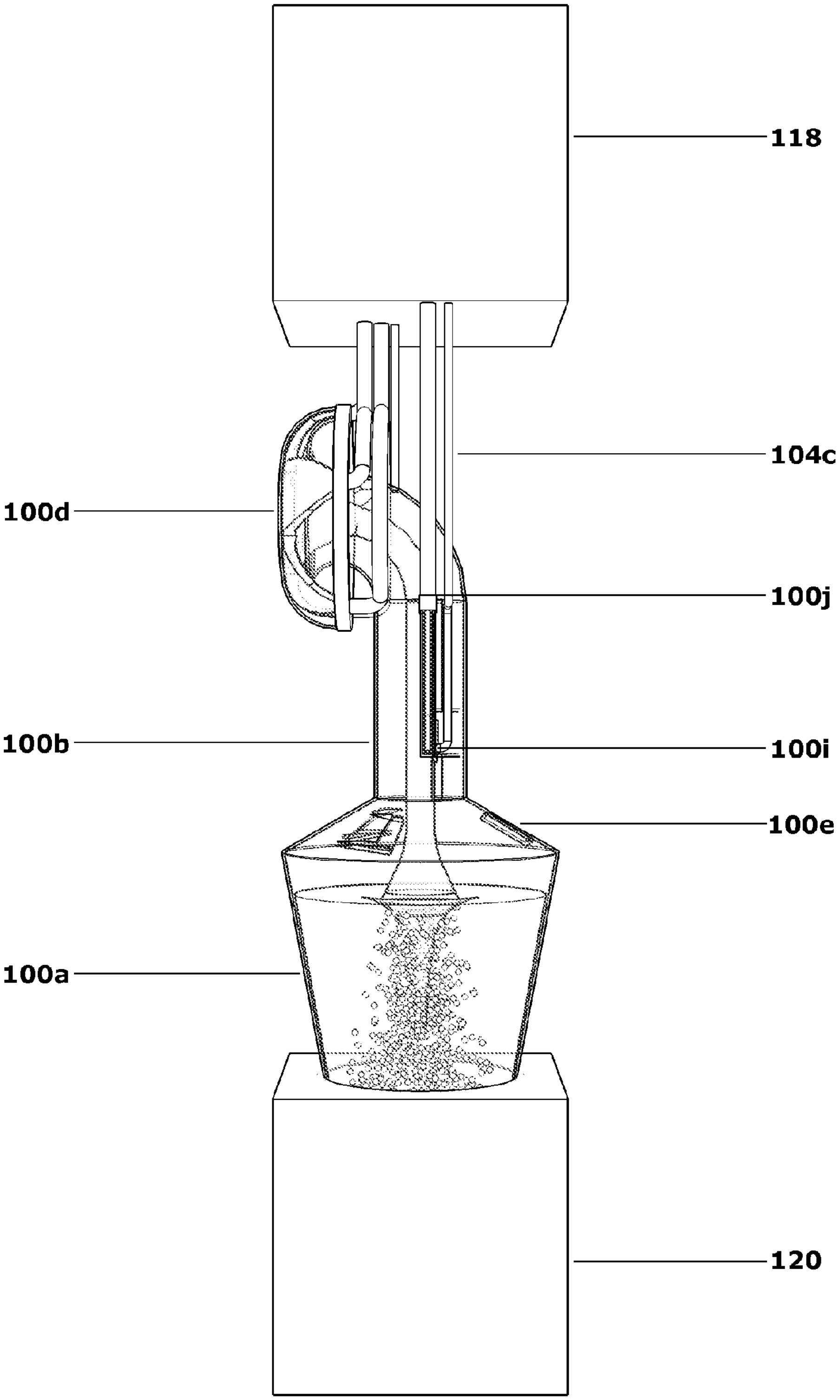
FIG. 1*c* shows a complete right side view of the fire flower.
Figure 1D:
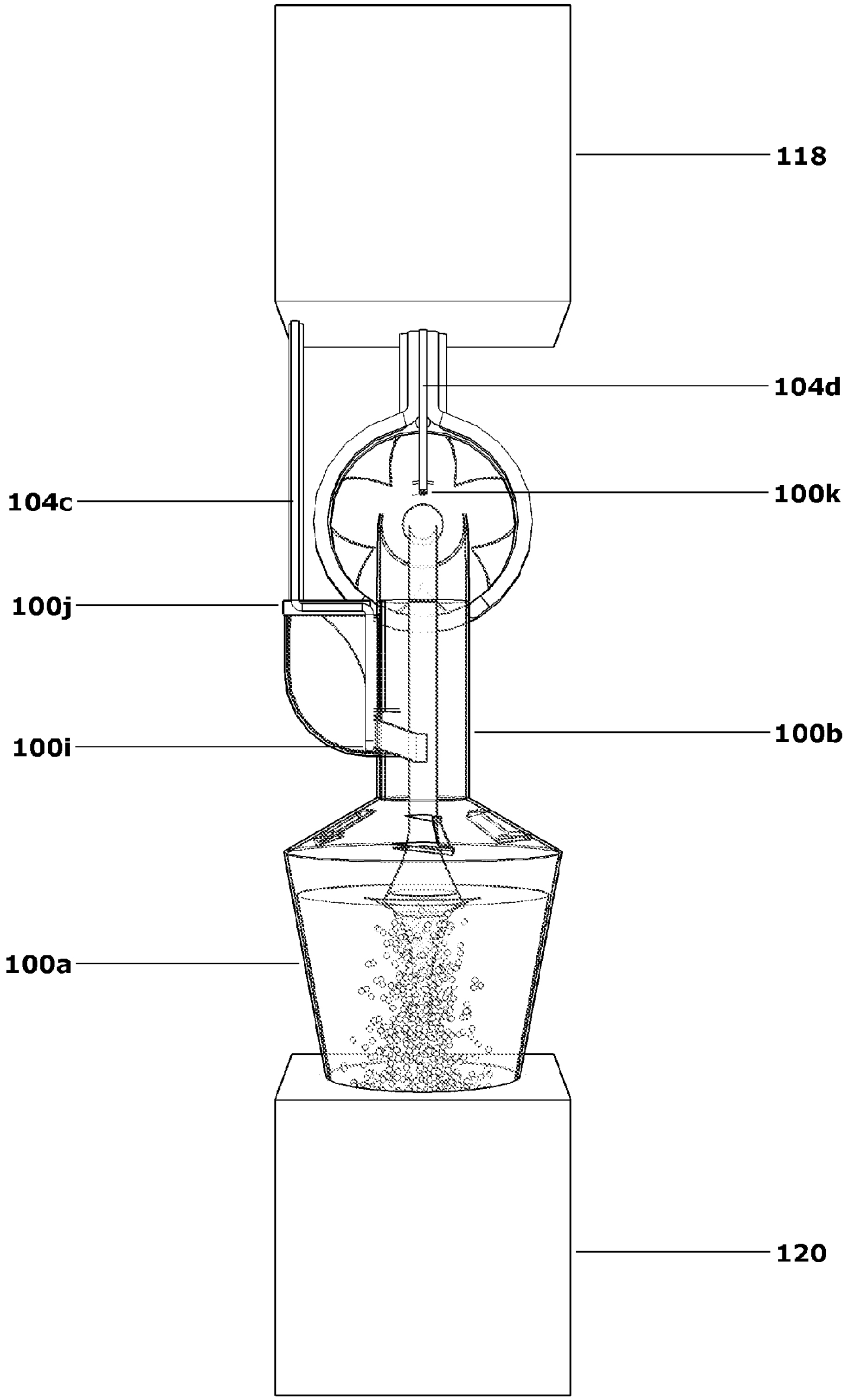
FIG. 1*d* shows a complete back view of the fire flower.
Figure 1E:
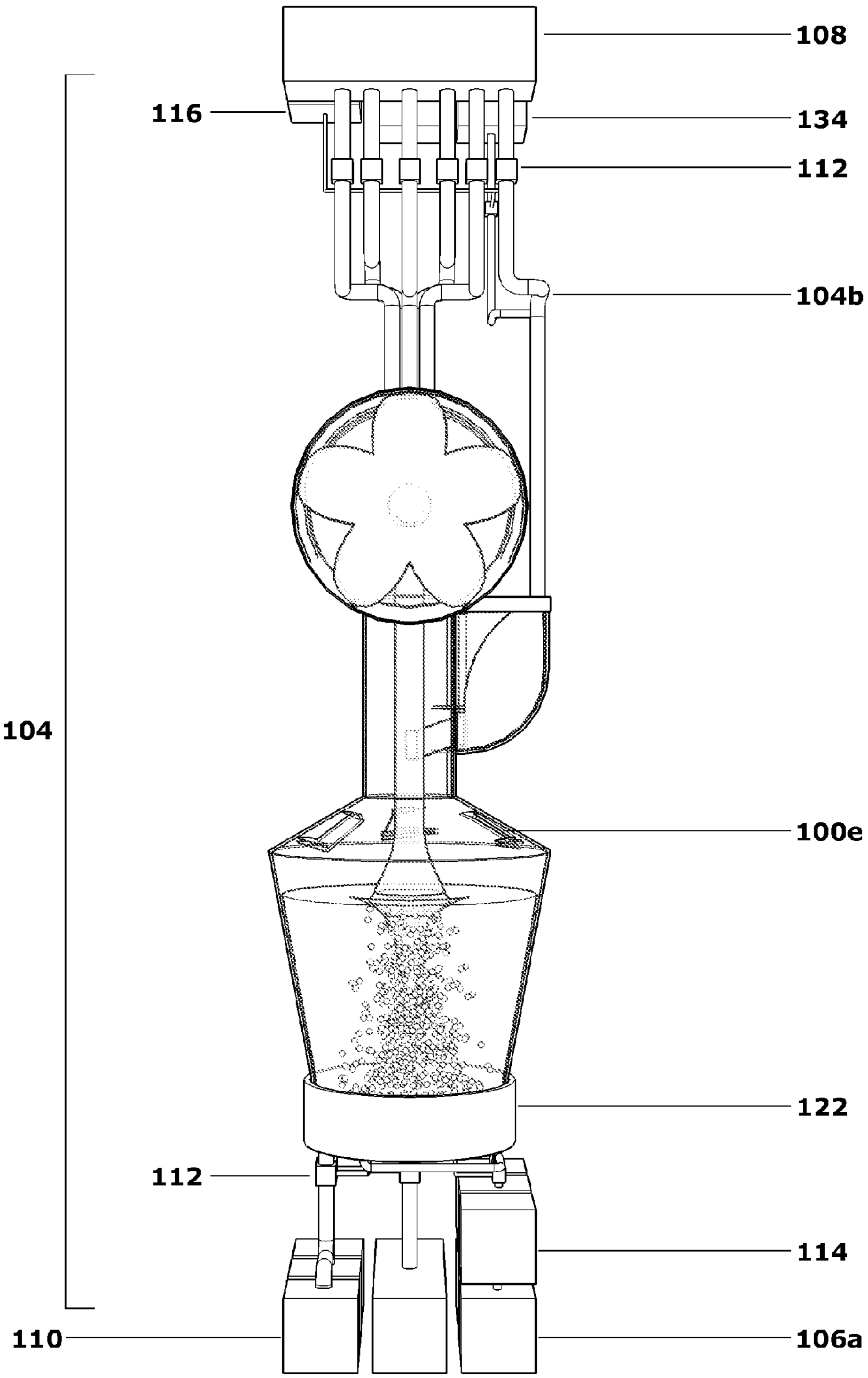
FIG. 1*e* shows a front view of the fire flower without its cover.
Figure 1F:
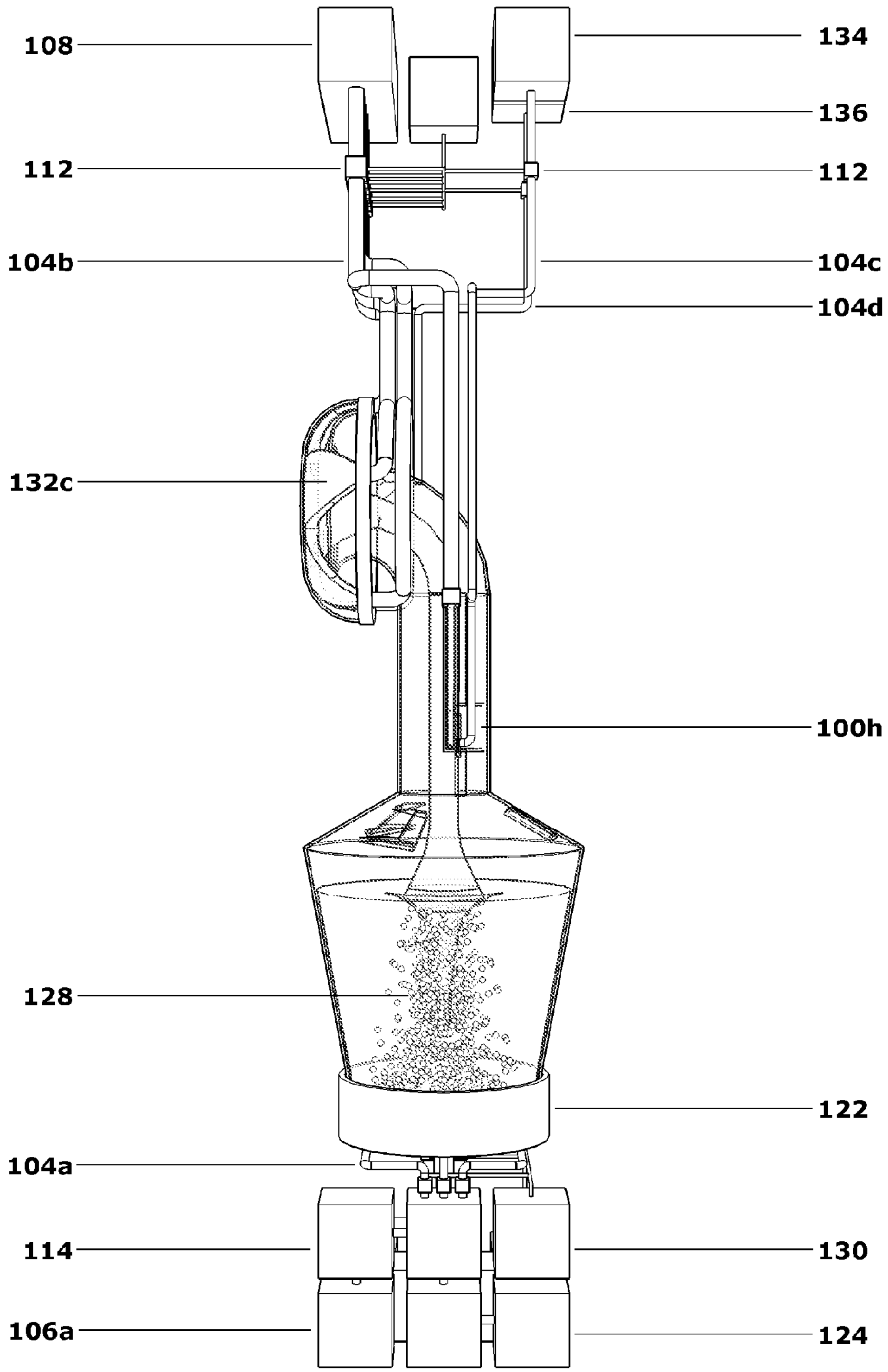
FIG. 1*f* shows a right side view of the fire flower without its cover.
Figure 1G:
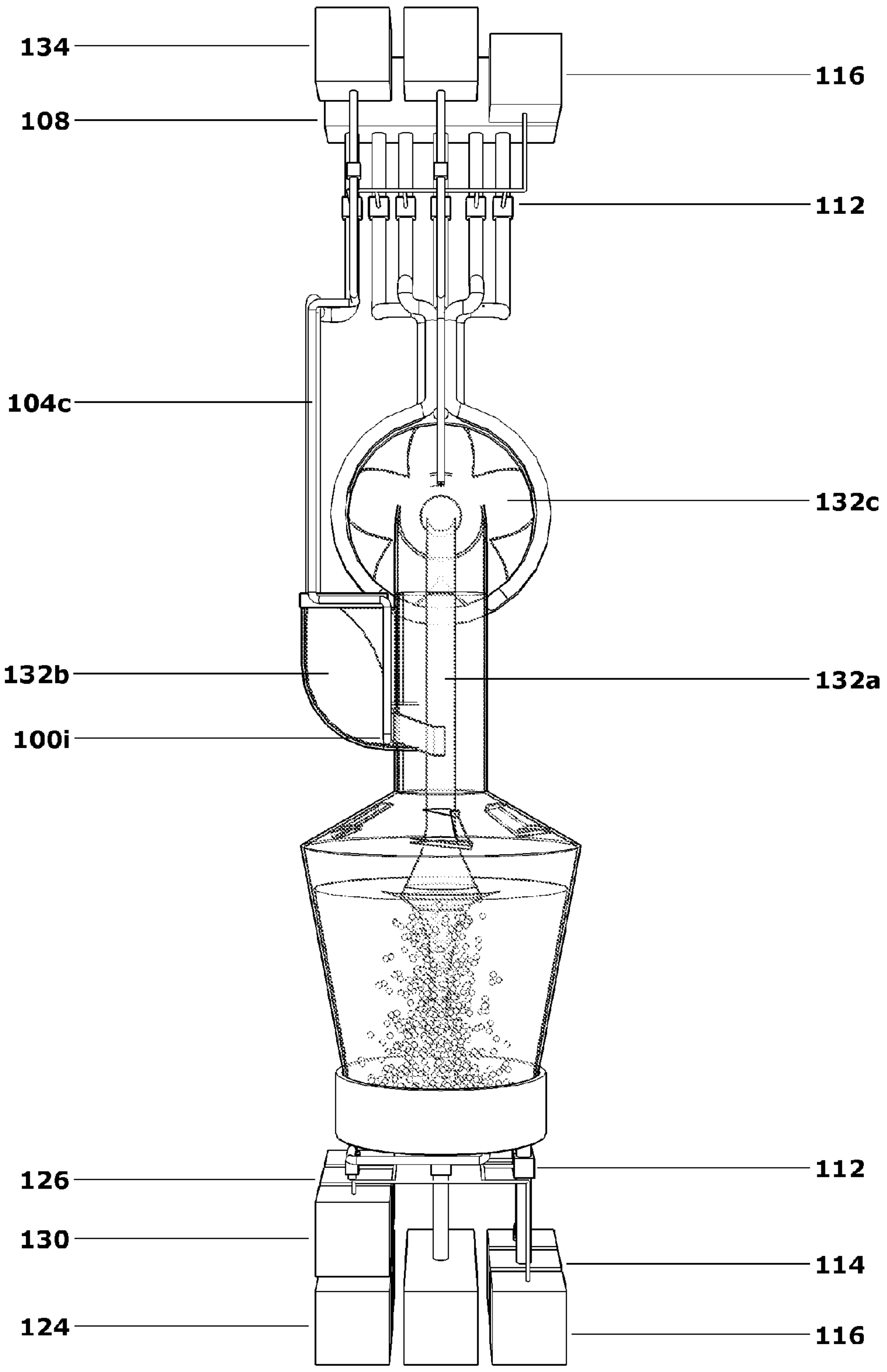
FIG. 1*g* shows a back view of the fire flower without its cover.
Figure 1H:
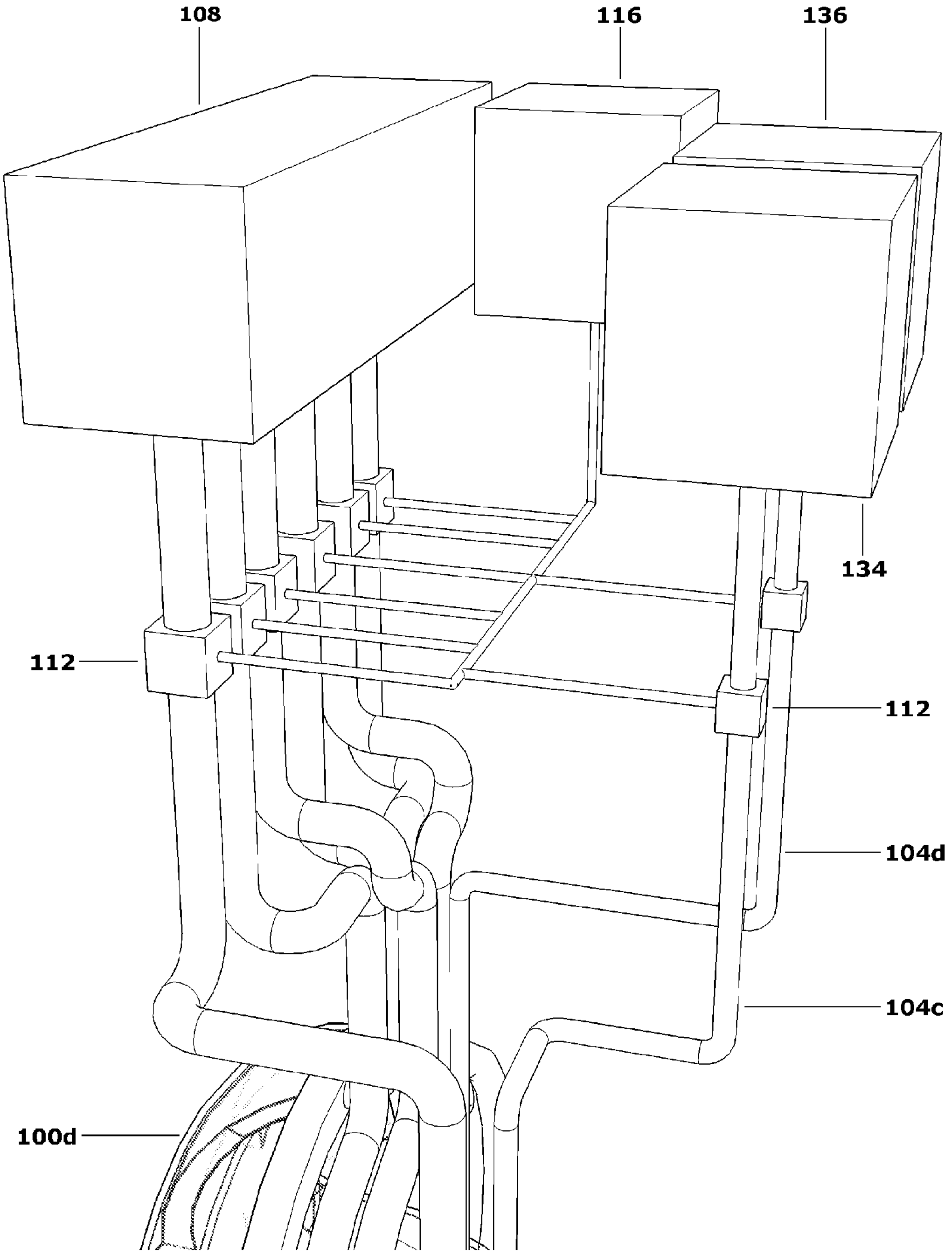
FIG. 1*h* shows a back-right-downward and top close-up view of the fire flower without its cover.
Figure 1I:
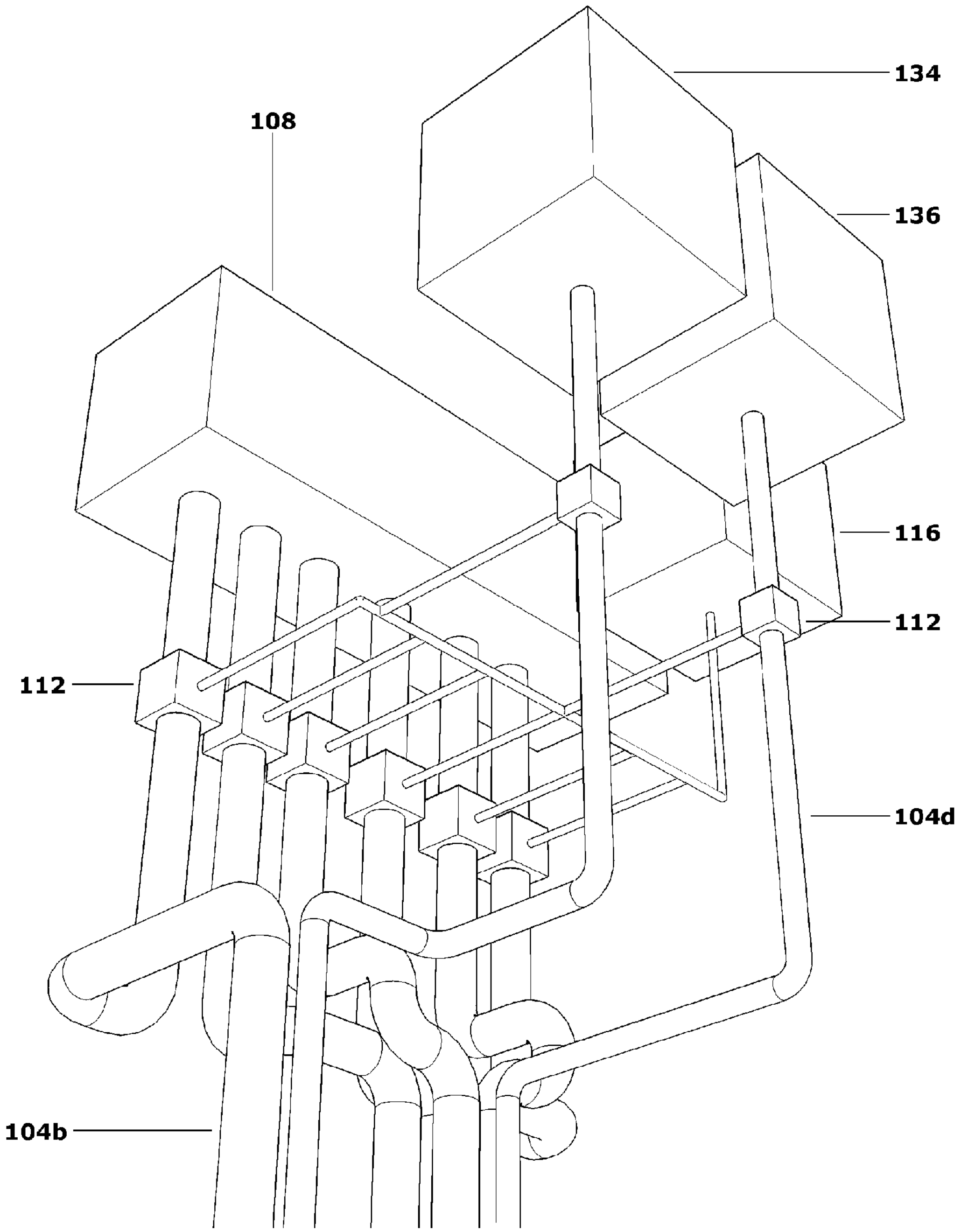
FIG. 1*i* shows a back-right-upward and top close-up view of the fire flower without its cover.
Figure 1J:
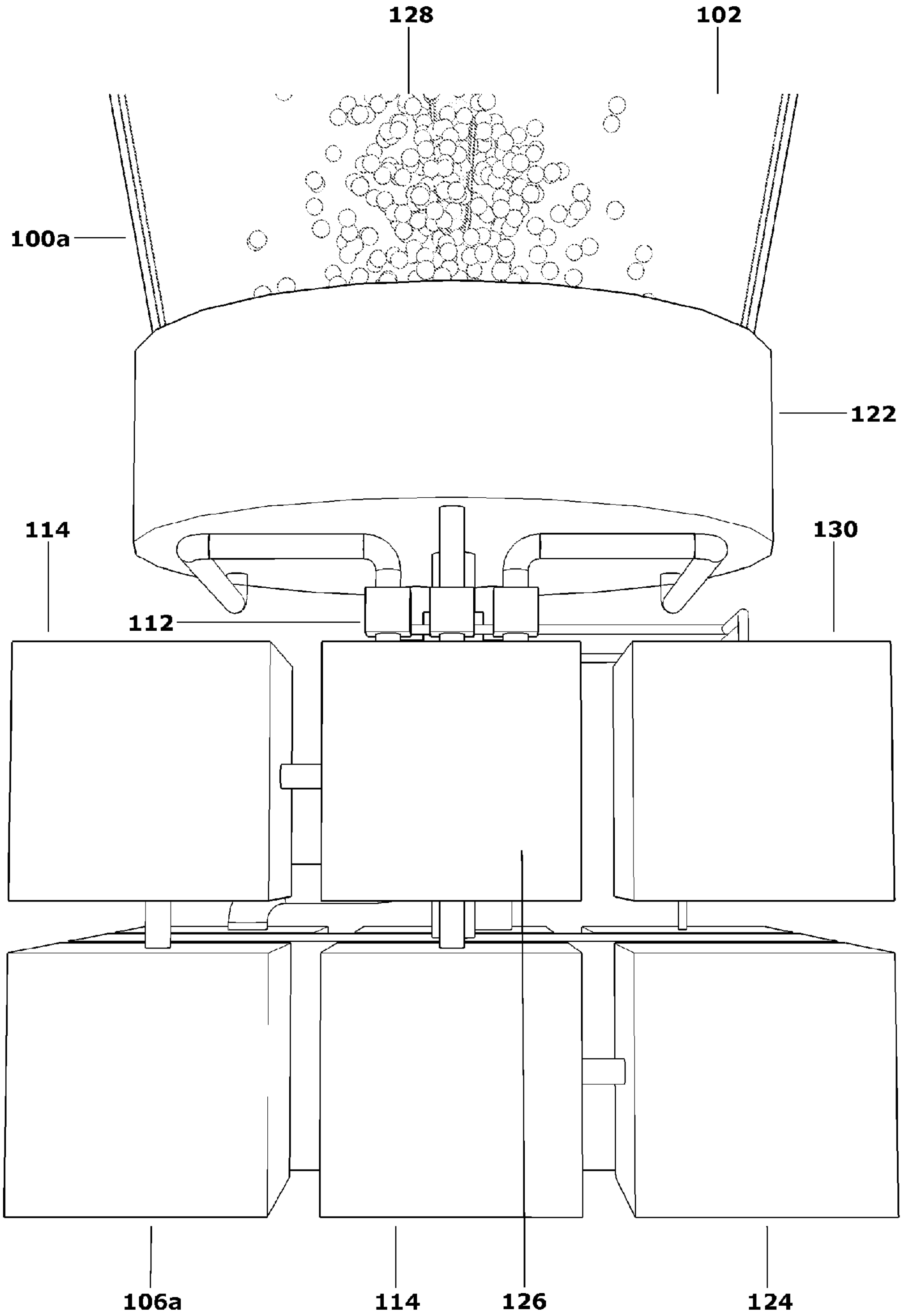
FIG. 1*j* shows a right side and bottom close-up view of the fire flower without its cover.
Figure 1K:
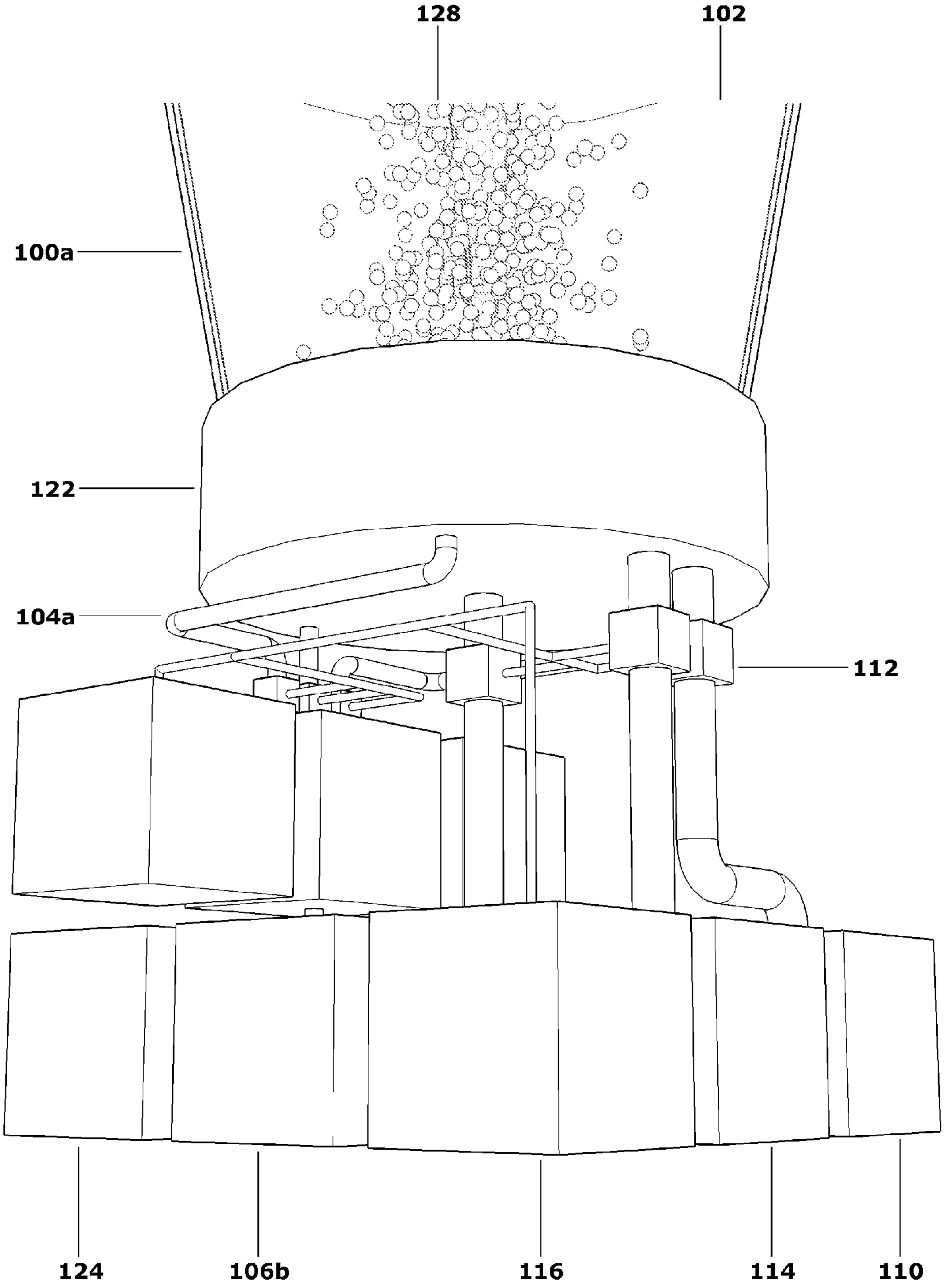
FIG. 1*k* shows a back-left-upward and bottom close-up view of the fire flower without its cover.
Figure 1L:
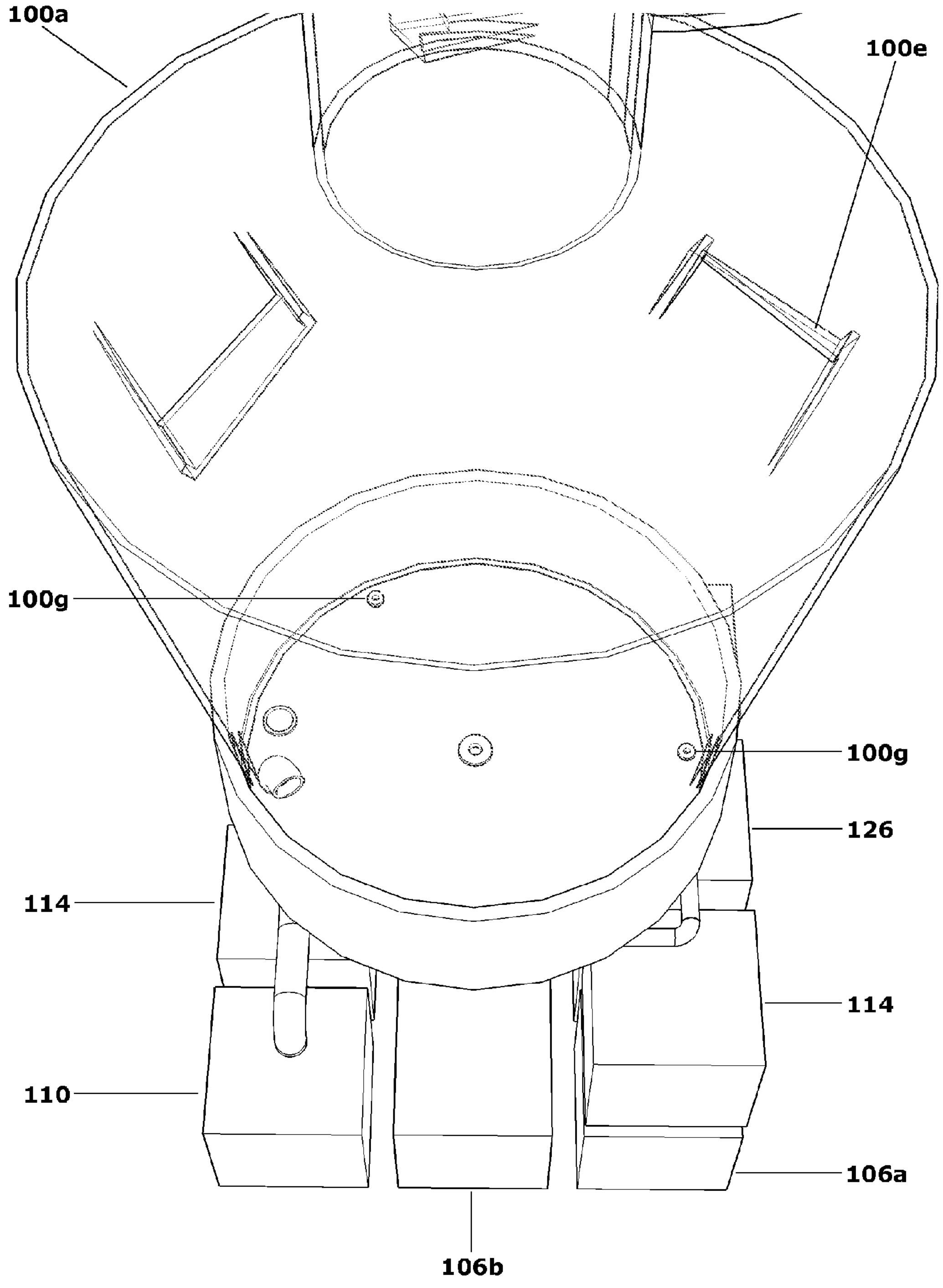
FIG. 1*l* shows a top front and bottom close-up view of the fire flower without fluid.
Figure 1M:
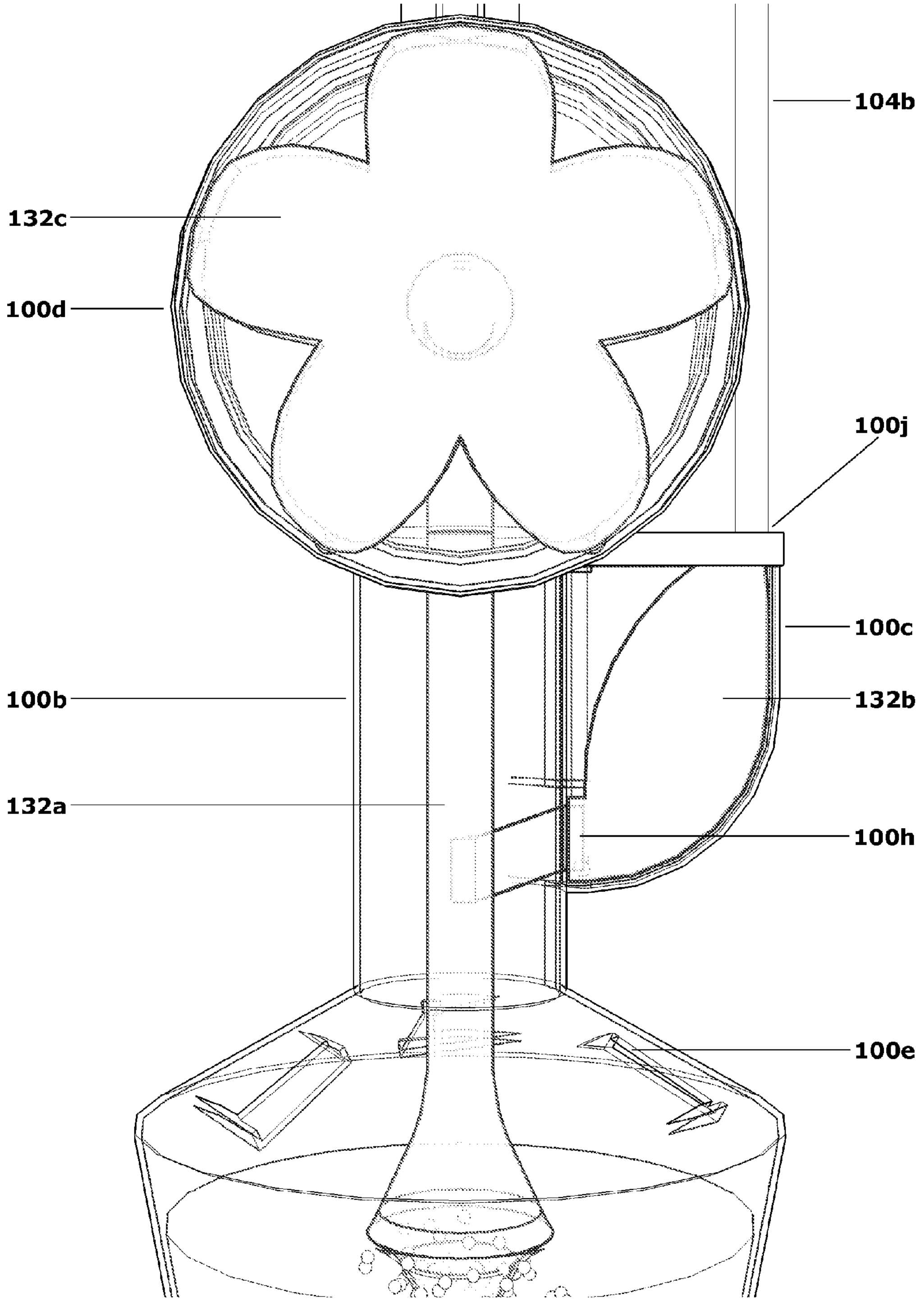
FIG. 1*m* shows a complete front and center close-up view of the fire flower.
Figure 1N:
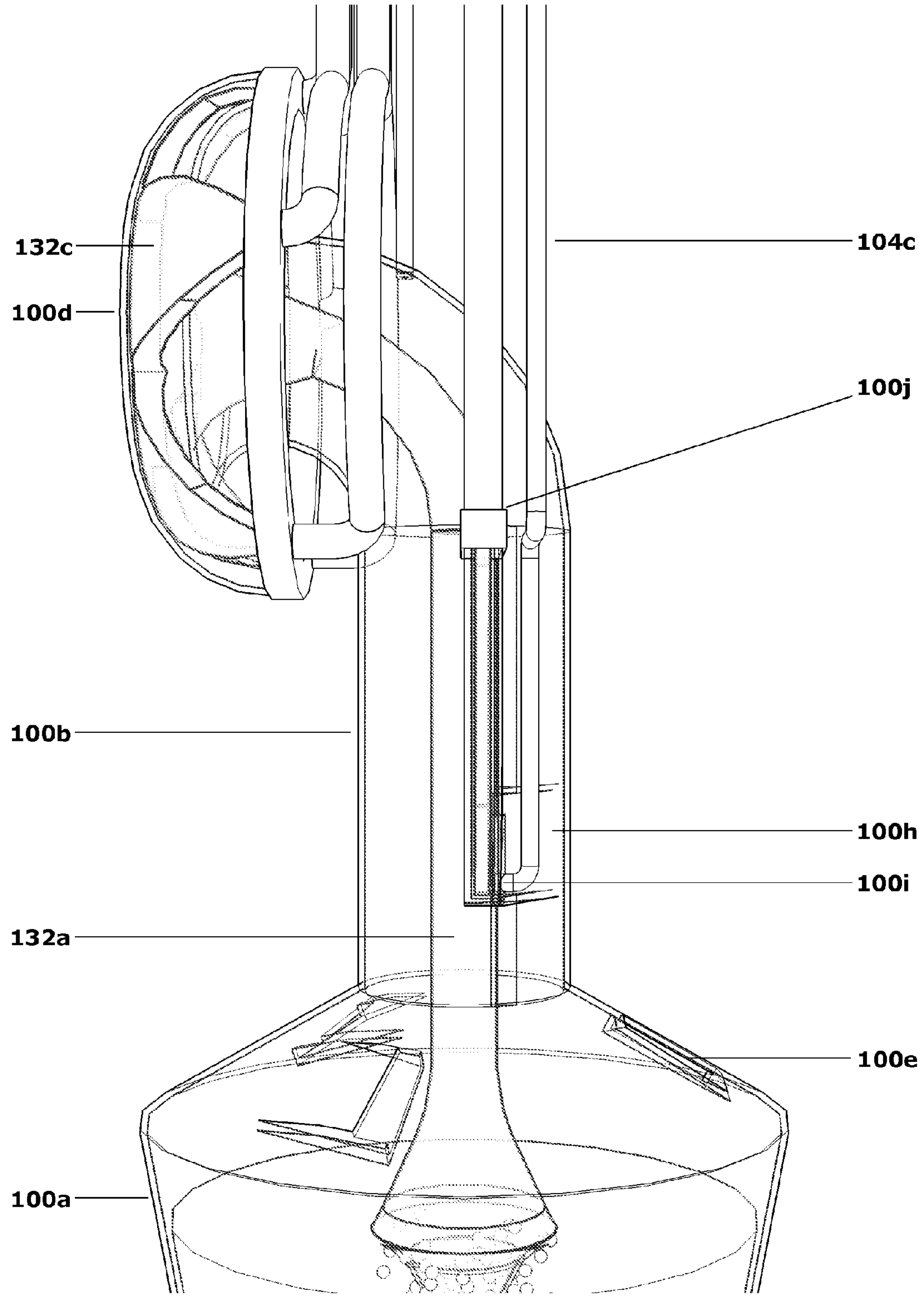
FIG. 1*n* shows a complete right side and center close-up view of the fire flower.
Figure 1O:
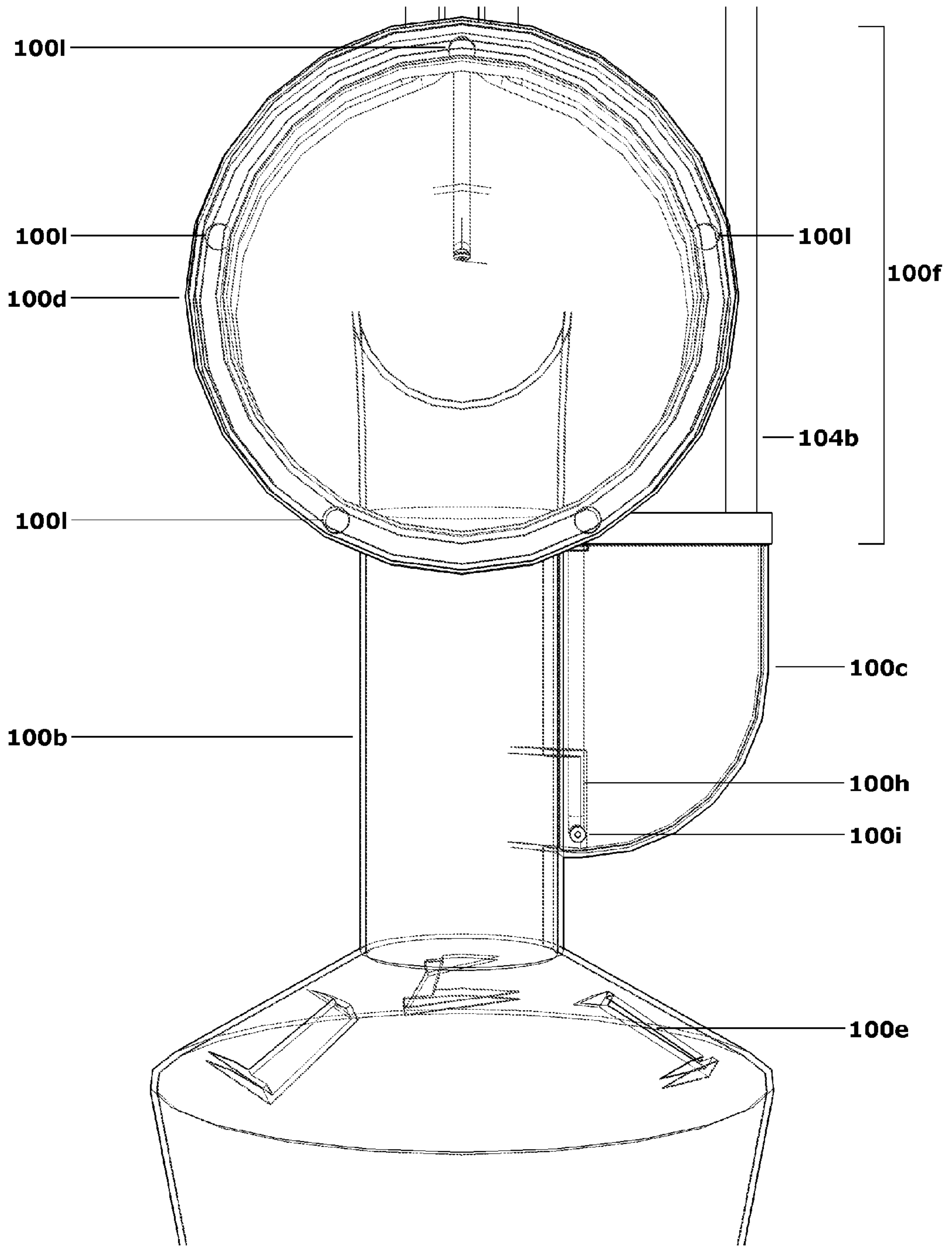
FIG. 1*o* shows a front and center close-up view of the fire flower without a flame.
Figure 1P:
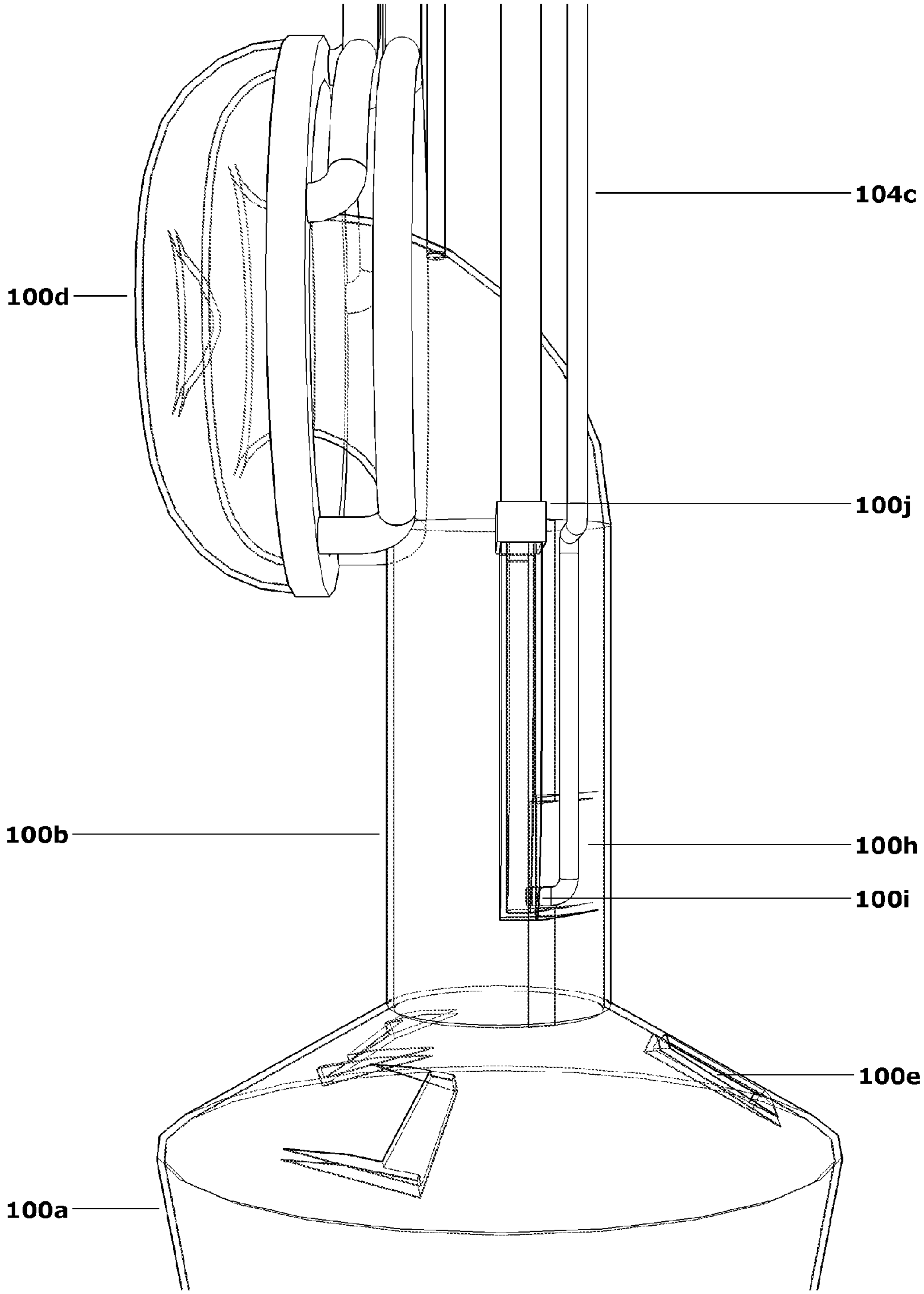
FIG. 1*p* shows a right side and center close-up view of the fire flower without a flame.
Figure 2A:
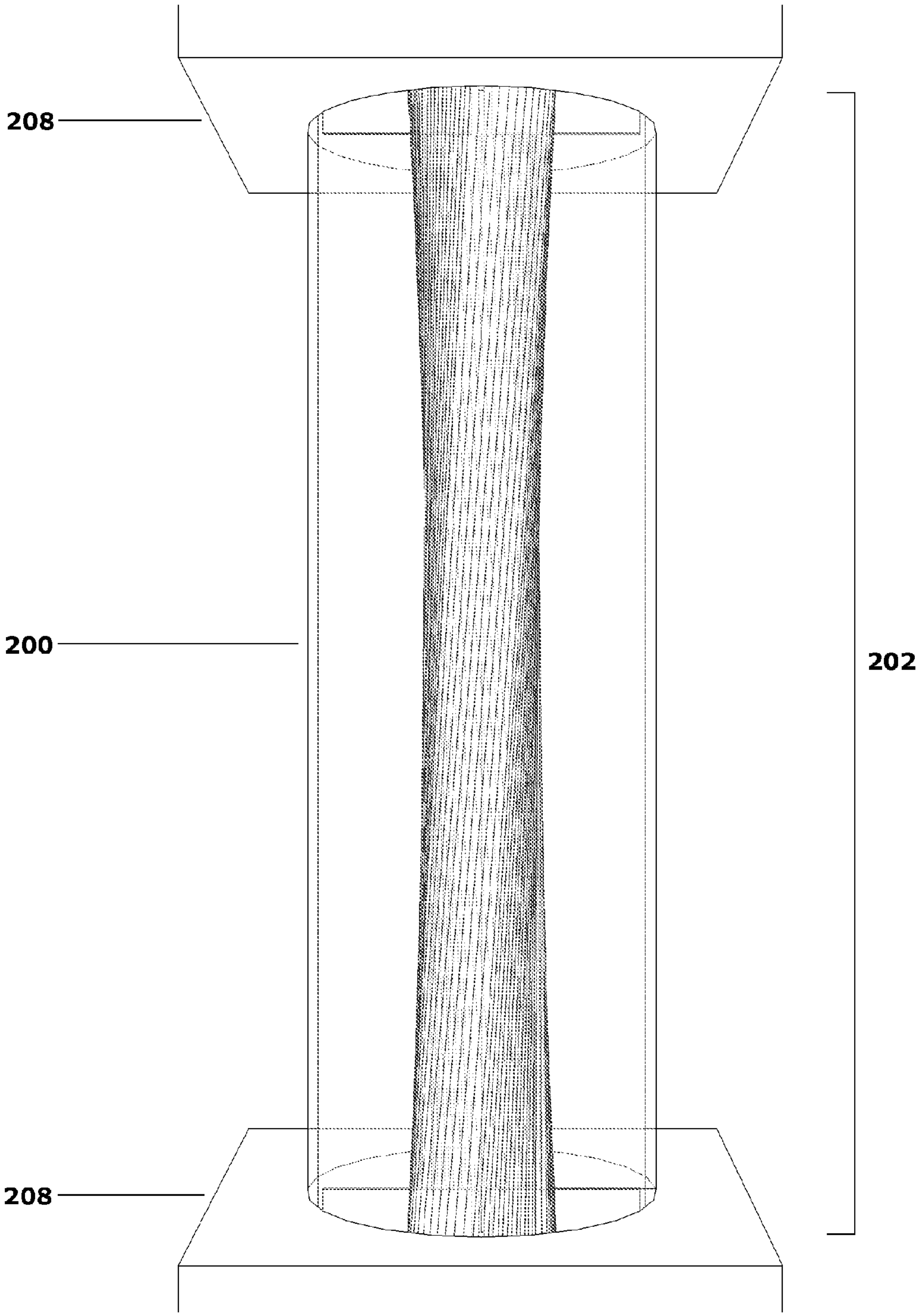
FIG. 2*a* shows a complete front and center close-up view of the fluorescent vortex.
Figure 2B:
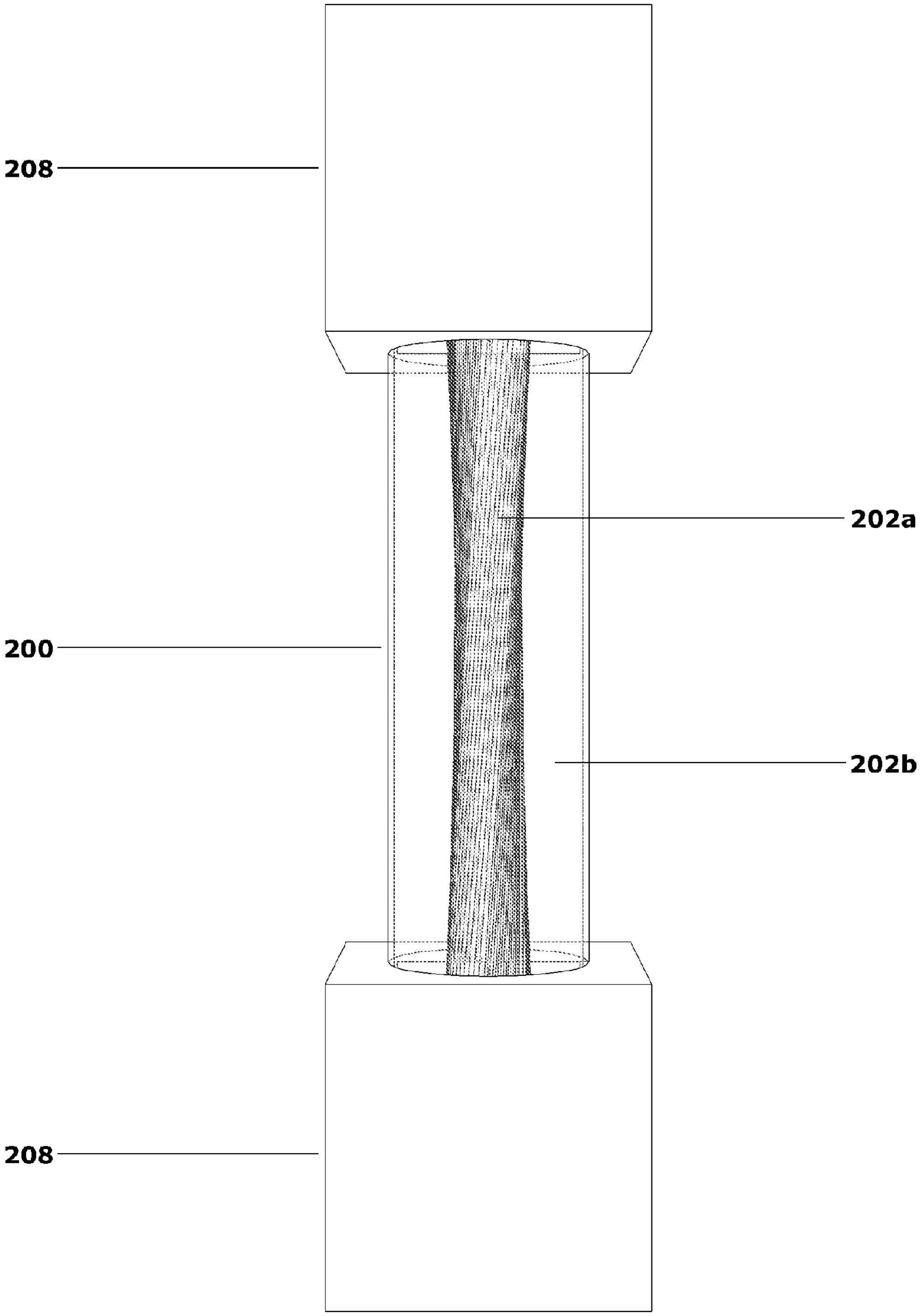
FIG. 2*b* shows a complete front view of the fluorescent vortex.
Figure 2C:
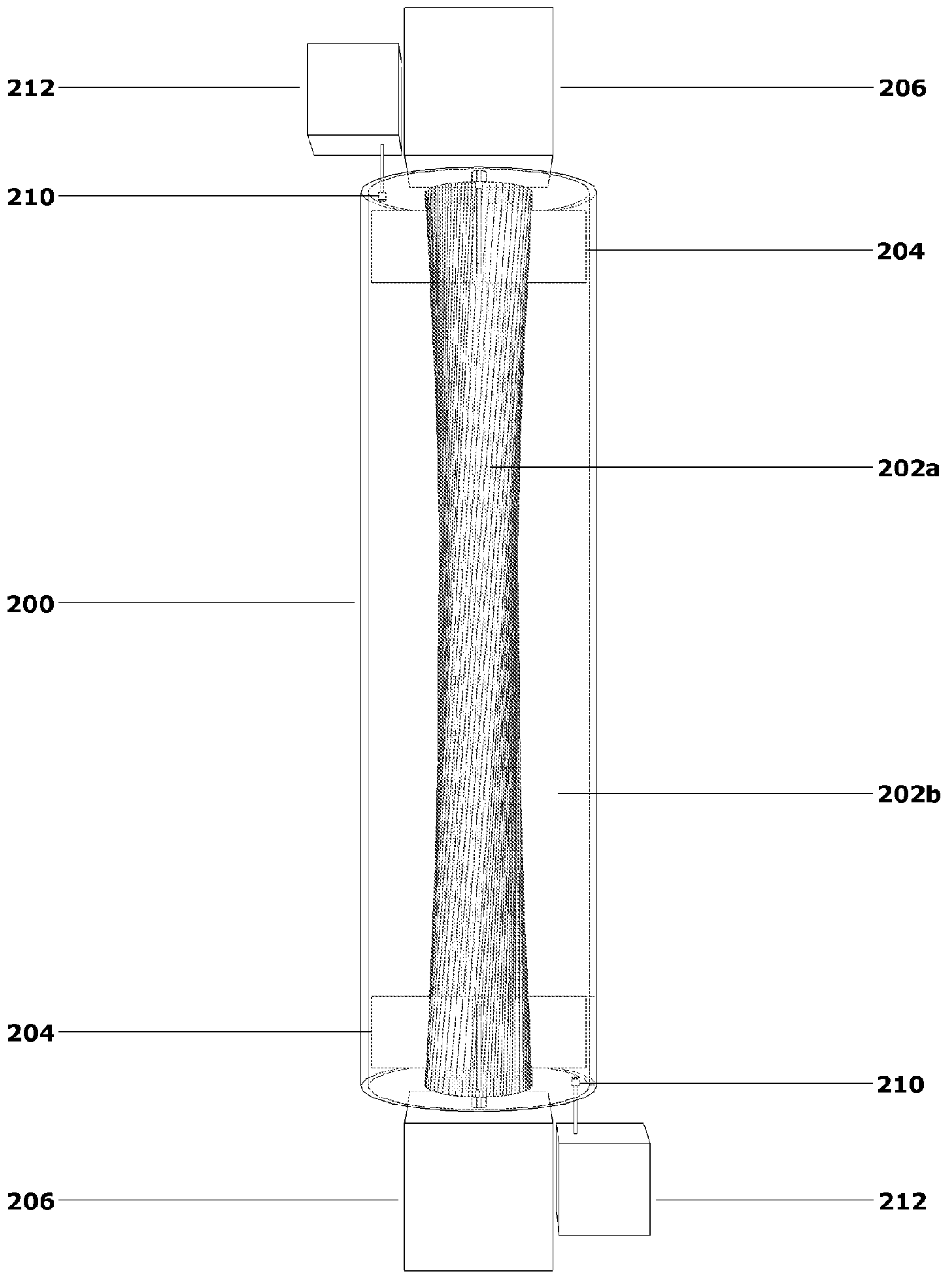
FIG. 2*c* shows a front view of the fluorescent vortex without its cover.
Figure 2D:
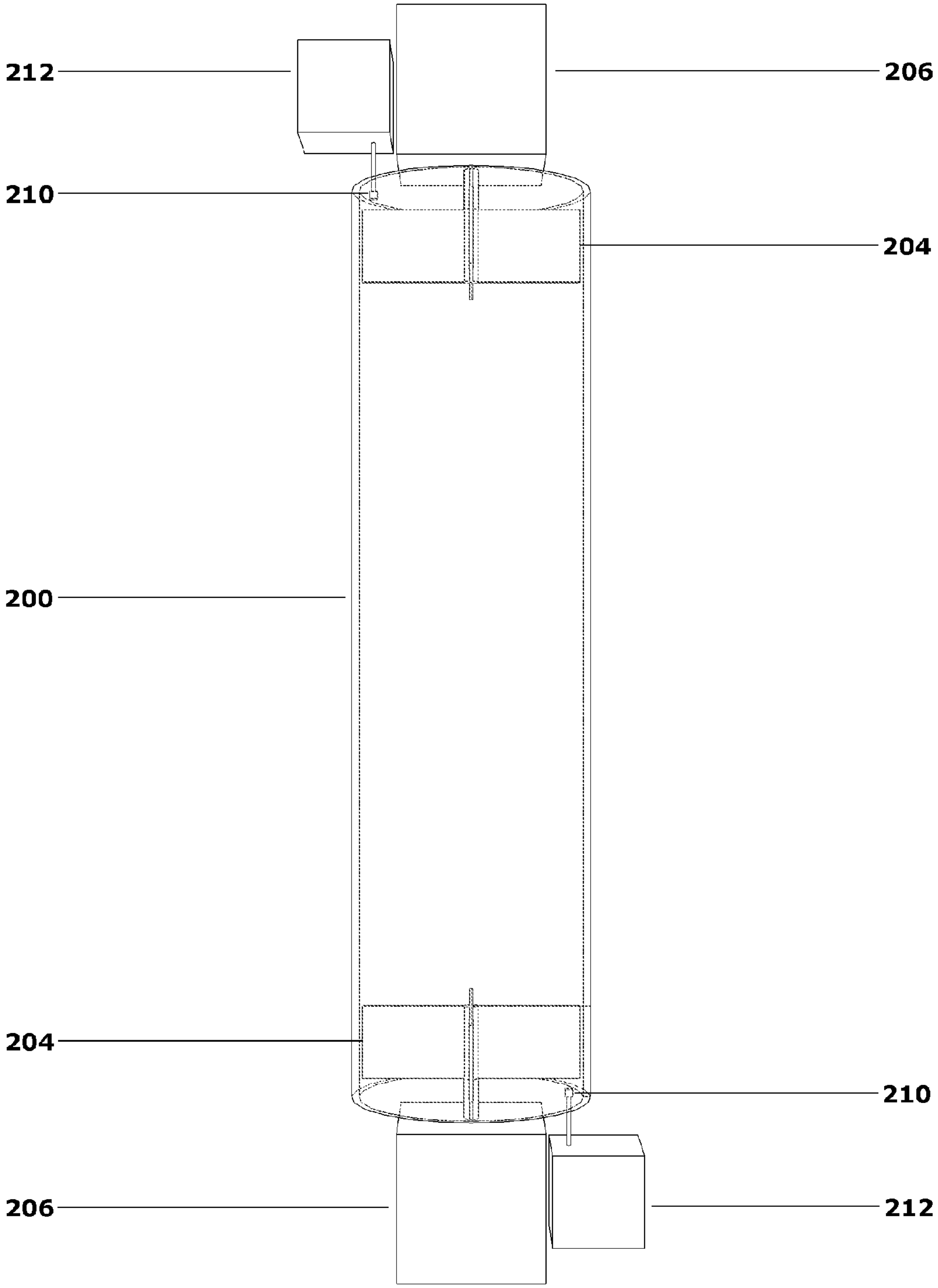
FIG. 2*d* shows a front view of the fluorescent vortex without its cover and without fluid.
Figure 2E:
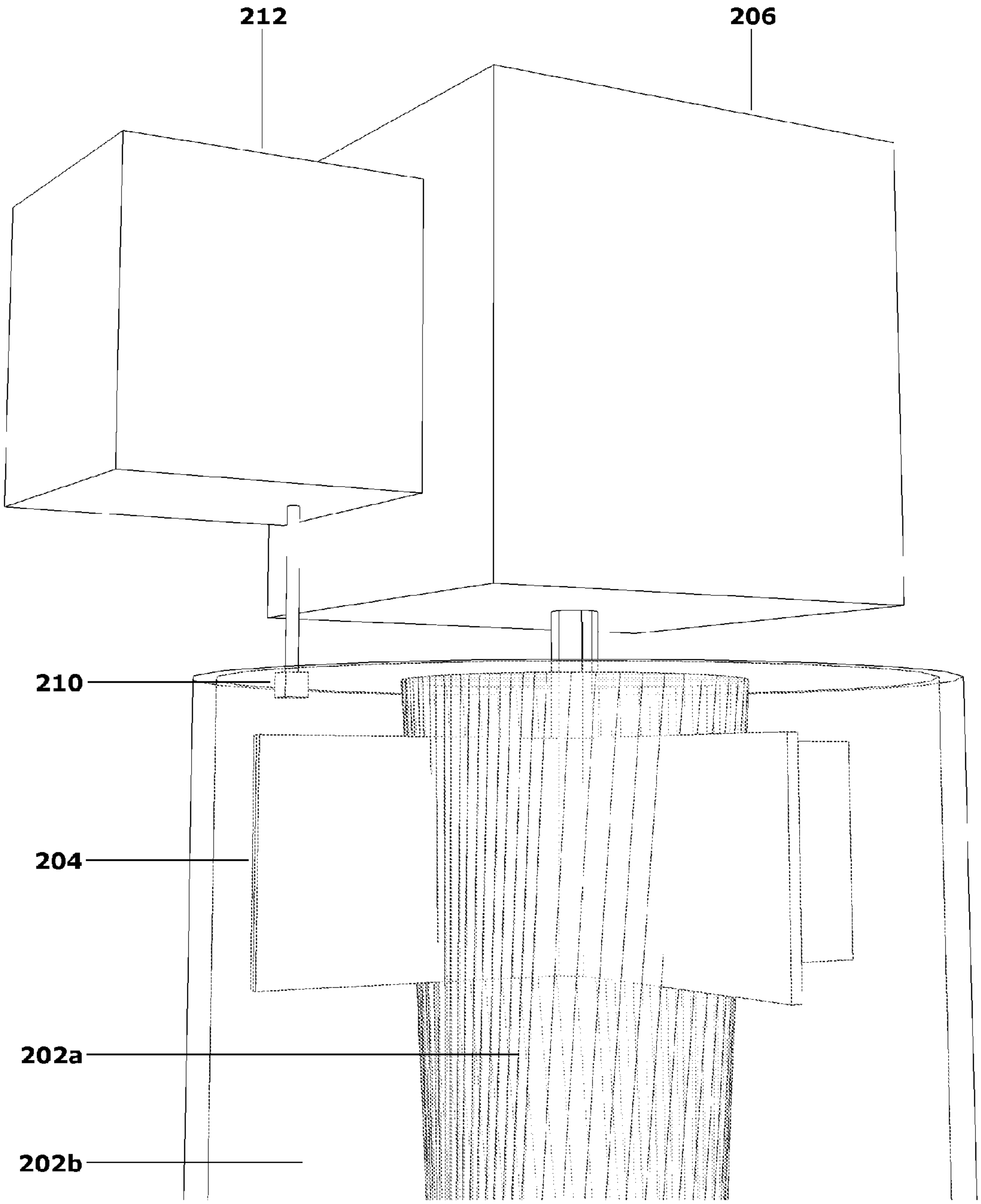
FIG. 2*e* shows a front right and top close-up view of the fluorescent vortex without its cover.
Figure 2F:
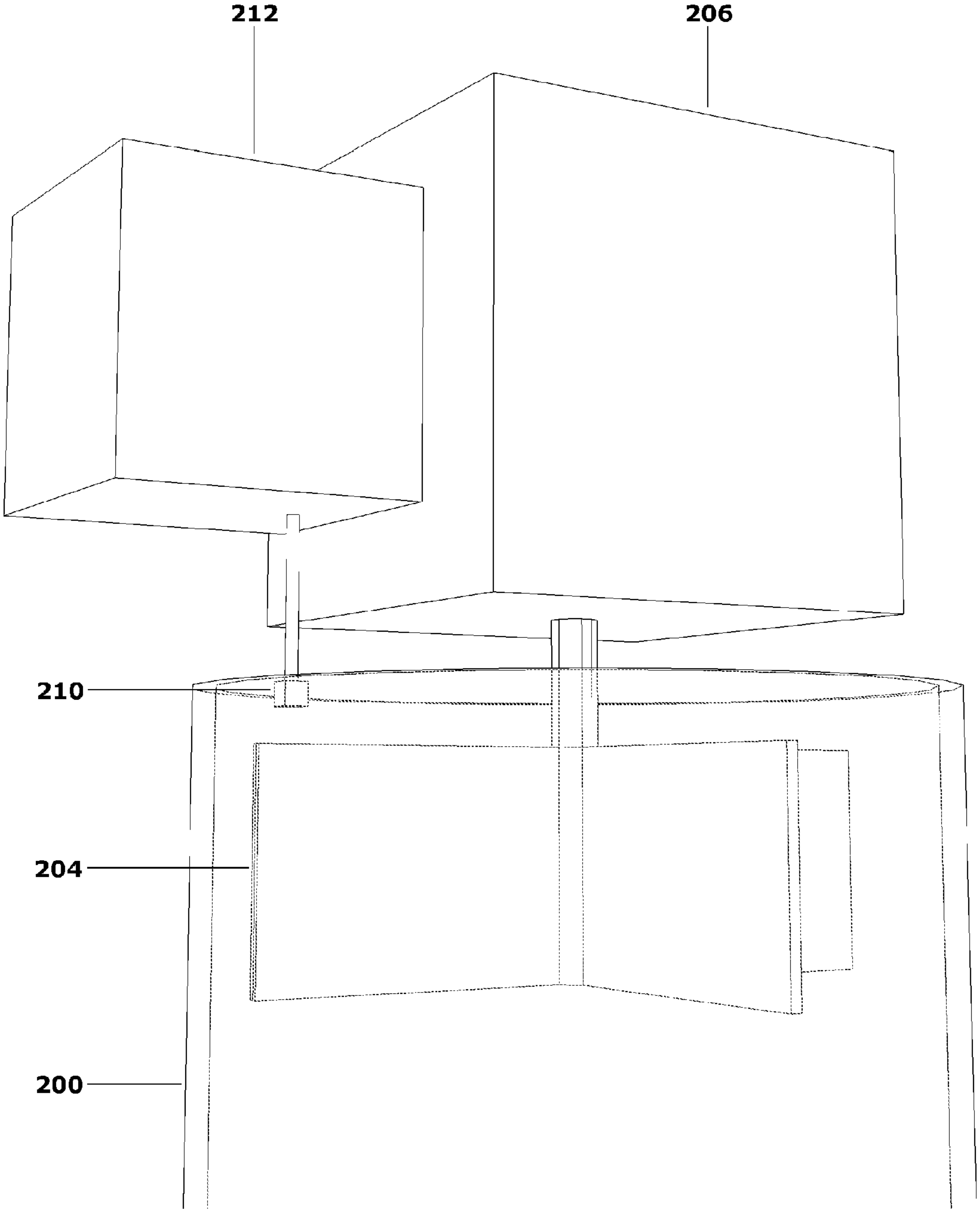
FIG. 2*f* shows a front right and top close-up view of the fluorescent vortex without its cover and without fluid.
Figure 2G:
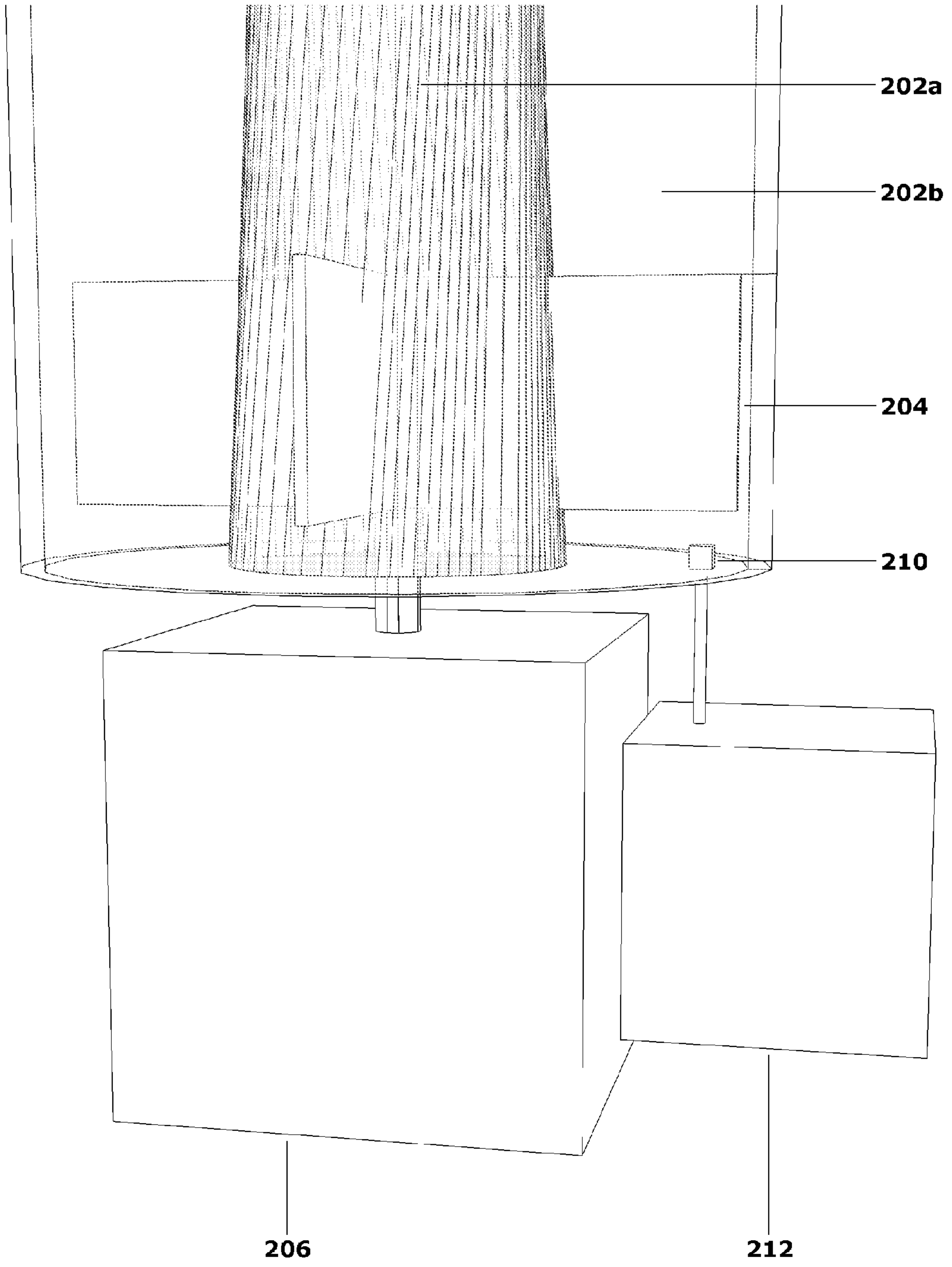
FIG. 2*g* shows a front left and bottom close-up view of the fluorescent vortex without its cover.
Figure 2H:
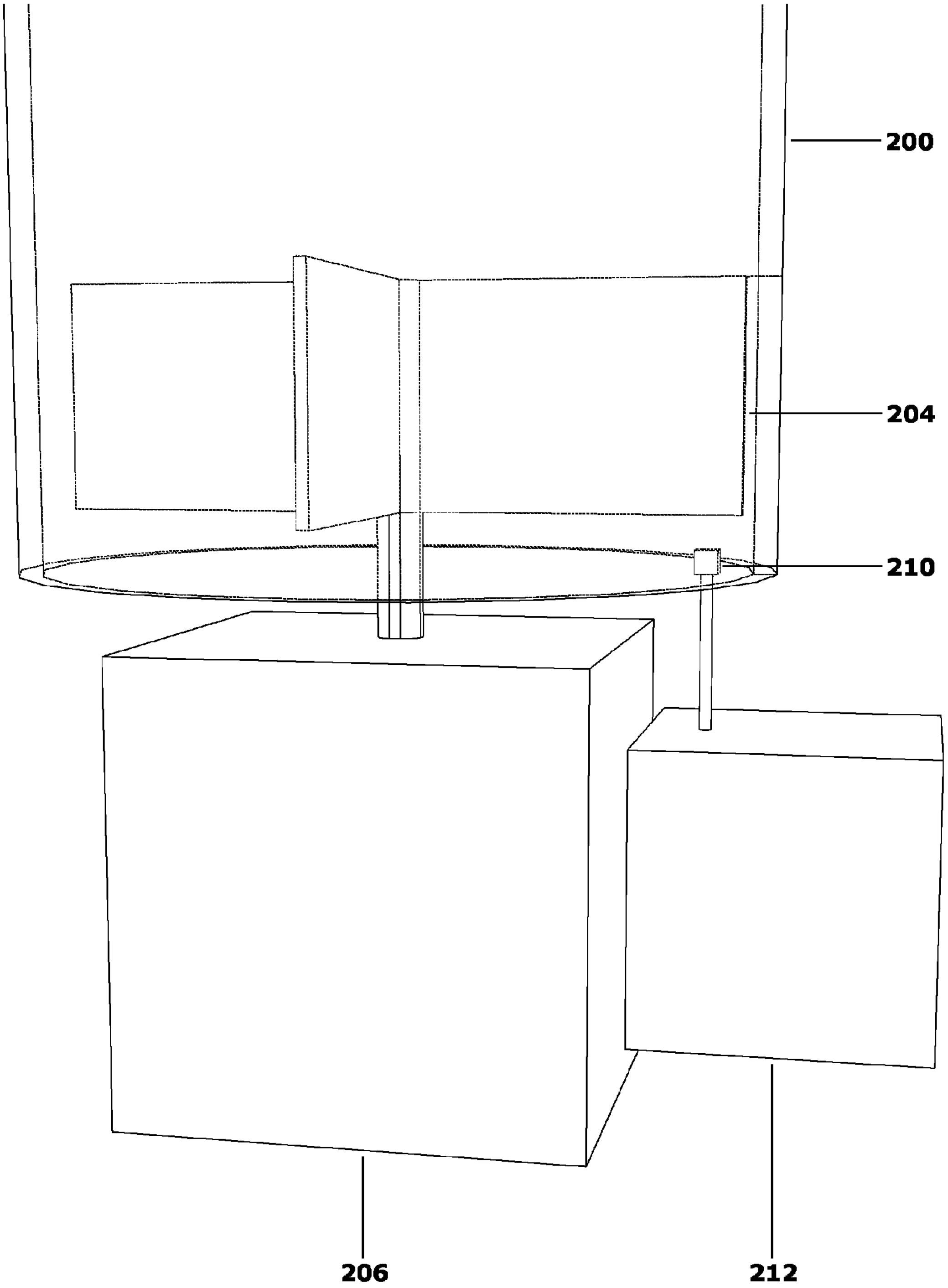
FIG. 2*h* shows a front left and bottom close-up view of the fluorescent vortex without its cover and without fluids.
Figure 3A:
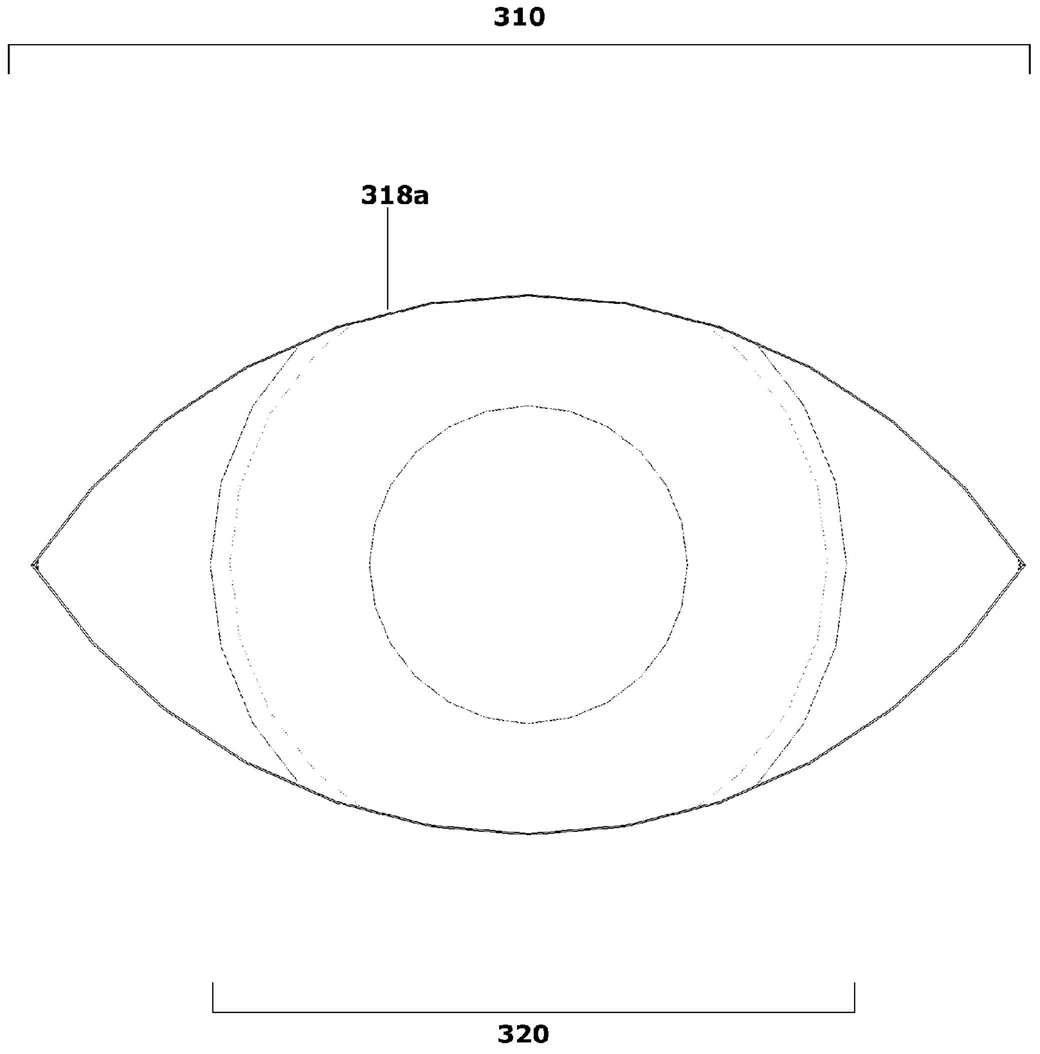
FIG. 3*a* shows a complete front and center close-up view of the luminous fluid eye.
Figure 3B:
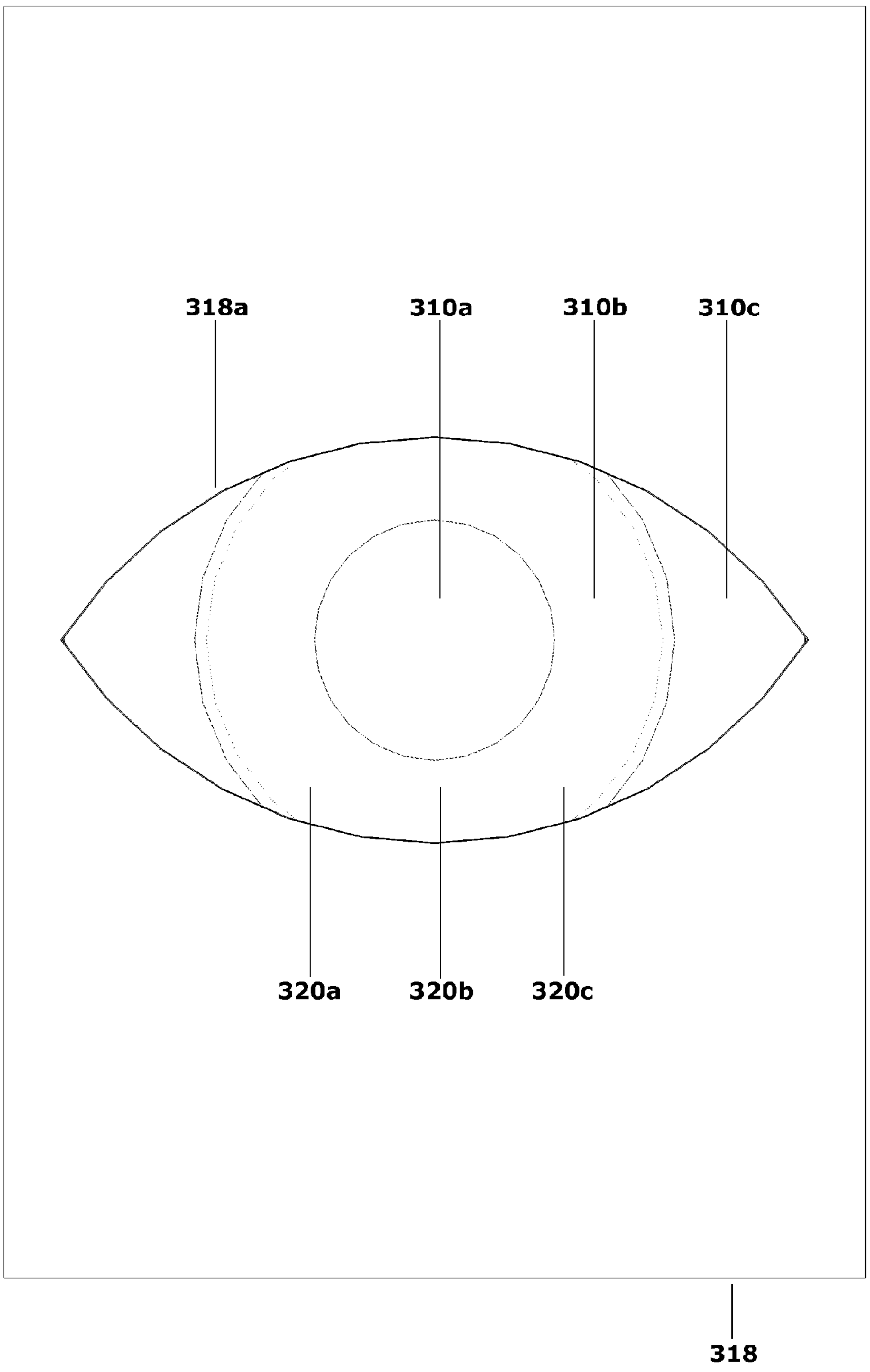
FIG. 3*b* shows a complete front view of the luminous fluid eye.
Figure 3C:
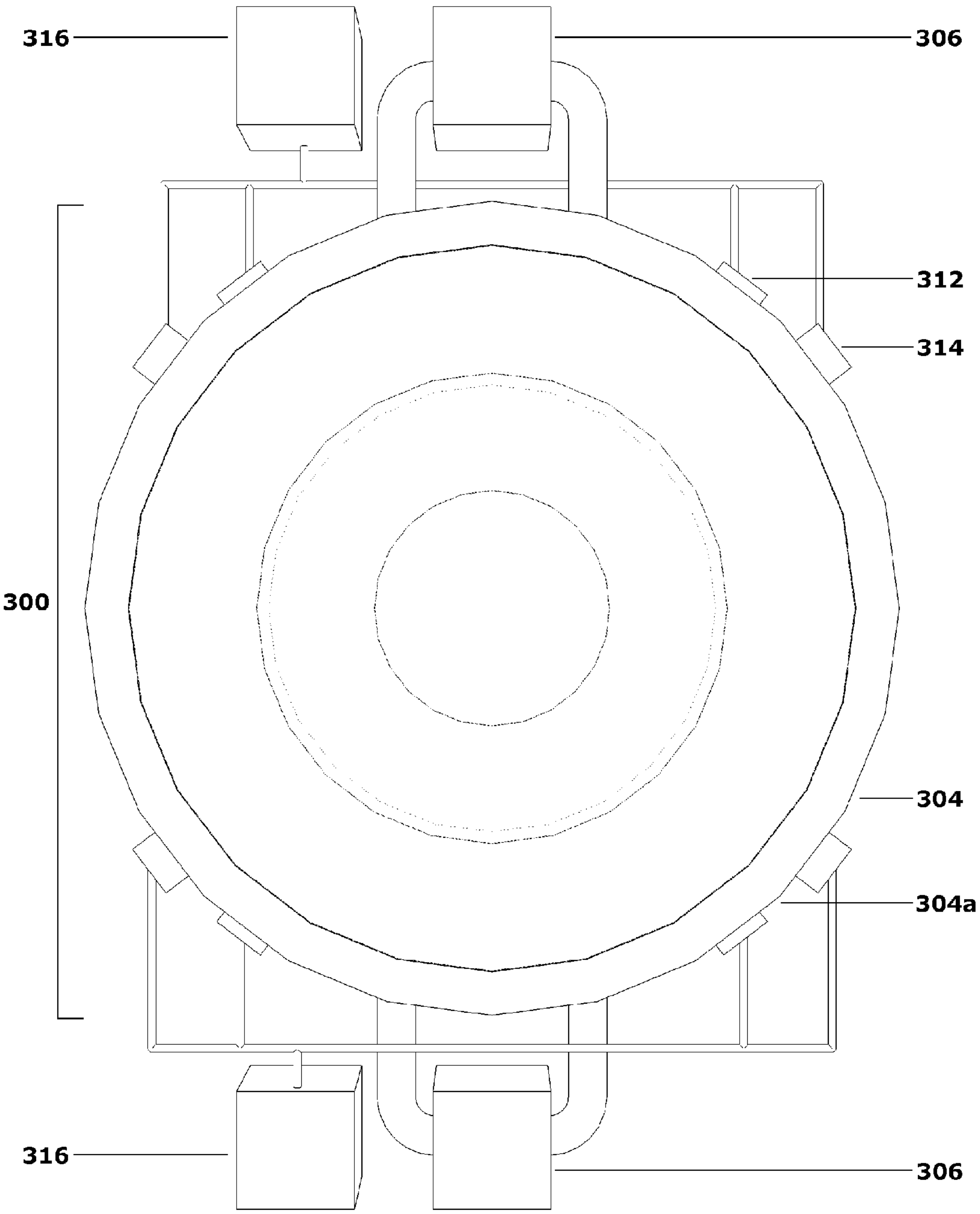
FIG. 3*c* shows a front view of the luminous fluid eye without its cover.
Figure 3D:
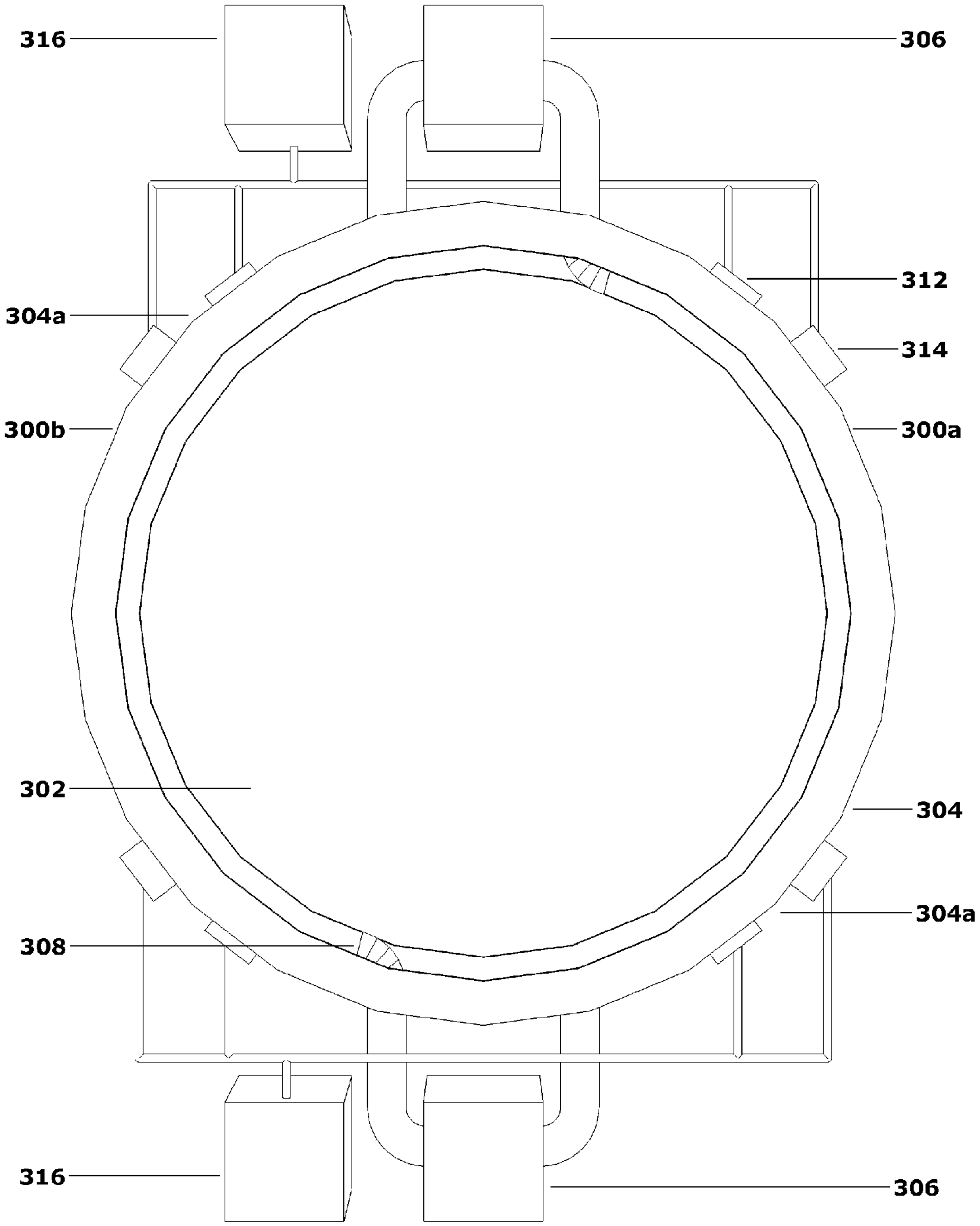
FIG. 3*d* shows a front view of the luminous fluid eye without its cover and without fluid.
Figure 3E:
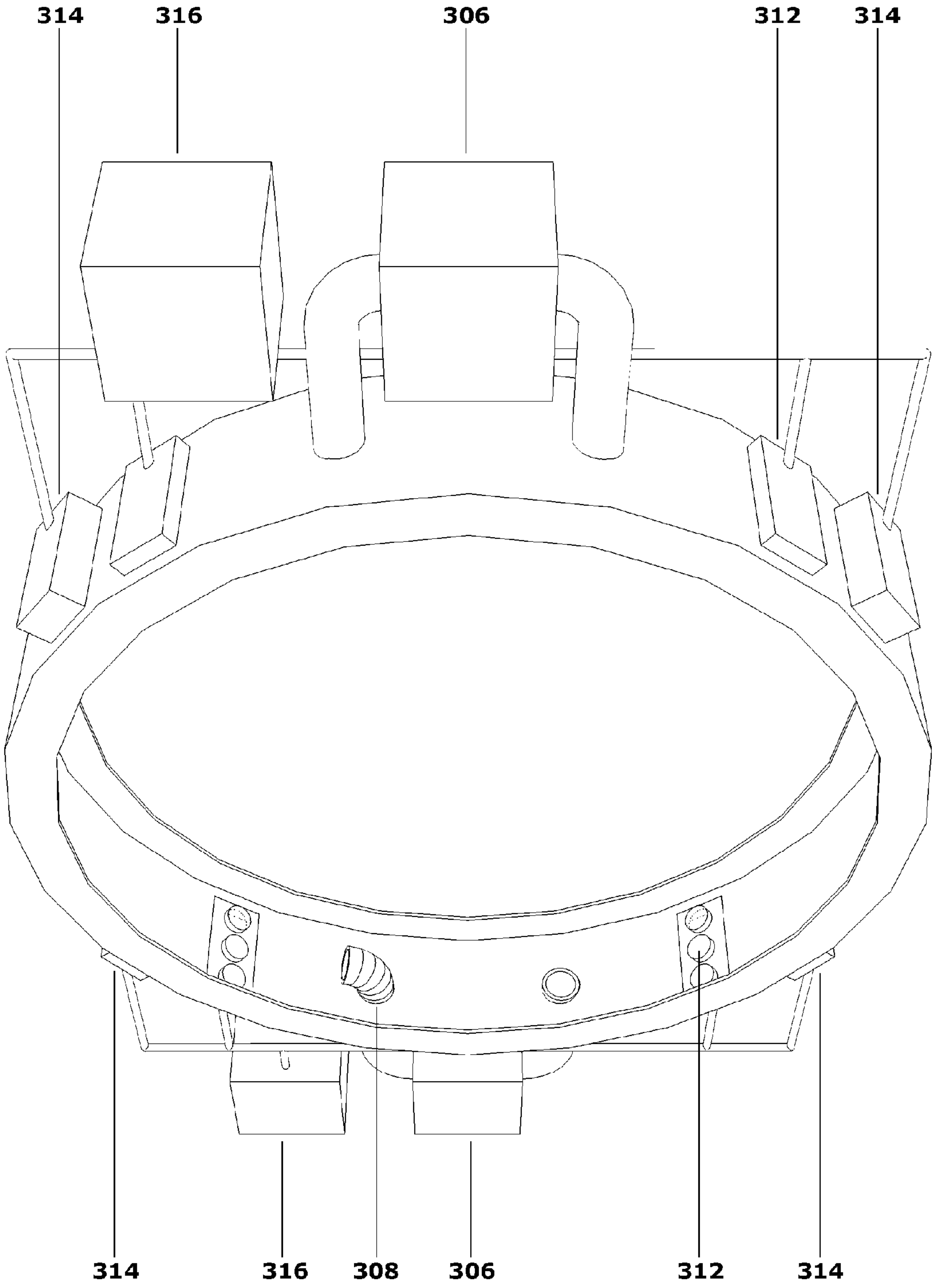
FIG. 3*e* shows a top front view of the luminous fluid eye without its cover and without fluid.
Figure 3F:
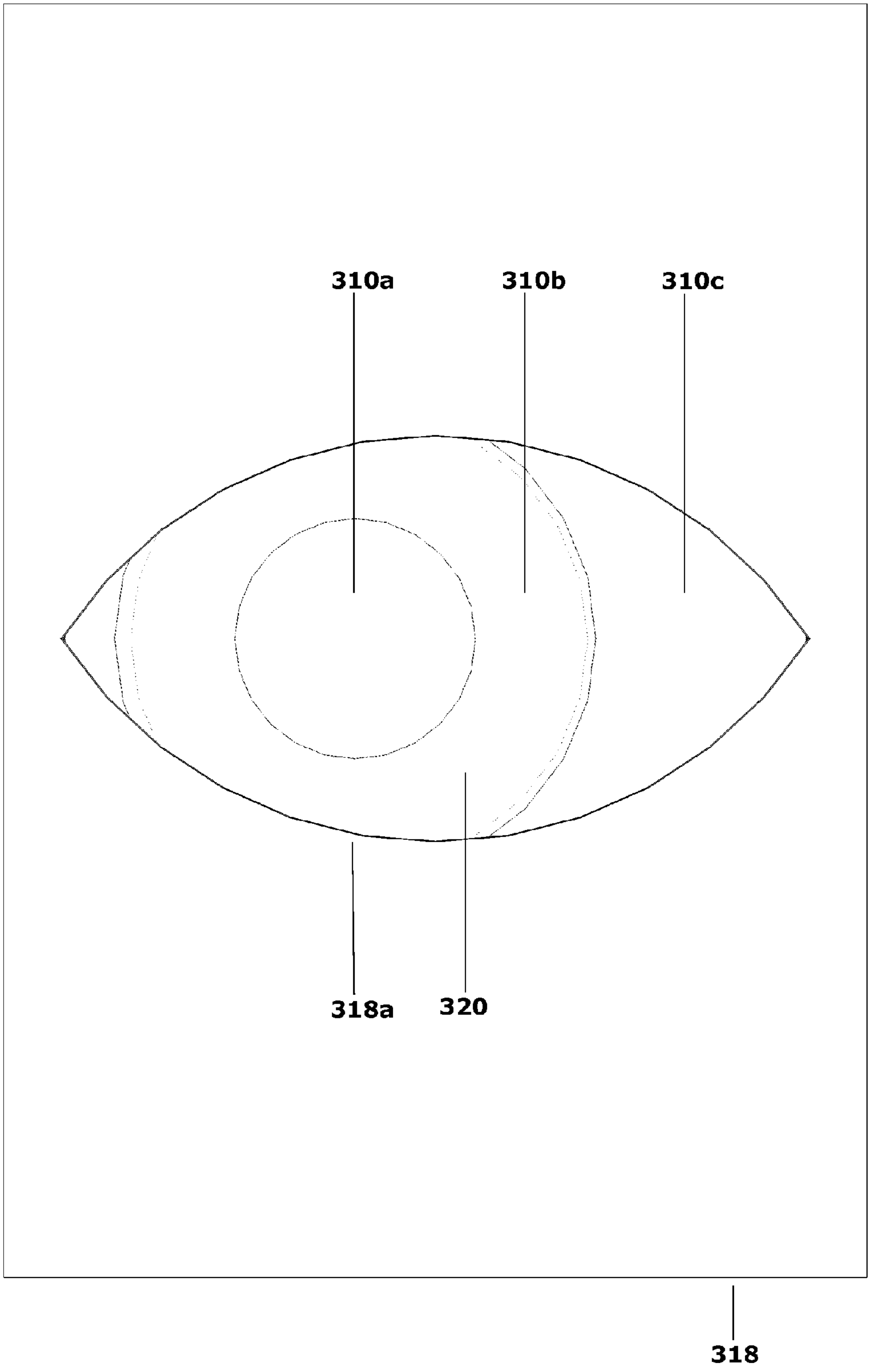
FIG. 3*f* shows a complete front view of the luminous fluid eye with the fluid in the second position.
Figure 3G:
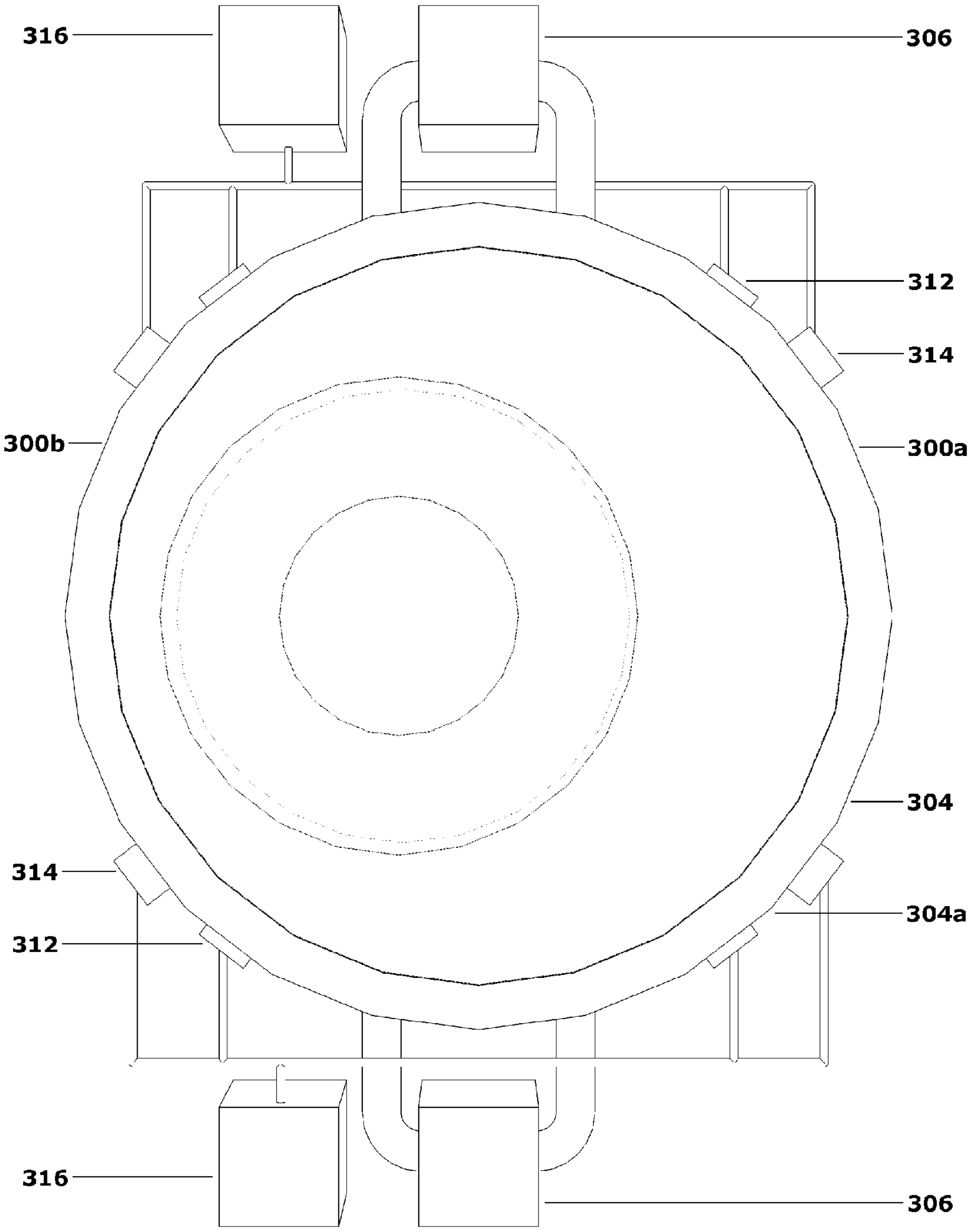
FIG. 3*g* shows a front view of the luminous fluid eye without its cover and with the fluid in the second position.
Figure 4A:
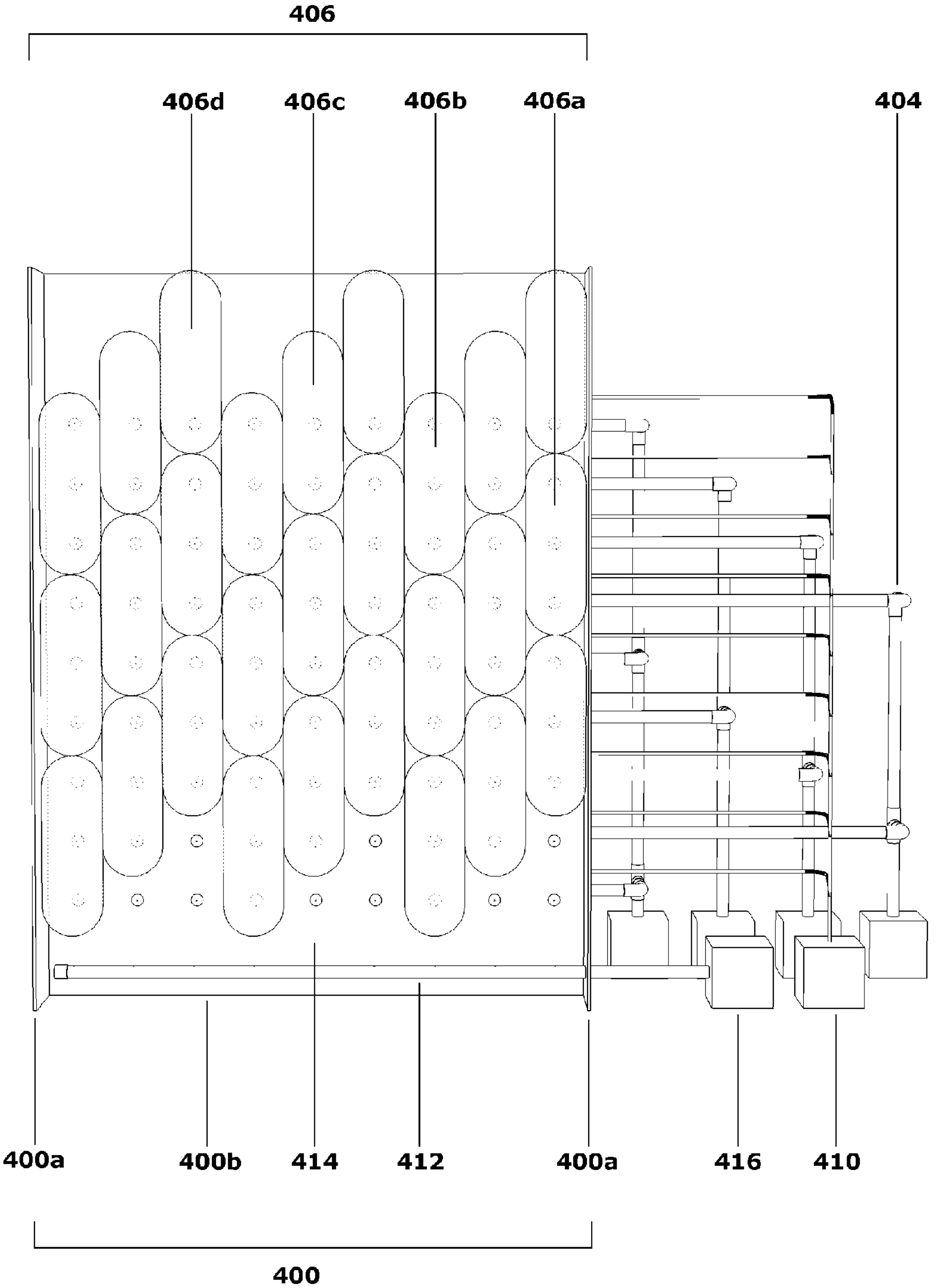
FIG. 4*a* shows a complete front view of the heat printer.
Figure 4B:
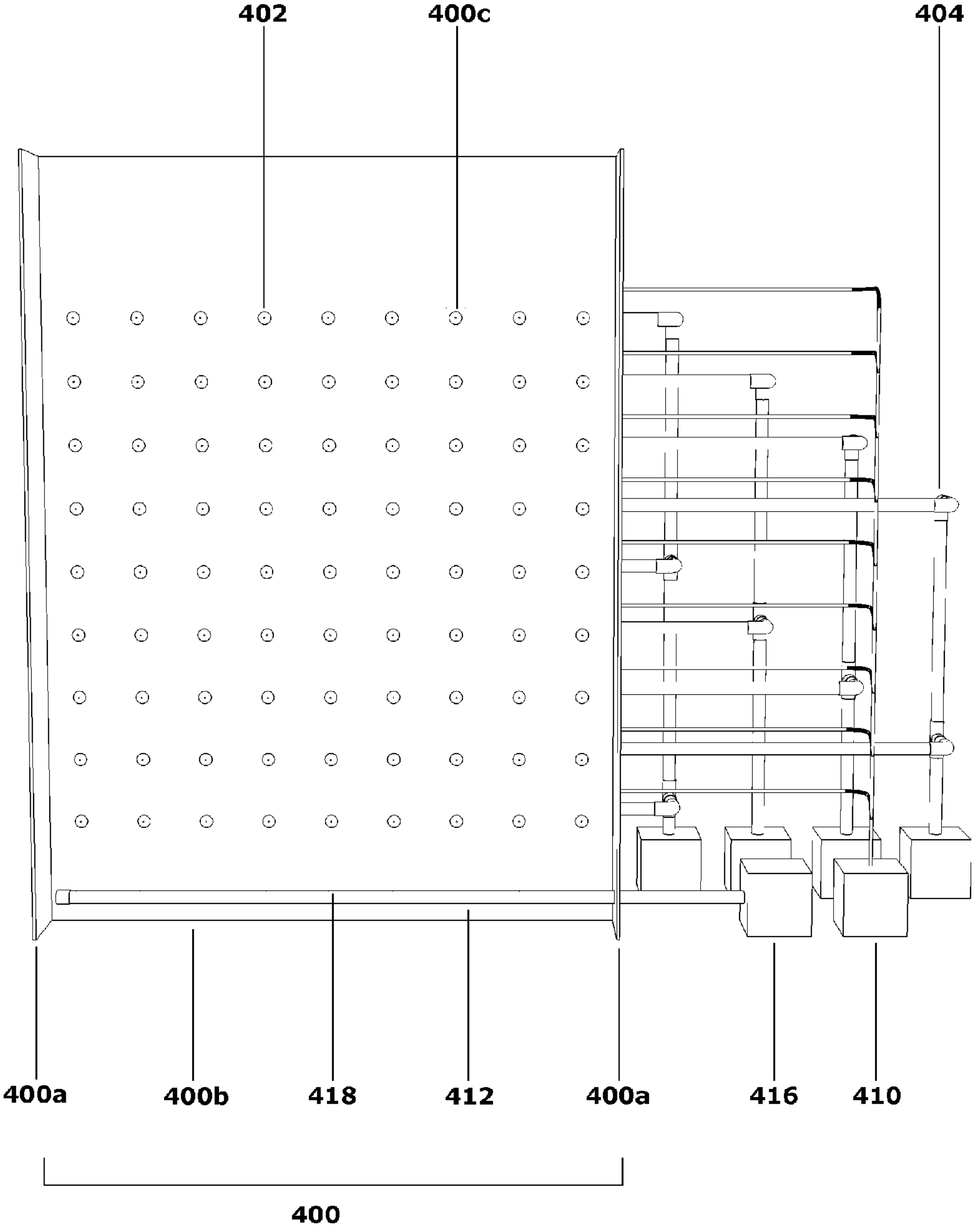
FIG. 4*b* shows a complete front view of the heat printer without heated air flowing through the device.
Figure 4C:
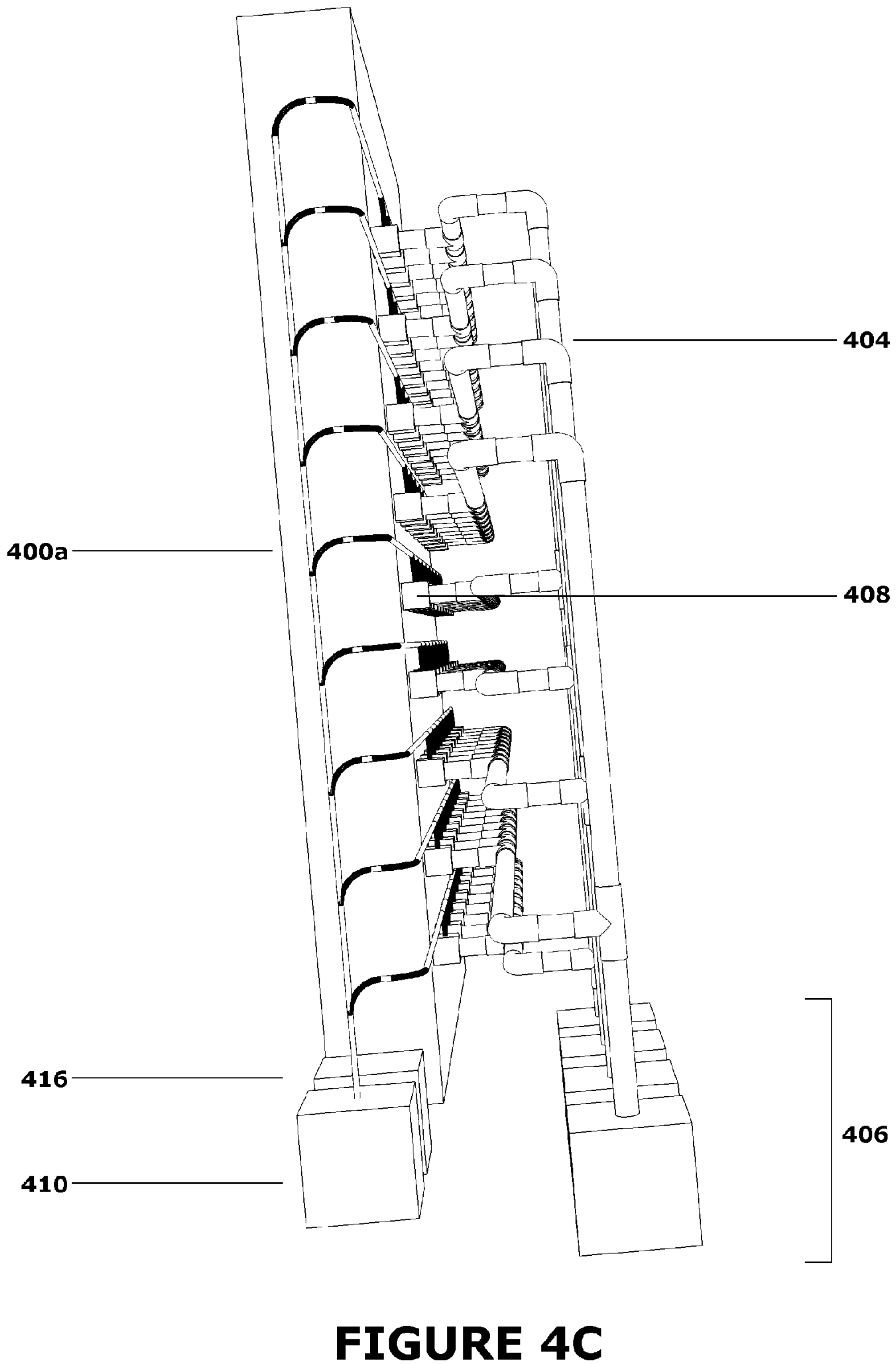
FIG. 4*c* shows a complete right side view of the heat printer.
Figure 4D:
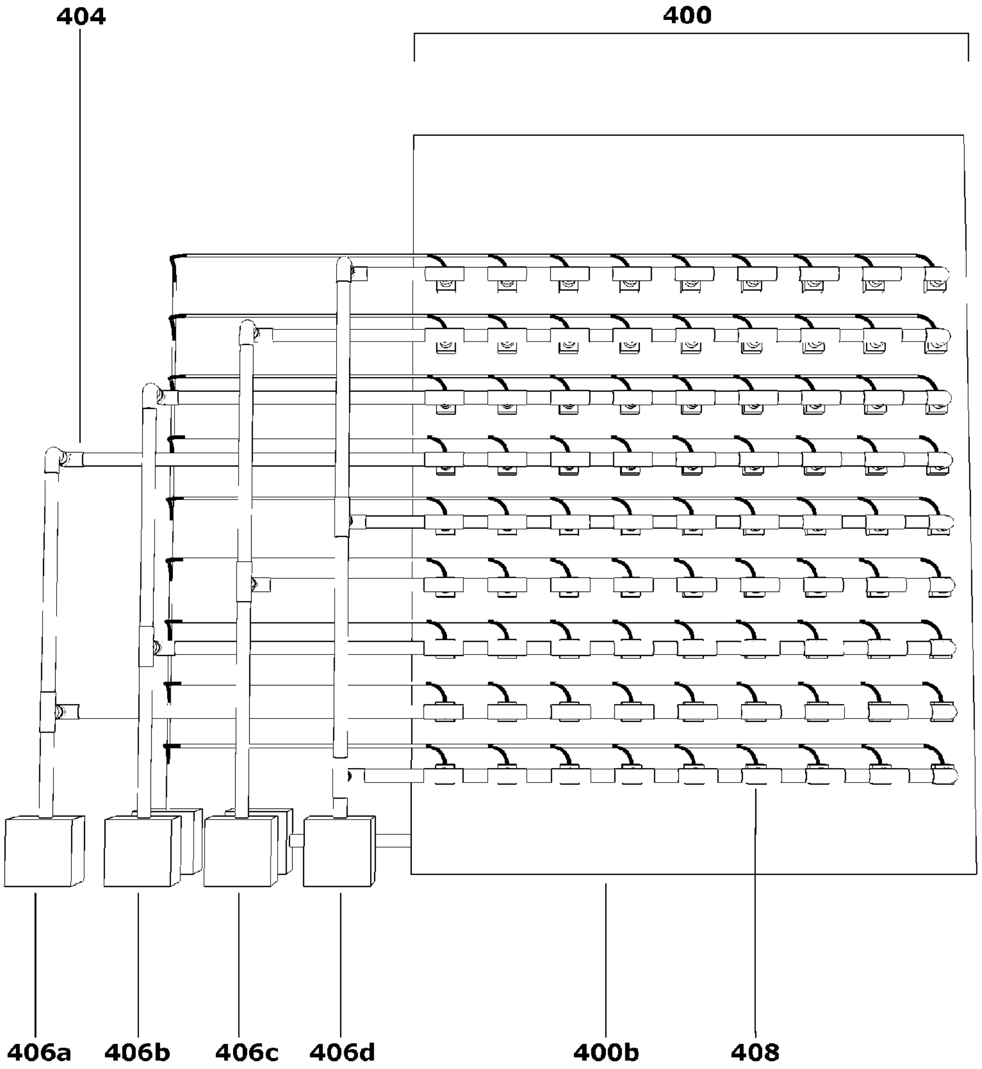
FIG. 4*d* shows a complete back view of the heat printer.
Figure 4E:
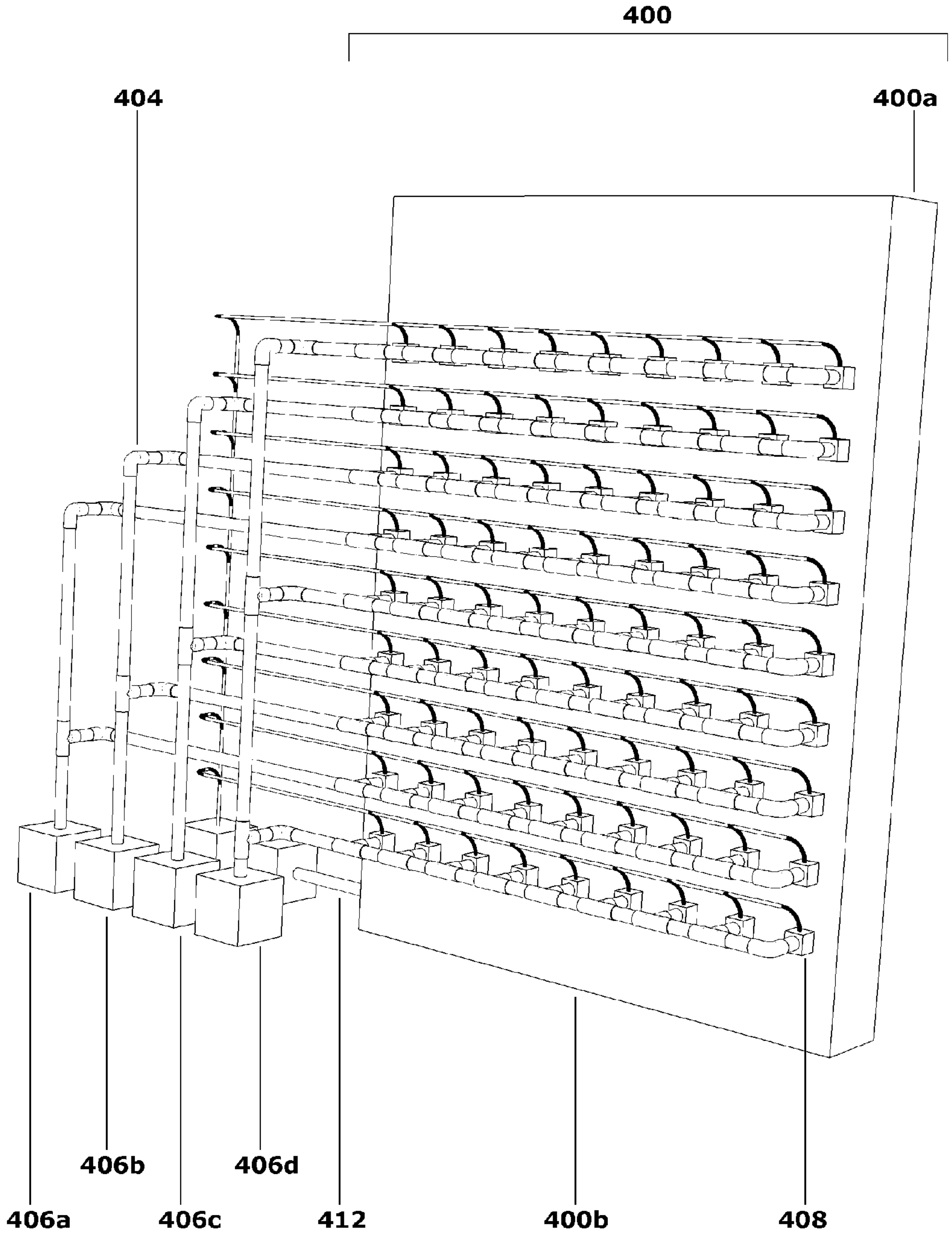
FIG. 4*e* shows a complete top left backside view of the heat printer.
Figure 5A:
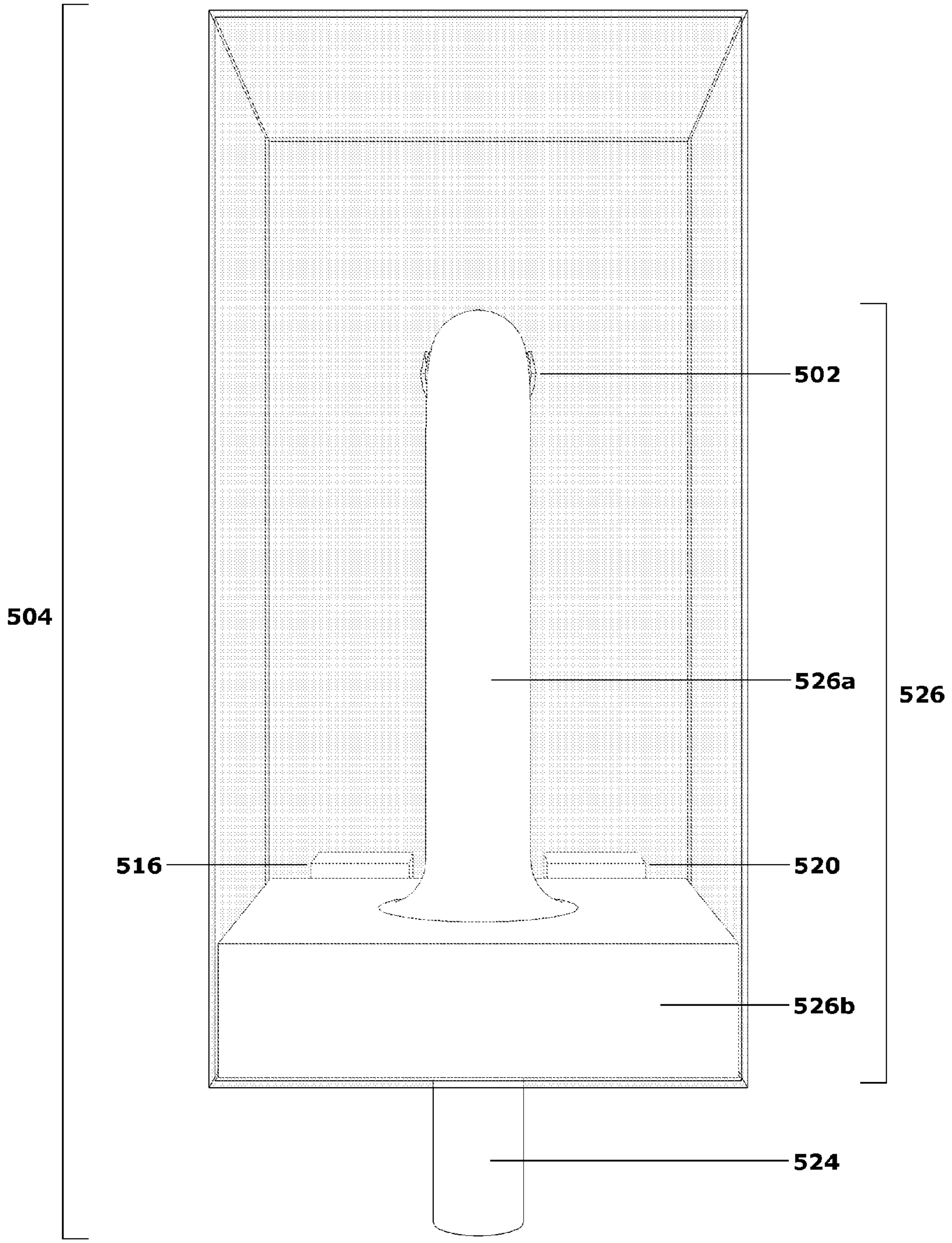
FIG. 5*a* shows a complete front view of the flowing flame.
Figure 5B:
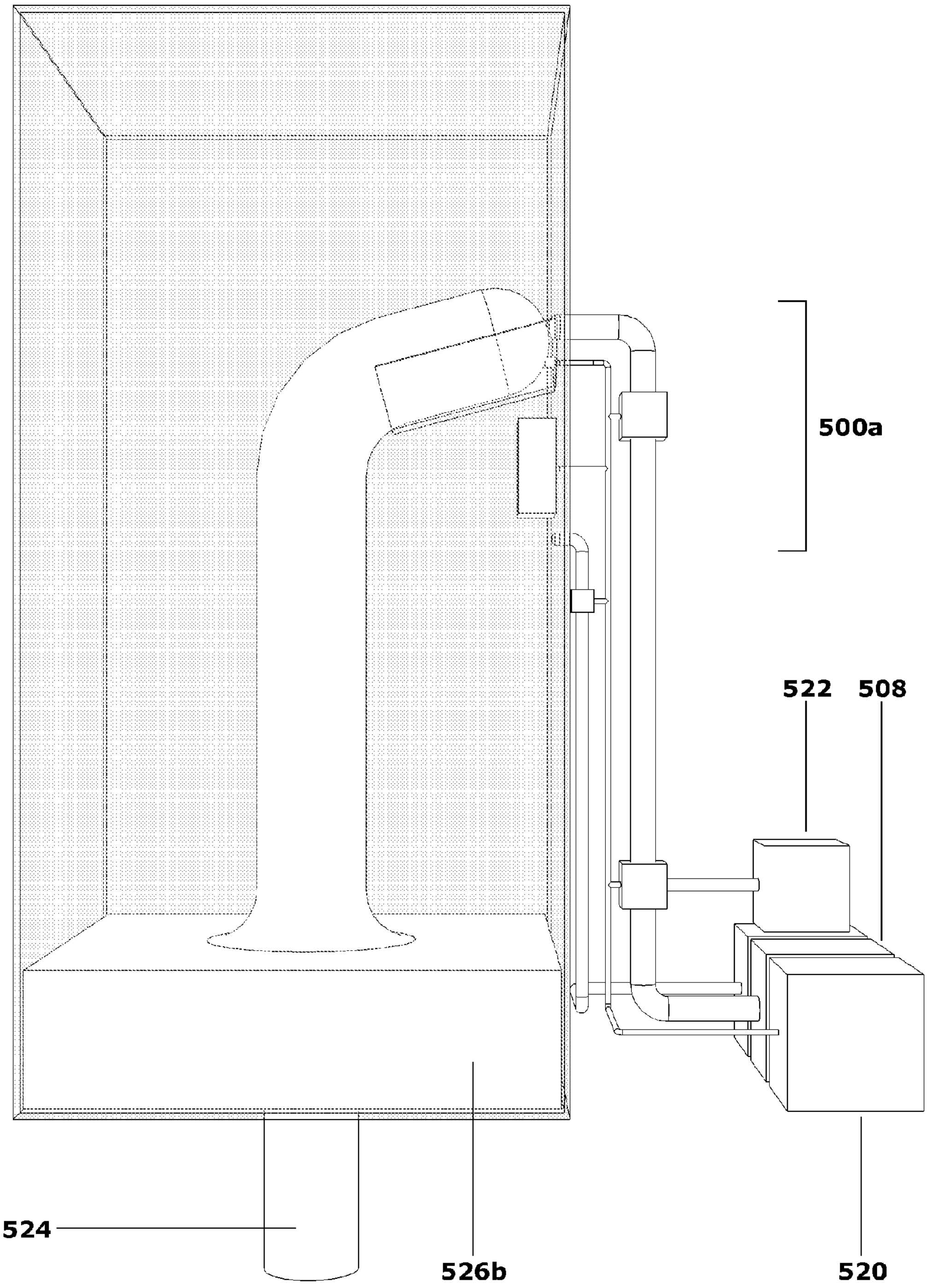
FIG. 5*b* shows a complete right side view of the flowing flame.
Figure 5C:
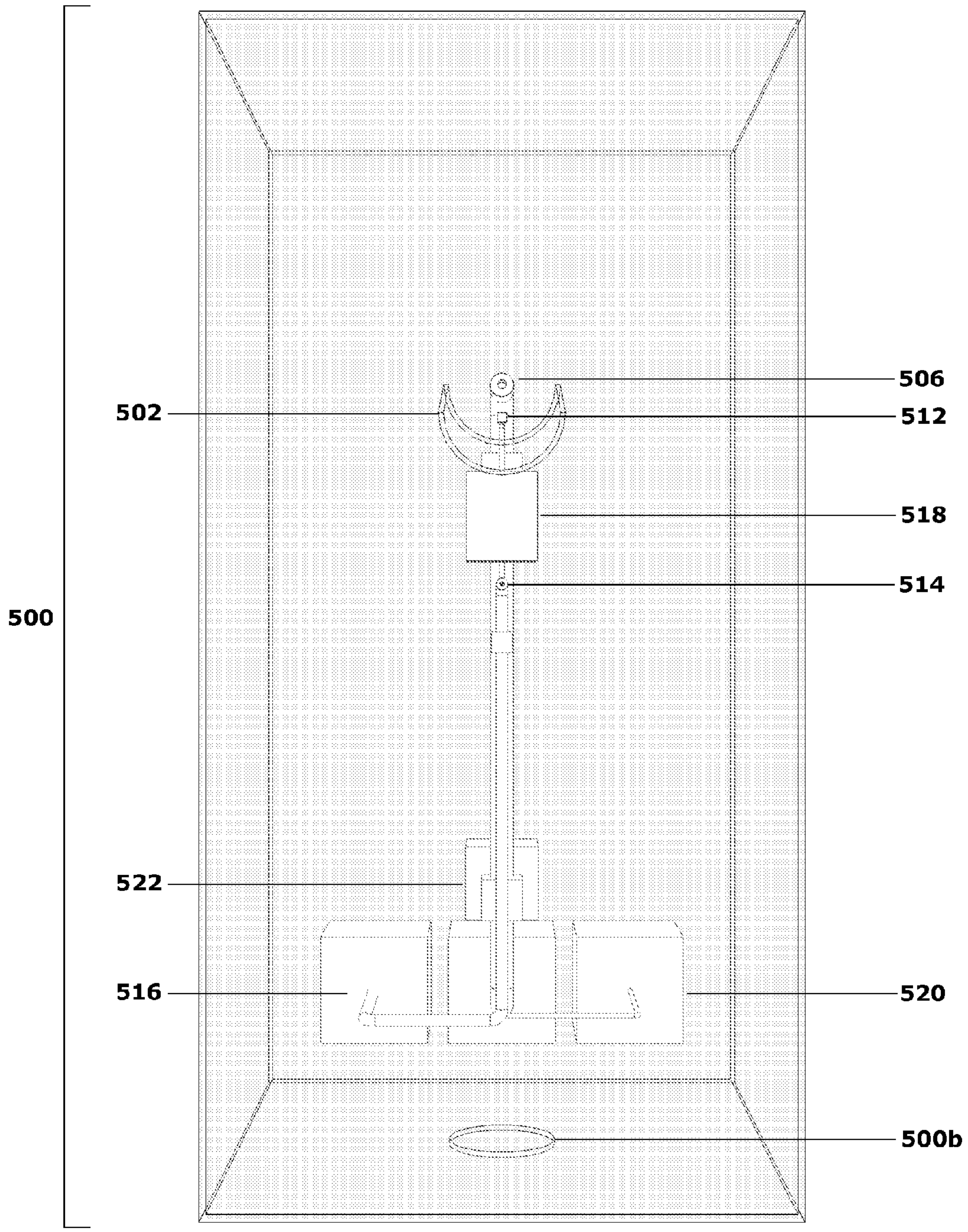
FIG. 5*c* shows a complete front view of the flowing flame without a flame.
Figure 5D:
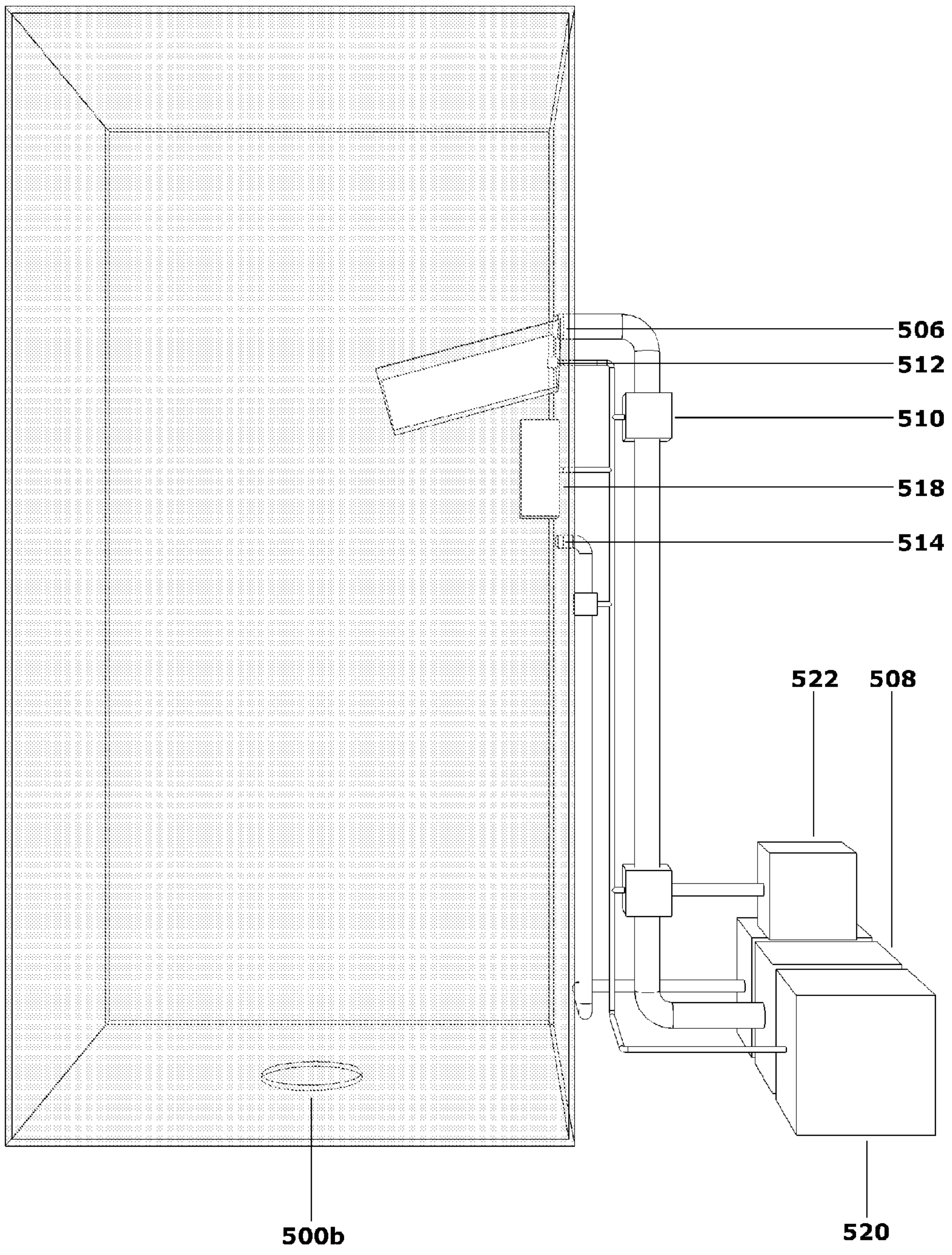
FIG. 5*d* shows a complete right side view of the flowing flame without a flame.
Figure 5E:
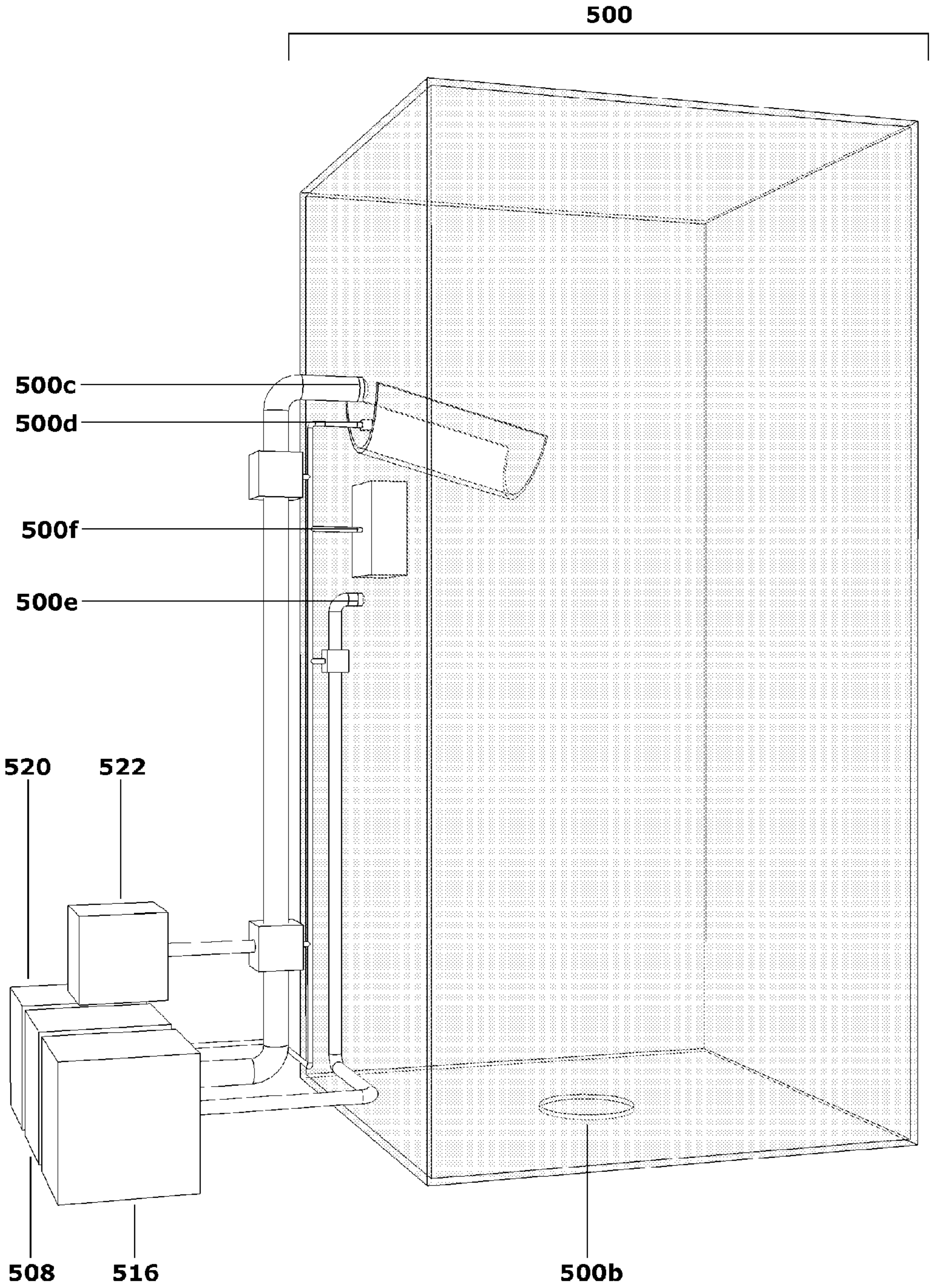
FIG. 5*e* shows a complete back left side view of the flowing flame without a flame.
Figure 6A:
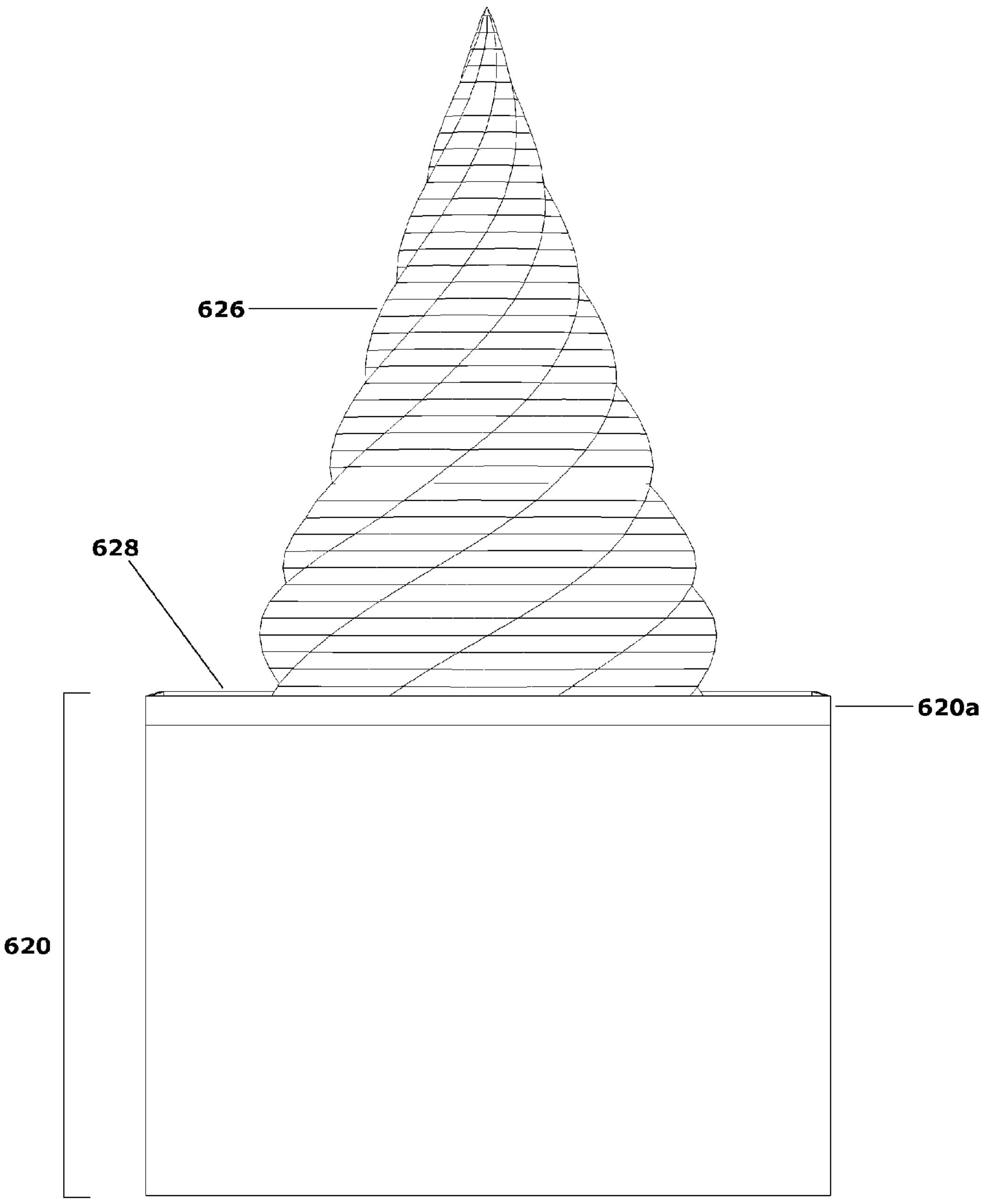
FIG. 6*a* shows a complete front view of the freezing fountain.
Figure 6B:
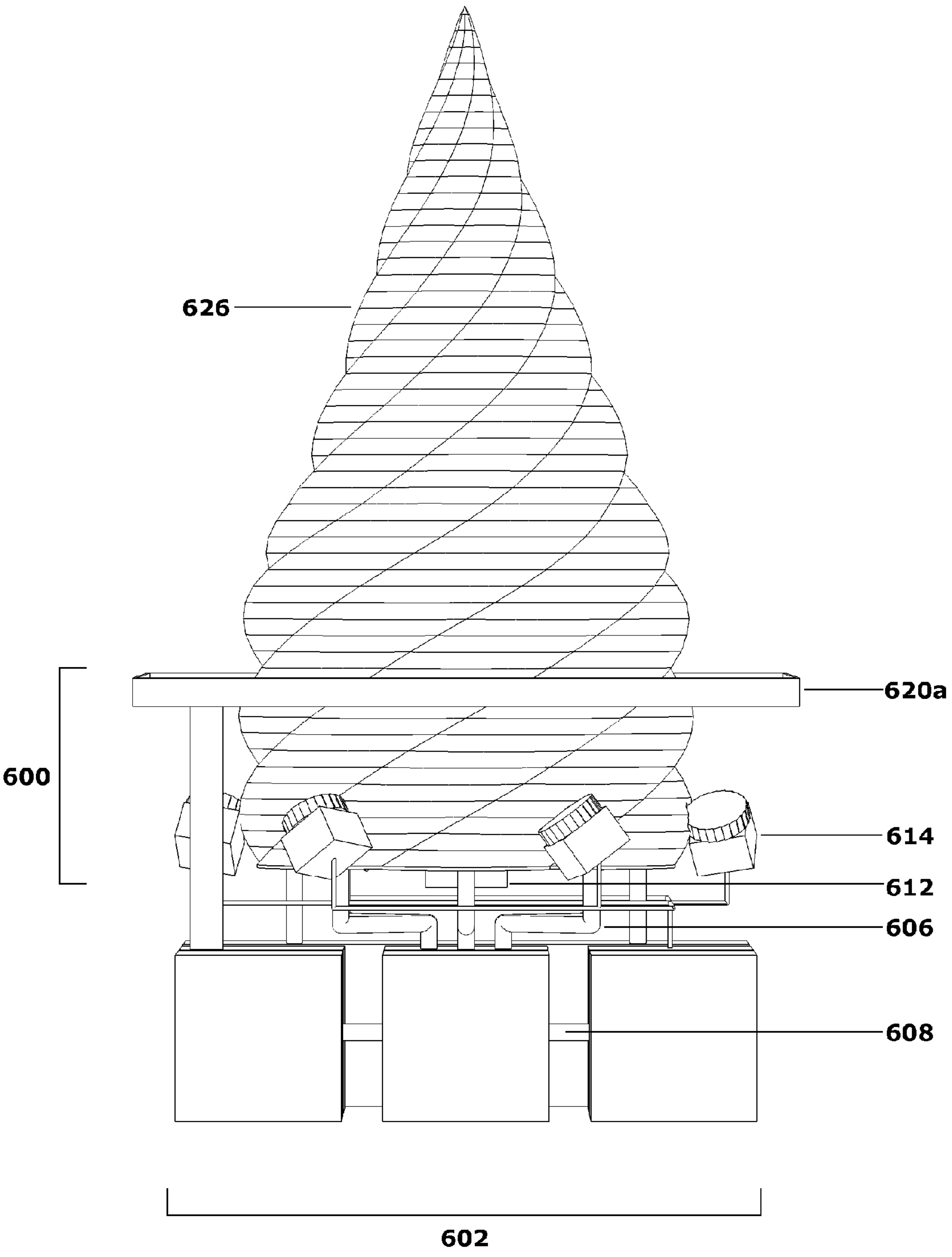
FIG. 6*b* shows a complete front view of the freezing fountain without its cover.
Figure 6C:
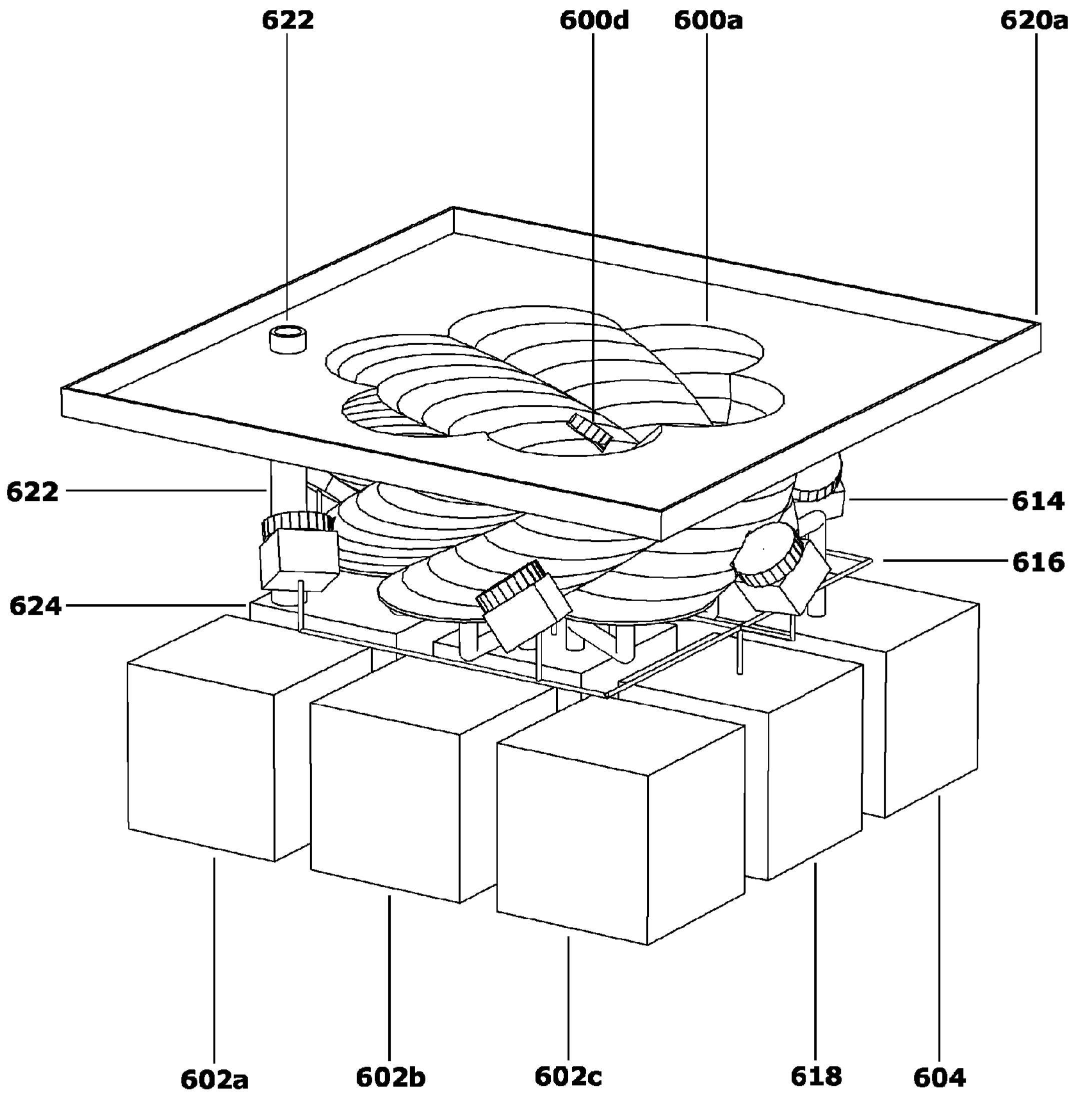
FIG. 6*c* shows a front right and top view of the freezing fountain without fluid.
Figure 6D:
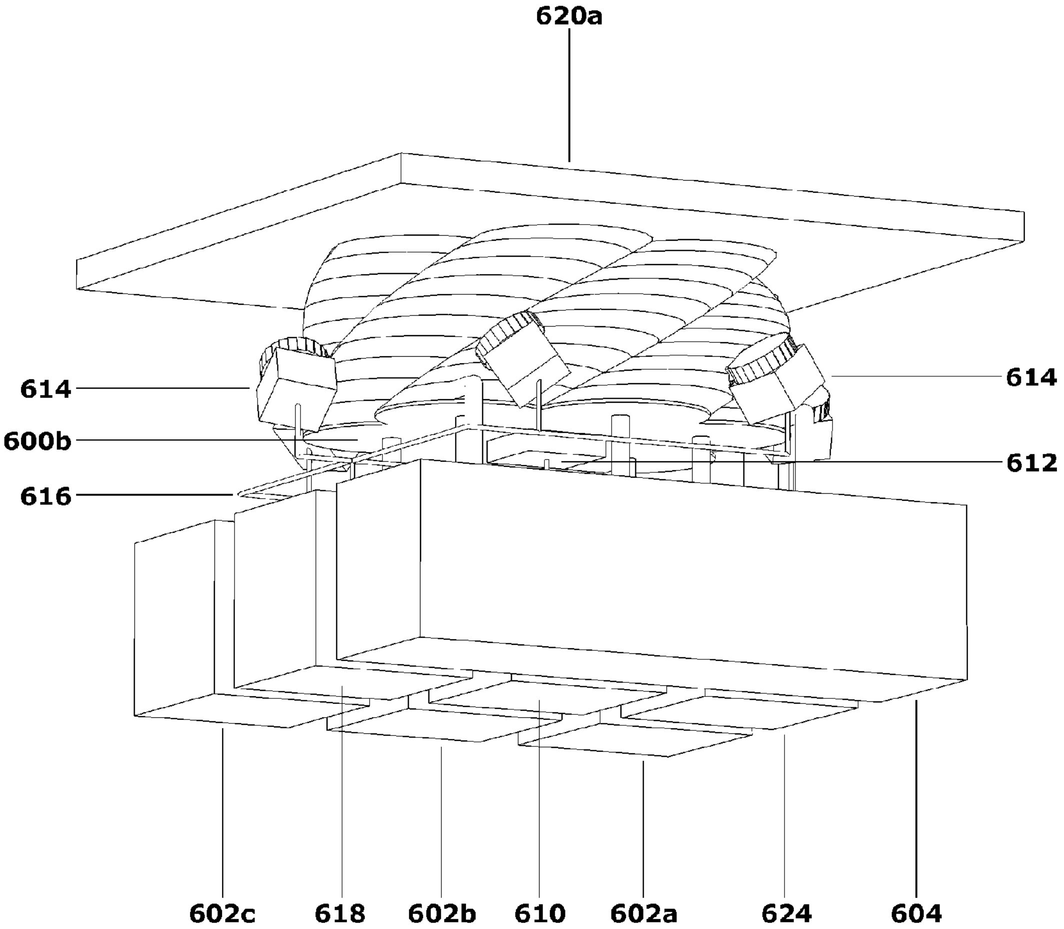
FIG. 6*d* shows a back right and bottom view of the freezing fountain without fluid.
Figure 6E:
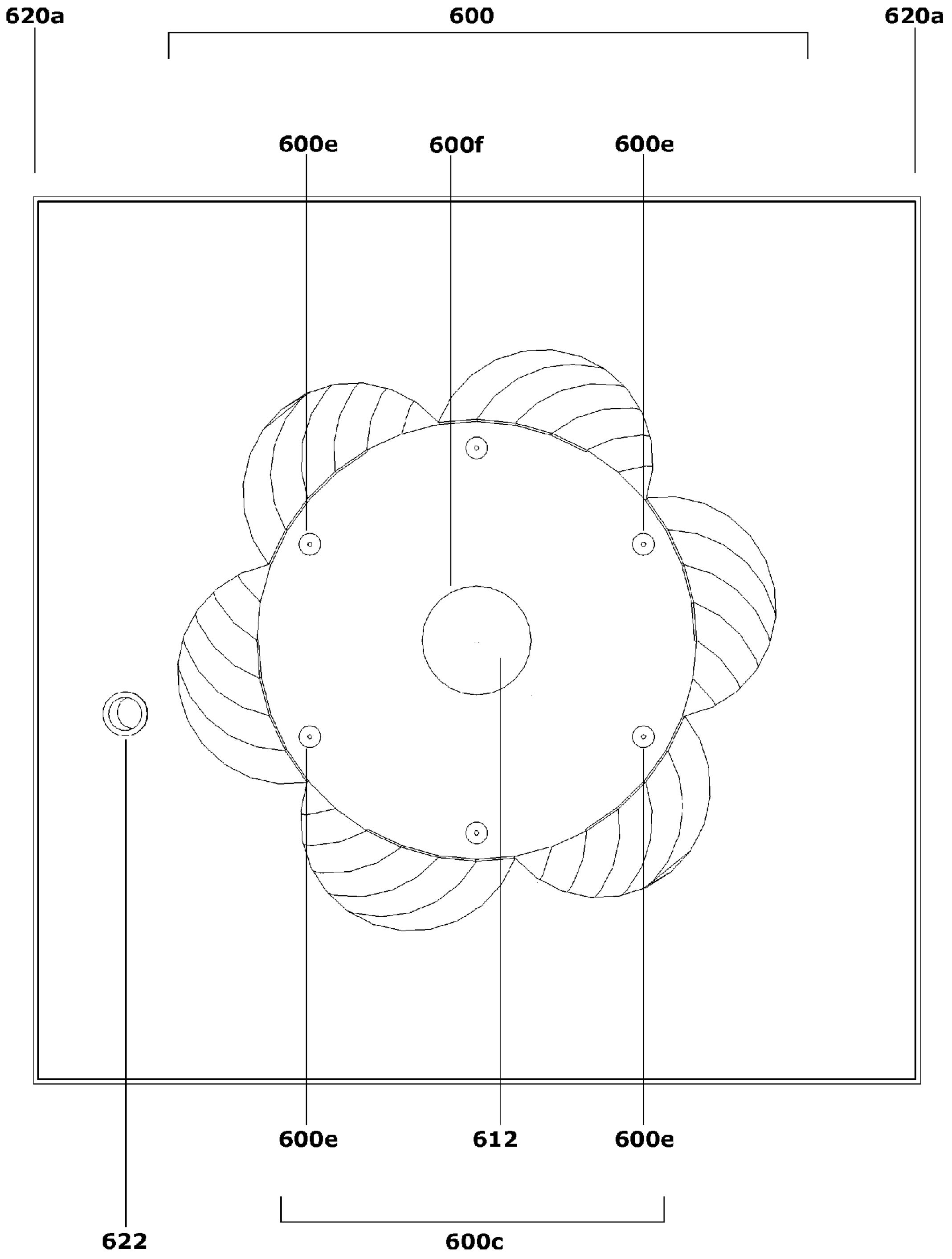
FIG. 6*e* shows a complete top view of the freezing fountain without fluid.

In a preferred embodiment, the fire flower comprises a generally transparent flower-shaped chamber (100) comprising a pot (100*a*), a stem (100*b*), a leaf (100*c*), and bloom (100*d*). In one embodiment, the chamber comprises glass. The pot may be filled with a transparent liquid (102) to represent soil. The pot may be exposed to ambient atmosphere above the surface of the liquid via angled inlets (100*e*) near the bottom of the stem portion of the pot. Hoses (104) and other devices may be attached to holes (100*f*) in the glass chamber to add fuel (106), circulate liquid, and transport air through the glass chamber. Pumps (108), valves (112), and thermostats (114) that may be required to regulate these activities may be connected to a control system (116). A top (118) and bottom housing (120) and an insulating layer (122) may cover many of the mechanical parts and the bottom of the glass chamber. FIGS. 1*a*-1*p* show a preferred embodiment of the fire flower.

Fire Flower Operation

In a preferred embodiment, the fire flower may be operated as described hereinafter.

Roots

A first gaseous fuel (106*a*) is mixed with oxygen or an oxidizer (124) and this mixture is maintained at a temperature below its auto-ignition temperature. The liquid (102) located inside the pot (100*a*) is circulated by a pump (110) to create a vortex and is maintained at a temperature above the auto-ignition temperature of the fuel-oxygen/oxidizer mixture (126).

The fuel-oxygen/oxidizer mixture is then bubbled into the liquid from holes (100*g*) near the outside edge of the bottom of the glass chamber via hoses (104*a*). Contact with the liquid, which is at a higher temperature, causes the bubbles (128) of fuel-oxygen/oxidizer mixture to increase in temperature until they reach the auto-ignition temperature of the mixture and ignite, creating subsurface flashes of light. The fuel-oxygen/oxidizer mixture may be selected or chemically supplemented to control the color of these flashes. In a preferred embodiment, the flashes are pink.

The circulation of the liquid within the pot section (100*a*) of the glass chamber causes a vortex-shaped depression in the surface of the liquid. The rising and flashing bubbles of the fuel-oxygen/oxidizer mixture travel upward on account of their lower density compared to the liquid and inward toward the lower pressure in the center of the vortex, creating the appearance of roots or nutrients emerging from the liquid soil (102) and traveling into the stem.

A vibration-generating device (130) may be situated adjacent to the liquid to generate sound waves within the liquid to compress and ignite bubbles of the fuel-oxygen/oxidizer mixture and to change the liquid's appearance at its surface.

Stem

A second fuel (106*b*), not mixed with oxygen, is released into the liquid beneath the center of the vortex-shaped depression in the surface of the liquid. When the second fuel reaches the surface of the liquid and mixes with ambient air it will be ignited by the heat of the first fuel-oxygen/oxidizer bubbles spontaneously igniting at or near the surface to generate a flame (132). In a preferred embodiment, the flame is yellow.

The flame is drawn into the curved cylindrical stem (100*b*) of the glass chamber by suction hoses (104) attached to the ends of the bloom (100*d*) and leaf (100*c*) sections of the chamber. Air is also drawn into the stem through the angled vents (100*e*) located near its bottom such that influx of incoming air causes the air already inside the chamber to appear to circulate.

The circulation forces the lighter, hotter luminous flame toward the center of the chamber and the heavier air toward the outside. This circulation combined with the acceleration provided by the artificial suction creates a long, thin, curved rotating column of flame (132*a*), resembling the shape of a flower stem. The suction force generated by each of the suction hoses (104*a*) can be adjusted individually. When the suction accelerating air and fuel (106*b*) through the stem is applied asymmetrically, the stem appears to oscillate.

Leaf

When the suction is applied through the hose (104*b*) attached to the end of the leaf (100*c*), some or all of the flame will be drawn through a gap (100*h*) in the side of the stem and into the leaf. The gap is positioned so that gases are drawn out of the stem at an angle which does not appreciably disturb the circulation of the gases within the stem.

As some or all of the flame enters the leaf, one or more chemical additives (134) are added through a hose (104*c*) attached to a hole (100*i*) in the chamber to change the color of the flame to the desired color of the leaf. In a preferred embodiment, the leaf flame is green.

As the flame enters the thin, flat space inside the leaf it expands to fill this space. As the flame continues through the space it again contracts as it is drawn toward the hole (100*j*) at the end of the leaf by the application of suction. This creates a flat, broad, leaf-shaped flame (132*b*).

Bloom

When suction is applied to the ends of the bloom (100*d*), some or all of the stem flame (132*a*) is drawn into the bloom. As the stem flame enters the bloom, one or more chemical additives (136) are added through a hose (104*d*) attached to a hole (100*k*) in the chamber to change the color of the flame to the desired color of the bloom. In a preferred embodiment, the bloom flame is red.

As the stem flame is pulled into the bloom it is pulled back along the curving outside of the chamber. As the flame spreads out along this backward-curving surface the chamber narrows, causing the flame to expand into a flat, curving, circular shape. As the flame approaches the separate suction holes (1001) at the end of the chamber it splits into separate streams. In one embodiment, there are five evenly-spaced holes, causing the flame to split into five symmetrical streams resembling the petals of a flower. The result is an outward-spreading, backward-curving, five-petal, bloom-shaped flame (132*c*).

Fire Flower Growth and Death

By controlling the relative suction strength applied to each of the exhaust holes (100*f*) and by modulating the amount of each fuel used, a variety of forms may be created. When these separate forms and the transitional phases between them are viewed in sequence they create the appearance of a flower that sprouts, grows, blooms, wilts, and then dies.

In one embodiment, the sprouting phase is illustrated as described hereinafter. The chamber is initially still and dark, with substantially still liquid maintained at a predetermined temperature at the bottom of the chamber. As the liquid begins to slowly circulate, a small but gradually increasing amount of the fuel-oxygen/oxidizer mixture is released into the heated fluid. Small bubbles of the fuel-oxygen/oxidizer mixture begin to ignite and create subsurface flashes of light. As the liquid circulates faster, the flashes of light are increasingly drawn toward the center of the liquid, where a vortex-shaped depression begins forming in the surface of the liquid. A small amount of the second fuel (106*b*), which will form the main body of the flower, is then released onto the vortex-shaped depression. This second fuel is ignited by the combustion of bubbles (128) of the first fuel-oxygen/oxidizer mixture (126) at or near the surface of the liquid, creating a small flame.

In one embodiment, the growth phase is illustrated as described hereinafter. As the amounts of both fuels are increased, the flashing bubbles grow in size and number as the stem flame (132*a*) grows in size. Suction now applied to the exhaust holes causes the stem flame to grow into a tall, narrow, circulating shape. Applying suction to the exhaust holes differentially causes the stem flame to oscillate as it grows upward. As the amount of the fuel is further increased and the stem flame grows higher, it reaches the height of the leaf. A portion of the flame is then pulled off the central stem flame and into the leaf, while a portion of the flame continues upward along the stem. One or more chemical additives (134) are added to create a small colored leaf bud of the desired color. As the amount of the second fuel is further increased and the suction at each of the exhaust holes (1001) is adjusted, the stem flame (132*a*) and leaf flame (132*b*) grow to full size.

In one embodiment, the bloom phase is illustrated as described hereinafter. As the rate of addition of the second fuel is increased to its maximum rate and one or more chemical additives (136) are added, the bloom is filled with a flame of the desired color (132*c*). The suction applied to the exhaust holes (1001) at the end of the bloom (100*d*) is adjusted so that the bloom flame expands symmetrically and is separated into five identically-shaped flower petals.

In one embodiment, the wilting phase is illustrated as described hereinafter. As fuel (106*b*) is reduced the bloom flame becomes smaller and then disappears. Subsequently, the leaf flame and stem flame become smaller and then disappear. Finally, the bubbles which form the roots become less numerous and ultimately disappear.

In one embodiment, the death phase is illustrated by the fire flower shutting down or entering a standby mode.

Fluorescent Vortex

In one embodiment, the method is used to generate fluid shapes which emit colored light to generate a fluorescent vortex. In a preferred embodiment, the method is used to generate a cylindrical chamber comprising fluids. The fluids in the chamber are shaped by gravity and mechanical motion inside a shaped chamber. The fluids are excited by electric current and release visible light. The visible colors are determined by selection and combination of gases, as in a fluorescent light bulb with centrifuged gases inside. FIGS. 2*a*-2*h* show a preferred embodiment of the fluorescent vortex.

Fluorescent Vortex Description

In a preferred embodiment, the fluorescent vortex comprises a chamber (200) containing fluids (202). In a highly preferred embodiment, the ends of the fluorescent vortex chamber are sealed, with openings to allow electrical energy and mechanical motion to affect the contents of the chamber. The chamber contains at least two fluids of different densities, at least one which emits light when an electric current is applied (202*a*) and at least one which is translucent (202*b*). In a preferred embodiment, there are two fluids and the less dense fluid emits light in response to electric current. Mechanical devices (204) which may be operated via motors (206) are housed (208) inside opposite ends of the chamber. In a preferred embodiment, the mechanical devices are propellers. Electrodes (210) are positioned at opposite ends of the chamber, wherein the electrodes are used to cause an electric current to pass through the fluids inside the chamber.

Fluorescent Vortex Operation

In a preferred embodiment, the fluorescent vortex may be operated as described hereinafter. Electric current is passed through the fluids in the chamber such that at least one of the fluids (202*a*) fluoresces and releases visible light. The fluids inside the chamber are separated by gravity absent the application of mechanical forces. In a preferred embodiment, when the propellers inside the chamber begin to rotate, the denser fluid (202*b*) is forced outward and the less dense fluid (202*a*) is forced inward. At full speed the rotation of the propellers causes the less dense fluorescent fluid (202*a*) to appear as a glowing column inside the denser fluid (202*b*). The composition of the fluids used determines the color of the light emitted. If more than one of the fluids emits or absorbs visible wavelengths of light, then additional colors may be created by combining or overlaying layers of fluids. The speed and direction of the propeller fans and the electrical current may be adjusted by a control system (212) to create different visual effects. The chamber may be oriented in any direction.

Luminous Fluid Eye

In one embodiment, the method is used to generate fluid shapes which emit colored light to generate a luminous fluid eye. In a preferred embodiment, the method is used to generate a luminous fluid eye comprising a glowing, color-changing iris that is capable of looking in different directions. The fluid eye is shaped by mechanical motion inside a shaped chamber and by magnetic fields. The fluids that comprise the fluid eye are excited by nonvisible wavelengths of electromagnetic radiation to release visible light. The color of the light is regulated by using fluids which absorb only specific, non-overlapping ranges of electromagnetic radiation and which emit different wavelengths of visible light. FIGS. 3*a*-3*g* show a preferred embodiment of the luminous fluid eye.

Luminous Fluid Eye Description

In a preferred embodiment, the luminous fluid eye comprises a generally circular chamber (300) comprising two circular, flat, transparent panels (302). The panels are spaced a distance apart and held in place by a generally cylindrical housing (304) which extends entirely across the space between the edges of the two panels and seals the chamber. The cylindrical housing has holes (304*a*) to allow mechanical motion devices (306), preferably pumps which have directional outflows (308), to circulate fluids (310) within the chamber. There are also holes (304*a*) in the cylindrical housing to allow nonvisible electromagnetic radiation generating devices (312), preferably light-emitting diodes (LEDs) which produce ultraviolet and infrared radiation, to affect the fluids within the chamber.

An array of electromagnets (314) is positioned around the circumference of the chamber so that it may influence the fluids inside the chamber. A control system (316) is connected to the pumps, LEDs, and electromagnets which can adjust the power levels of each individually.

A cover (318) with an eye-shaped opening (318*a*) hides a portion of the chamber from view. This cover may be made of a flexible material such that the eye-shaped opening may change in shape and size or may open and close.

The transparent panels may be treated to protect viewers from any harmful effects associated with nonvisible wavelengths of electromagnetic radiation.

The chamber is filled with three immiscible fluids with different chemical and physical properties, which represent three different sections of the eye—the pupil (310*a*), the iris (310*b*), and the sclera (310*c*) (the white portion of the eye).

Pupil

In a highly preferred embodiment, the fluid which represents the pupil (310*a*) is the least dense of the fluids. This fluid does not reflect or emit light and thus appears black. In a preferred embodiment, the fluid is permanently black and opaque. However, the fluid may be another color or transparent and then become black when exposed to specific nonvisible wavelengths of electromagnetic radiation.

Iris

In a highly preferred embodiment, the fluid which represents the iris (310*b*) is more dense than the fluid which represents the pupil (310*a*) but less dense than the fluid which represents the sclera (310*c*). In a preferred embodiment, this fluid is transparent and comprises three pigments (320). Each of the pigments absorbs electromagnetic radiation of a different nonvisible wavelength and emits radiation at a visible wavelength. Preferably, the first pigment (320*a*) absorbs a short ultraviolet wavelength, the second pigment (320*b*) absorbs a longer ultraviolet wavelength, and the third pigment (320*c*) absorbs an infrared wavelength. Each of the pigments cannot absorb radiation at any of the wavelengths used to energize any of the other pigments, and each of the pigments emits a different wavelength of visible light. In a preferred embodiment, the pigments produce wavelengths that are red, yellow, and blue respectively.

The relative intensity of the colors of light produced by the three pigments within the fluid representing the iris may be modulated separately by adjusting the intensity of the different nonvisible wavelengths. Separately adjusting each of these visible wavelengths, which are viewed in combination with each other within the fluid of the iris, allows the colors of emitted light to be mixed to produce all other colors. Focused sources of ultraviolet radiation, such as lasers, may be used to create visible patterns within the fluid.

Sclera

In a highly preferred embodiment, the fluid which represents the sclera (310*c*) is the densest of the three fluids. This fluid transmits the wavelengths of nonvisible light used to energize the iris. In a preferred embodiment, this fluid appears permanently opaque and white. However, the fluid may be another color or transparent and then become white when exposed to specific nonvisible wavelengths of electromagnetic radiation.

The fluid which represents the sclera is also ferromagnetic. As a result, this fluid may be influenced by the electromagnets positioned around the circumference of the chamber.

Luminous Fluid Eye Operation

In a preferred embodiment, the luminous fluid eye may be operated as described hereinafter. The circular chamber is filled with appropriate amounts of each of the three fluids. At rest, the fluids are separated vertically by gravity. As the pumps begin to force fluids through the directional outflows, the fluids inside the chamber begin to circulate within the chamber, forcing the denser fluids outward and the less dense fluids to the center. This generates a circular mass of the least dense pupil fluid (310*a*) circulating at the center of a larger circular mass of the denser iris fluid (310*b*) which in turn circulates at the center of a larger circular mass of the densest white fluid (310*c*) circulating in the chamber.

The LEDs emit three separate nonvisible wavelengths of electromagnetic radiation to selectively energize the colored light-producing pigments with which they are associated. Treatments applied to the panels of the chamber shield the viewer from any harmful effects from these nonvisible wavelengths of electromagnetic radiation. The amount of each wavelength produced is adjusted so that the apparent color of the visible light emitted also changes. This causes the colors emitted by the iris to change.

When power is applied asymmetrically to the array of electromagnets surrounding the chamber, preferably both magnets on the right side, it causes the ferromagnetic white fluid (310*c*) to become more attracted to one side of the chamber (300*a*) than the other side (300*b*). As the white fluid collects on one side of the chamber (300*a*) the center of the circulating vortex, which defines the center of the pupil and iris, will be forced away to the opposite side of the chamber (300*b*). The eye thereby appears to look to the left. Power may be applied to the array of electromagnets at various intensities to make the center of the eye move away from the center of the chamber in any vertical, horizontal, or diagonal direction.

Angry Focused Eye

By attaching a motion detector or other sensors to the control system which coordinates the actions of the pump, LEDs, and array of electromagnets, the eye may be made to respond to the viewer. In a preferred embodiment, the eye starts out with a blue color but gradually changes to a more red color, thus representing the onset of anger. The red colors increase in intensity as the viewer approaches the fluid eye, and shift back to blue as the viewer moves away. By selectively and variably applying power to the electromagnet array the fluid eye can also be made to appear to look directly back at the viewer, focus on the viewer, and follow the viewer as he or she moves around the room.

Heat Printer

In one embodiment, the method is used to generate fluid shapes which emit colored light to generate a flat, fluid sheet of hot air with changing patterns of color imprinted thereon ("heat printer"). The fluids are situated in an open chamber and are shaped by gravity. Visible light may be generated by the release of chemical energy and/or from heat. The colors may be adjusted using chemical additives. FIGS. 4*a*-4*e* show a preferred embodiment of the heat printer.

Heat Printer Description

In a preferred embodiment, the heat printer comprises a generally flat sheet (400) with two side edges (400*a*) extending upward from the sheet. The sheet is angled forward and further comprises an array of holes (400*b*). In a preferred embodiment, the sheet comprises a 9×9 square array of 81 holes.

An array of nozzles (402) sits within and fills the holes. The nozzles are connected by pipes (404) to one or more storage containers containing chemical additives (406) which can be excited by heat to exhibit coloration. In a preferred embodiment, each nozzle is connected to one of four chemical additives. In a highly preferred embodiment, the colors of the chemical additives are yellow (406*a*), red (406*b*), blue (406*c*), and green (406*d*). Valves (408) control the amount of each chemical additive supplied to each nozzle. Each of these valves is connected to a control system (410).

A supply pipe (412) which can release heated air (414) evenly along the surface of the sheet is situated just in front of the bottom of the sheet (400*c*). The supply pipe is connected to a supply (416) of heated air and has an array of holes (418) in it to allow the heated air to be distributed evenly across the surface of the sheet.

Heat Printer Operation

In a preferred embodiment, the heat printer may be operated as described hereinafter. The heated air is released along the bottom of the angled sheet. The forward-leaning angle of the sheet causes the heated air to spread out into a flat sheet and flow upward along the surface of the sheet. The upward-extending side edges of the sheet prevent most of the heated air from flowing upward and over the sides of the sheet.

Chemical additives are passed through the array of nozzles into the sheet of heated air at various locations. The heat will cause excitation of the chemical additives and thereby cause patterns of light to appear within the heated air. The specific chemical additives used will determine the colors of the light. The amount of chemical additive added at each location and the duration and timing of the chemical additive additions will determine whether and how the patterns of light appear within the sheet of heated air. The rate at which the various chemical additives are added to the heated air may be controlled by valves connected to a central control system, allowing for the coordination of complex, changing patterns of colored light.

Flowing Flame

In one embodiment, the method is used to generate fluid shapes which emit colored light to generate a flowing flame. In a preferred embodiment, the method is used to generate a color changing flame that flows downward into a pool of fire and smoke. The fluids are situated in an open chamber and shaped by gravity. Visible light is generated by the release of chemical energy and from heat. The color(s) of the flowing flame may be adjusted using chemical additives. FIGS. 5*a*-5*e* show a preferred embodiment of the flowing flame.

Flowing Flame Description

In a preferred embodiment, the flowing flame comprises a transparent three-dimensional open chamber (500). The chamber may preferably comprise glass. The chamber has holes (500*a*) along one side and an inward-facing spout (502) located below some of the holes. The chamber also has a hole (500*b*) in its bottom.

The side holes allow fluids (504) to enter the chamber along with electric current applied for various purposes. In a preferred embodiment, there are two side holes above the spout—one hole (500*c*) to house a nozzle (506) connected to a fuel (508) and air or other oxygen supply (510) and one hole (500*d*) to house an electrical power source for an ignition system (512)—and two side holes below the spout (502)—one hole (500*e*) to house a nozzle (514) connected to a supply of a low density, non-flammable gas (516) such as helium and one hole (500*f*) to house an electrical power source for a heating element (518) and thermostat. The hole in the bottom (500*b*) allows for combustion products to flow out the bottom of the chamber.

The flow of the respective fluids and electrical power may be controlled by a central control system (520). Chemical additives (522) may be added to the combustible fuel to alter the color of the flame.

Flowing Flame Operation

In a preferred embodiment, the flowing flame may be operated as described hereinafter. The chamber is filled with a non-flammable gas (516), preferably helium, from the nozzle (514) located below the spout (502). The non-flammable gas is heated by the heating element (518). As the non-flammable gas is heated, it expands and becomes less dense. The non-flammable gas is heated until it is above a temperature where it has become less dense than the fuel (508), air (510), gaseous combustion products (524), and other gases that are added to or generated in the chamber as described below, even when the latter gases have been heated by the combustion process. After combustion begins in the chamber, the chemical energy released may heat the non-flammable gas (516) above the necessary temperature without the need for external heating.

A controlled amount of combustible fuel (508) premixed with air (510) is then added to the chamber from the nozzle (506) above the spout (502) and is ignited using the ignition system (512). The resulting flame (526) will be denser than the surrounding heated non-flammable gas (516). As a result, the flame flows down and off the edge of the spout and then down toward the exhaust hole (500*c*) in the bottom of the chamber.

The exhaust hole in the bottom of the chamber is preferably too small to allow all of the luminous flame and combustion products to easily exit the chamber. This causes some of the flame to collect near the bottom of the chamber. As this flame collects near the bottom of the chamber, it compresses the gases above it and raises the pressure in the chamber. This causes an increasing amount of combustion products to flow out of the exhaust hole until equilibrium is reached. In a preferred embodiment, the size of the exhaust hole causes equilibrium to be reached when the lower 25% of the chamber has been filled with flame and combustion products.

Chemical additives (522) may be added to the combustible fuel to change the color of the flowing flame. When a flame of one color (526*a*) flows downward into a pool of flame of a different color (526*b*), the two flames mix together to create additional colors and visual effects. The volume and composition of all fluids and the operation of electrical components may be controlled by a central control system (520). The result is a color changing flame (526*a*) flowing downward into a pool of fire (526*b*) and smoke.

Freezing Fountain

In one embodiment, the method is used to generate fluid shapes which emit colored light to generate a freezing fountain similar to a growing multicolored glowing ice sculpture. In a preferred embodiment, the method is used to generate a cylindrical spiraling column of melting fluids. The fluids are shaped by gravity, heat, and mechanical motion inside a shaped chamber. The fluids are excited by electromagnetic radiation to release visible light. The color (s) of the freezing fountain is determined by the selection and combination of fluids. FIGS. 6*a*-6*e* show a preferred embodiment of the freezing fountain.

Freezing Fountain Description

In a preferred embodiment, the freezing fountain comprises a spiraling cylindrical chamber (600) open at one end (600*a*) and closed at the other end (600*b*). In a highly preferred embodiment, the bottom end is closed and the top end is open. The closed end has holes (600*c*) to allow fluids (602) and electromagnetic radiation to pass into the chamber substantially or entirely unimpeded, and the sides of the chamber have holes (600*d*) to allow mechanical motion to affect the contents of the chamber and to allow for the attachment of a cooling system (604).

Tubes (606) may connect some of the holes (600*e*) at the closed end to a fluid distribution device (610). The fluid distribution device is connected by tubes (608) to various fluid sources. In one embodiment, the fluid distribution device distributes three different fluids. The fluids emit different colors of light when exposed to electromagnetic radiation. In one embodiment, the emitted colors are red (602*a*), yellow (602*b*), and blue (602*c*).

An electromagnetic radiation source (612), preferably an ultraviolet spotlight, is aligned to expose the fluids inside the chamber to electromagnetic radiation through a hole (600*f*) in the closed end such that the radiation may affect materials in and above the cylindrical chamber. A cooling system is attached to the chamber such that it may cool the fluids inside the chamber. Mechanical devices (614), such as rollers, may be aligned with the holes in the sides of the chamber such that the devices extend into the chamber. A weight sensor may also be attached to the device.

The fluid distribution device, electromagnetic radiation source, cooling system, and mechanical devices are all attached by wiring (616) to control and power systems (618).

A housing (620) may be seated around the chamber and other associated devices without covering the open end of the chamber. The top edge of the housing may comprise a raised lip (620*a*). A drainage tube (622) may extend from above the surface of the housing to a runoff chamber (624).

Freezing Fountain Operation

In a preferred embodiment, the freezing fountain may be operated as described hereinafter. To start the device, a premade sheet of ice (626) is placed into the cylindrical spiraling chamber. The ice is shaped to fit snugly into the cylindrical spiraling chamber and be suspended by the mechanical devices a distance above the bottom of the chamber. The cooling system cools the air inside the chamber to a temperature below the freezing temperature of the colored fluorescent fluids.

The mechanical devices begin to push the ice in the chamber upward. As the ice moves upward it will also rotate. The rotation may be clockwise or counterclockwise.

One or more fluids are sprayed via the tubes (606*a*) using the fluid distribution device onto the bottom of the sheet of ice such that the fluids freeze on the bottom. The fluids comprise one or more fluorescent fluids. If multiple fluids are used, the ratios of the fluids may vary over time.

As the ice moves upward and new layers of ice are added to the bottom, a spiraling column of ice forms and begins to move upward out of the chamber. The ice is allowed to melt as it moves upward, forming a spiraling cone. A drainage tube is attached to the chamber at a designated height. Once the mixture of fluids and melted ice (628) ("melted fluid mixture") collecting at the bottom of the ice column reaches the designated height, excess melted fluid mixture begins to drain into an external collection pool via the drainage tube. The amount of melted fluid mixture at the bottom of the ice column is thereafter maintained at a constant depth by this draining process. The fluid distribution device, electromagnetic radiation source, cooling system, and mechanical devices may be adjusted by the control system to maintain a relatively constant weight, size, and shape of ice.

The electromagnetic radiation source emits radiation, preferably ultraviolet radiation, into the ice. This causes the ice to emit visible light in a repeating pattern of colors.

As the ice melts, the melted fluid mixture runoff is allowed to pool inside the raised lip on the top edge of the housing. This pool of melted fluid mixture also emits visible light when exposed to ultraviolet radiation. This generates a slow-moving multicolored fountain of ice emerging from a glowing pool.

The examples above are intended to be illustrative and not to limit or otherwise restrict the invention. All references cited herein are expressly incorporated by reference.

What is claimed is:

1. A method of generating a luminous fluid sculpture comprising a substantially transparent flower-shaped chamber comprising a pot section containing a liquid, a stem section, a leaf section, and a bloom section, wherein the method comprises the steps of:

a. generating roots within the pot section;
b. generating a stem within the stem section;
c. generating one or more leaves within the leaf section; and
d. generating a bloom within the bloom section, wherein steps (a)-(d) are performed by:

sculpting one or more fluids into a pattern or shape using one or more forces selected from the group consisting of mechanically generated turbulence, controlled movement through a shaped chamber, application of a magnetic field, vibration, and gravity to generate one or more sculpted fluids; and energizing the sculpted fluids using one or more sources of nonvisible energy selected from the group consisting of chemicals, heat, electrical current, and nonvisible electromagnetic radiation so that said sculpted fluids emit visible light;

wherein the color of the visible light emitted is controlled by the type of nonvisible energy used to energize the sculpted fluids;

wherein steps (a)-(d) are performed in at least two non-simultaneous sculpting and energizing steps to generate a dynamic luminous fluid sculpture.

2. The method of claim 1, wherein generating the roots comprises:

a. mixing a first fuel at a temperature below its auto-ignition temperature with oxygen or an oxidizer to form a fuel-oxygen/oxidizer mixture that is less dense than the liquid within the pot section;
b. maintaining the liquid at a temperature above the auto-ignition temperature of the first fuel;
c. circulating the liquid within the pot section to form a vortex; and
d. introducing the fuel-oxygen/oxidizer mixture into the liquid;

wherein the fuel-oxygen/oxidizer mixture is heated above the auto-ignition temperature of the first fuel upon being introduced into the liquid and ignites to generate subsurface flashes of light, generating a flashing fuel-oxygen/oxidizer mixture, and wherein the flashing fuel-oxygen/oxidizer mixture rises within the liquid and travels toward the vortex to generate roots.

3. The method of claim 2, wherein generating the stem comprises:

a. introducing a second fuel into the liquid below the center of the vortex, wherein the second fuel is ignited by the heat generated by the fuel-oxygen/oxidizer mixture to generate a flame; and
b. applying suction to draw the flame into the stem section and control movement of the flame into and through the stem section.

4. The method of claim 3, wherein generating the one or more leaves comprises:

a. applying suction to draw the flame into the leaf section; and
b. introducing a first set of one or more chemical additives into the leaf section to control the color of the one or more leaves.

5. The method of claim 4, wherein generating the bloom comprises:

a. applying suction to draw the flame into the bloom section; and
b. introducing a second set of one or more chemical additives into the leaf section to control the color of the bloom.

6. The method of claim 5, further comprising adjusting the suction applied to the stem section, leaf section, and bloom section to generate a luminous fluid sculpture that appears to sprout, grow, bloom, wilt, and die.

7. A method of generating a luminous fluid eye comprising a pupil section, an iris section, and a sclera section, wherein the method comprises the steps of:

a. generating a pupil section comprising a first liquid;
b. generating an iris section comprising a second liquid that is immiscible with the first liquid; and
c. generating a sclera section comprising a third liquid that is immiscible with the first liquid and the second liquid;

wherein steps (a)-(c) are performed by:

sculpting one or more fluids into a pattern or shape using one or more forces selected from the group consisting of mechanically generated turbulence, controlled movement through a shaped chamber, application of a magnetic field, vibration, and gravity to generate one or more sculpted fluids; and energizing the sculpted fluids using one or more sources of nonvisible energy selected from the group consisting of chemicals, heat, electrical current, and nonvisible electromagnetic radiation so that said sculpted fluids emit visible light;

wherein the color of the visible light emitted is controlled by the type of nonvisible energy used to energize the sculpted fluids;

wherein steps (a)-(c) are performed in at least two non-simultaneous sculpting and energizing steps to generate a dynamic luminous fluid eye.

8. The method of claim 7, wherein the first liquid is less dense than the second liquid and the third liquid, and wherein the first liquid does not reflect or emit visible light.

9. The method of claim 8, wherein the second liquid is less dense than the third liquid.

10. The method of claim 9, wherein the second liquid contains one or more pigments that absorb nonvisible electromagnetic radiation and emit visible light.

11. The method of claim 9, wherein the third liquid is ferromagnetic.

12. The method of claim 11, wherein one or more electromagnets are used to apply an electromagnetic field that causes dynamic sculpting of the luminous fluid eye.

13. A method of generating a luminous fluid sculpture comprising a substantially transparent flowing flame that changes color, wherein the method comprises the steps of:

sculpting one or more fluids into a pattern or shape using one or more forces selected from the group consisting of mechanically generated turbulence, controlled movement through a shaped chamber, application of a magnetic field, vibration, and gravity to generate one or more sculpted fluids; and energizing the sculpted fluids using one or more sources of nonvisible energy selected from the group consisting of chemicals, heat, electrical current, and nonvisible electromagnetic radiation so that said sculpted fluids emit visible light;

wherein the color of the visible light emitted is controlled by the type of nonvisible energy used to energize the sculpted fluids;

wherein the method comprises at least two non-simultaneous sculpting and energizing steps that generate a dynamic luminous fluid sculpture.

14. The method of claim 13, wherein the flowing flame is generated by performing the following steps in order:

a. introducing a non-flammable gas into a chamber comprising an exhaust hole at the bottom of the chamber, and heating the chamber;

b. introducing a fuel-air mixture into the chamber; and c. igniting the fuel-air mixture;

wherein the fuel-air mixture is more dense than the non-flammable gas and exits the chamber through the exhaust hole.

15. The method of claim 14, wherein one or more chemical additives are introduced into the fuel to adjust the color of the flowing flame.

* * * * *